US012583133B2

(12) United States Patent
Molina et al.

(10) Patent No.: US 12,583,133 B2
(45) Date of Patent: Mar. 24, 2026

(54) STACK PUSHER

(71) Applicant: Dexterity, Inc., Redwood City, CA (US)

(72) Inventors: Matthew Rodolfo Molina, San Francisco, CA (US); Robert Holmberg, Mountain View, CA (US); Matthew LaGoy, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 668 days.

(21) Appl. No.: 17/963,763

(22) Filed: Oct. 11, 2022

(65) Prior Publication Data

US 2023/0114393 A1    Apr. 13, 2023

Related U.S. Application Data

(60) Provisional application No. 63/254,914, filed on Oct. 12, 2021.

(51) Int. Cl.
| | |
|---|---|
| *B25J 18/02* | (2006.01) |
| *B25J 5/02* | (2006.01) |
| *B65G 1/04* | (2006.01) |
| *B65G 1/137* | (2006.01) |
| *B65G 35/06* | (2006.01) |

(52) U.S. Cl.
CPC .............. *B25J 18/025* (2013.01); *B25J 5/02* (2013.01); *B65G 1/0435* (2013.01); *B65G 1/1373* (2013.01); *B65G 1/1378* (2013.01); *B65G 35/06* (2013.01); *B65G 2203/0233* (2013.01); *B65G 2203/041* (2013.01)

(58) Field of Classification Search
CPC . B25J 18/025; B25J 5/02; B25J 9/0084; B25J 9/0093; B65G 1/0435; B65G 1/1373; B65G 1/1378; B65G 2203/0233; B65G 2203/041; B65G 35/06
See application file for complete search history.

(56) References Cited

U.S. PATENT DOCUMENTS

| | | | |
|---|---|---|---|
| 4,604,026 A | 8/1986 | Barrett | |
| 10,138,060 B1 * | 11/2018 | Mantha | ................ B65G 1/1371 |
| 12,291,407 B2 * | 5/2025 | Molina | .................. B65G 47/52 |

(Continued)

FOREIGN PATENT DOCUMENTS

| | | |
|---|---|---|
| CN | 105705441 | 4/2018 |

*Primary Examiner* — Thomas Randazzo
(74) *Attorney, Agent, or Firm* — Van Pelt, Yi & James LLP

(57) ABSTRACT

The present application discloses a robotic stack pusher system, and a method and a computer system for controlling the robotic stack pusher system. The robotic stack pusher system includes an actuation device and a plurality of pusher structures that are substantially planar. At least one of the plurality of pusher structures is nested within one or more other pusher structures of the plurality of pusher structures. The actuation device is the actuation device is operatively coupled to at least one of the plurality of pusher structures. The actuation device is configured to actuate a position of the plurality of pusher structures between a retracted state and an extended state in response to a control signal. Actuation of the actuation device causes the one of the plurality of structures that is nested to extend telescopically with sufficient force and to controllably push a payload.

37 Claims, 23 Drawing Sheets

300                      300

(56)　　　　　　　References Cited

U.S. PATENT DOCUMENTS

| 2006/0245862 | A1* | 11/2006 | Hansl | .................... | B65G 1/0435 |
| | | | | | 414/281 |
| 2011/0008138 | A1 | 1/2011 | Yamashita | | |
| 2017/0183159 | A1* | 6/2017 | Weiss | .................... | B66F 9/0755 |
| 2018/0305122 | A1* | 10/2018 | Moulin | ................ | B65G 1/0485 |
| 2019/0119049 | A1* | 4/2019 | King | .................... | B65G 57/303 |
| 2021/0139240 | A1* | 5/2021 | Kapust | ................. | B65G 1/0435 |
| 2021/0387812 | A1* | 12/2021 | Li | ............................. | B07C 5/36 |

\* cited by examiner

315

Pushing Mechanism

305

310

320

325

300

300

510

505

515

520

525

500

500

600

600

Front view

600

600

600

700

800

900

902
Planning

904
Determine (next) stack to insert

906
Engage stack(s)

908
Move to destination

910
Perform kitting operation with respect to stack(s)

1100

STACK PUSHER

CROSS REFERENCE TO OTHER APPLICATIONS

This application claims priority to U.S. Provisional Patent Application No. 63/254,914 entitled STACK PUSHER filed Oct. 12, 2021 which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
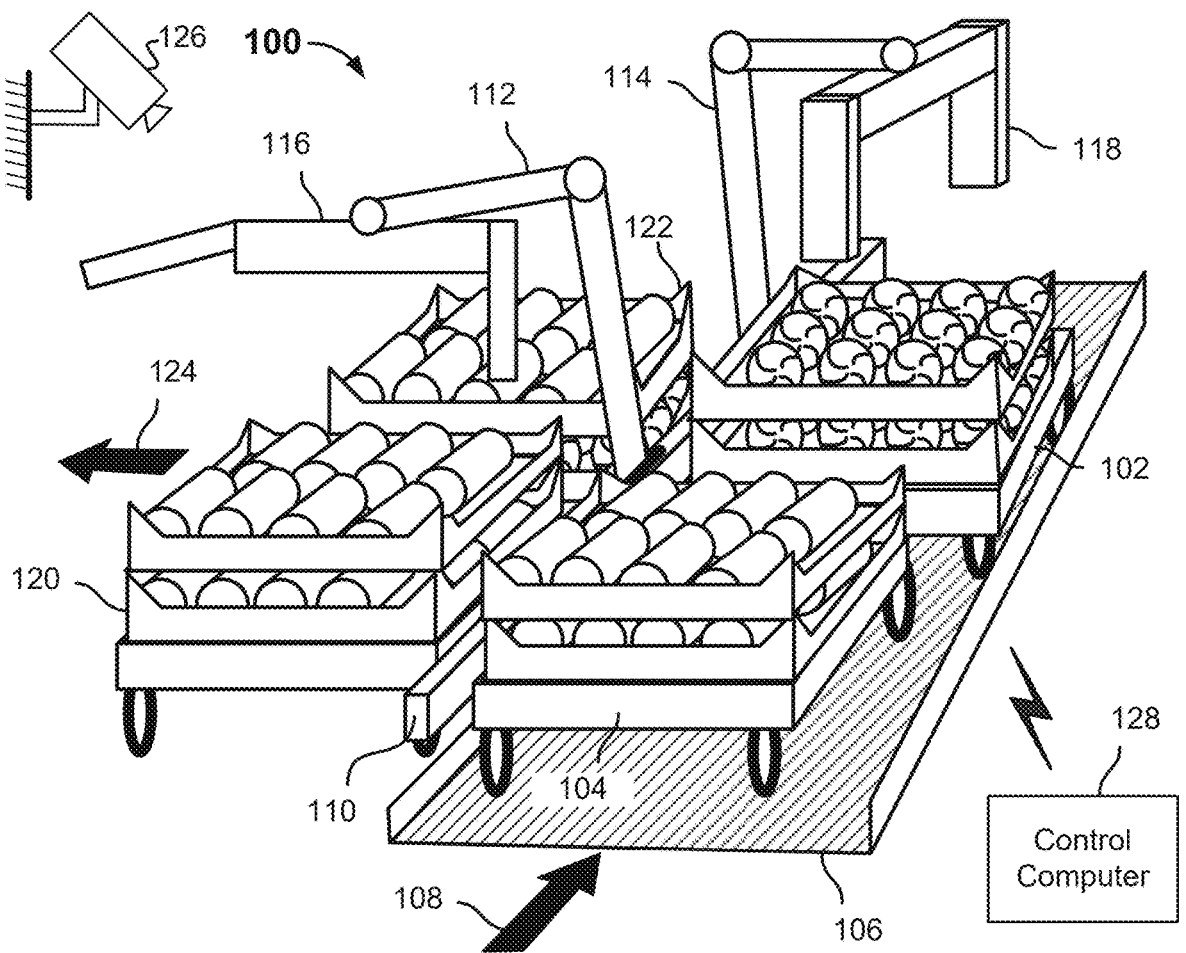
FIG. 1A is a block diagram illustrating a robotic line kitting system according to related art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a vehicle means a cart, a trolley, a dolly, carriage, wagon, pallets, or other structure configured to hold or support one or more items such as trays (e.g., a stack of trays).

As used herein, a kitting system comprises a robot arm configured to move one or more objects such as in connection with assembling kits and/or packaging kits. In various embodiments, a kitting machine as disclosed herein may comprise one or more kitting shelf machine modules, each comprising a modular component.

Various embodiments include a system and method for loading a payload to a robot workspace or otherwise to a robotic stack mover system that in turn moves the payload to the robot workspace. The method includes determining to load a payload into a robot workspace, in response to determining to load the payload into the robot workspace, controlling a robotic stack pusher system to move one or more pusher structures to cause the payload to be pushed from a payload buffer zone to an end position, and controlling the robotic stack pusher system to apply a retraction force to retract the one or more pusher structures to a start position. In some embodiments, the robot workspace includes a robotic stack mover system that is configured to move one or more payloads to an operable range of a robot (e.g., a robot arm).

Various embodiments include a robotic stack pusher system that is configured to load a payload to a robot workspace or otherwise to a robotic stack mover system that in turn moves the payload to the robot workspace. In some embodiments, a robotic stack pusher system comprises an actuation device and one or more pusher structures. The actuation device is operatively coupled to at least one of the one or more pusher plates. The actuation device is configured to actuate a position of the one or more pusher structures between a retracted state and an extended state. The actuation device is controlled to actuate the position of the one or more pusher structures in connection with loading a payload to a robot workspace.

Various embodiments include a robotic stack pusher system that is configured to load a payload to a robot workspace or otherwise to a robotic stack mover system that in turn moves the payload to the robot workspace. In some embodiments, a robotic stack pusher system comprises an actuation device and a plurality of pusher structures. The plurality of pusher structures are substantially planar and at least one of the plurality of pusher structures is nested within one or more other pusher structures of the plurality of pusher structures. The actuation device is operatively coupled to at least one of the one or more pusher structures. The actuation device is configured to actuate a position of the one or more pusher structures between a retracted state and an extended state in response to a control signal. Actuation of the actuation device causes the one of the plurality of structures that is nested to extend telescopically with sufficient force and to controllably push a payload. In some embodiments, the control signal is received from a robotic control system. The robotic control system is associated with a robot workspace, and the robotic control system uses information obtained from one or more sensors at the robot workspace in connection with generating the control signal. The robotic control system uses the information obtained from one or more sensors to detect a payload in a buffer zone that is ready to be pushed. The robotic control system determines to control the robotic stack pusher via the control signal in response to detecting that the payload is in the buffer zone ready to be pushed to (e.g., inserted in) the workspace, such as in connection with the robotic control system controlling/implementing a high-level plan to use a robotic arm to perform kitting operations with respect to items to be picked/placed from/to the payload.

According to various embodiments, a robotic stack pusher system comprises an actuation device and a plurality of pusher structures. The pusher structures in the plurality of pusher structures are nested when the system is in a retracted state. For example, any one pusher structure is at least partially enveloped by a previous pusher structure (if any) in the system. The system controls the actuation device that causes the plurality of pusher structures to telescopically extend from the retracted state to an extended state. As the plurality of pusher structures extend to the extended state, at least one of the pusher structures engages a payload (e.g., a stack of receptacles such as on a dolly) to load the payload to the robot workspace (e.g., to a robotic stack mover system that is configured to move the payload through the robot workspace (e.g., to move the payload to within operable range of one or more robots for the robot(s) to perform a kitting operation with respect to the payload). The kitting operation includes unloading a set of receptacles (e.g., trays) in the payload. For example, the robot picks items from a receptacle in the payload and places the items on a conveyance structure or other destination location. The kitting operation includes loading a set of receptacles in the payload. For example, the payload is a stack of empty trays. A robot picks items from a source location (e.g., a conveyance structure that carries items to the robot workspace) the robot sequentially places the items in the trays.

According to various embodiments, the robotic stack pusher system is configured to load a payload (e.g., a stack of trays such as a stack on a dolly) to a payload introduction location of a robotic stack mover system. The robotic stack mover system is configured to receive a plurality of vehicles (e.g., dollies) comprising payloads (e.g., stacks of trays on vehicles) and to autonomously move at least one vehicle to a destination location within reach of a robot arm. The robot arm is controlled to move (e.g., pick and place) items (e.g., trays comprising a plurality of objects) to/from the vehicle (e.g., to/from the stack of trays). In various embodiments, the system determines to move the vehicle to the destination location in connection with determining that the items are to be moved to/from the vehicle (e.g., in response to determining to de-stack a stack of items comprised in the vehicle). The system determines a plan to move the item to the destination location such as to within a range/workspace of a robot arm such as a particular robot arm among a plurality of robot arms comprised in a kitting system. In response to determining to move the vehicle, the system controls to move the vehicle to the destination location (e.g., according to a determined plan). For example, the system actuates a driving unit (e.g., the system drives a motor) to cause the vehicle to move to the destination location. In response to determining that a kitting operation performed with respect to the vehicle is complete (e.g., all items are de-stacked from the vehicle, a stacking of a set of items is complete, etc.), the system controls to move the vehicle to a vehicle return location and/or to move another vehicle to the destination location. Further, in response to determining that the kitting operation performed with respect to the vehicle is complete, the system controls the robotic stack pusher system to move another payload (e.g., payload on a vehicle such as a dolly)

to the payload introduction location, and controls the robotic stack mover system to move a next payload to the destination location.

According to various embodiments, the system (e.g., the robotic stack pusher system) comprises a set of one or more pusher structures. For example, the system comprises at least a payload engagement pusher structure (e.g., a pusher structure that engages a stack of trays to move the stack of trays to a destination location). The system controls to move (e.g., linearly extend) the payload engagement pusher structure from a retracted position to an extended position to engage the payload. In some embodiments, the system comprises a plurality of pusher structures, including at least the payload engagement pusher structure and a first pusher structure. The plurality of pusher structures further include one or more intermediate pusher structures. In the case that the system comprises a plurality of pusher structures, the system controls to move the pusher structures to telescopically extend to the extended position. The pusher structures sequentially extend from their respective individual retracted positions. For example, when the system controls the movement of the pusher structures, the system controls to move the payload engagement pusher structure to move to be extended relative to the other pusher structures. In response the payload engagement pusher structure being extended to a threshold point (e.g., the payload engagement pusher structure being fully extended relative to the other pusher structures), the system controls to sequentially extend the other pusher structures. The pusher structures correspond to a plate or other planar structures (e.g., sub-stantially planar structures) or assemblies that are stacked on each other in a nested configuration. The plurality of pusher structures are in a nested configuration when the system is in a retracted state, and as the system controls to move the payload, the system controls an actuation device that causes the plurality of pusher structures to sequentially extend relative to their respective subsequent pusher structure (e.g., the subsequent pusher structure is a next pusher structure to be moved/extended after the current pusher structure is moved to be extended relative to the subsequent pusher structure). If the system comprises the payload engagement pusher structure, the first pusher structure, and one or more intermediate pusher structures, the pusher structures are arranged/configured such that when operating the system is transitioned to be arranged in an extended state (e.g., to push the payload), the payload engagement pusher structure is first extended relative to the other pusher structures, then the one or more intermediate pusher structures are extended relative to each other, and then first pusher structure is extended relative to a base plate to which the plurality of pusher structures are operatively connected.

In some embodiments, controlling the system to move from an extended state to the retracted states causes the plurality of pusher structures to sequentially retract relative to a previous pusher structure (e.g., a pusher structure that is closer to the proximate end of the system or the base plate than the current pusher structure). As an example, the order in which the pusher plates are moved to a retracted position/state is the same as the order in which the plurality of pusher plates is extended. For example, if the system comprises the payload engagement pusher structure, the first pusher struc-ture, and one or more intermediate pusher structures, the pusher structures are arranged/configured such that when operating the system to be configured to transition to a retracted state (e.g., to retract the pusher structure to allow for another payload to be loaded in a buffer zone for introduction to a robotic stack mover system), the payload engagement pusher structure is first retracted relative to the other pusher structures, then the one or more intermediate pusher structures are sequentially retracted relative to each other, and then first pusher structure is retracted relative to a base plate to which the plurality of pusher structures are operatively connected.

In some embodiments, the system includes a plurality of pusher structures that telescopically extend/retract as the system is transitioned to an extended state (e.g., to push the payload to a destination location) or a retracted state (e.g., to allow for a subsequent payload to be loaded to the buffer zone). The use of a plurality of pusher structures that sequentially telescopically extend/retract improves the effi-ciency of the system for pushing payloads (e.g., stacks of trays). For example, the system comprising the nested pusher structures that telescopically extend/retract is more space efficient than a system comprising a single pusher structure that linearly extends from a starting position (e.g., a base plate) because the plurality of pusher structures are nested. The cascading and offset stages (e.g., the offset of a plurality of pusher structures) allows the system to be compact (e.g., when in the retracted state). As another example, the system is more cost efficient than a system comprising a single pusher structure that linearly extends from the starting position. The system dimensions, compact-ness, and function satisfy the criteria or other requirements for moving the payloads and allow for deployment within an available/allotted installation space. The dimensions of the pusher structures are selectively determined based on dimensions of a space at which the system is to be deployed (e.g., in a warehouse). In some embodiments, the pusher structures (e.g., the payload engagement pusher structure) pushes a vehicle corresponding to the payload without directly applying force to items/objects (e.g., trays) stacked on the vehicle. For example, the pusher structures engage and push a frame of the vehicle to cause the vehicle to move within the workspace. The pusher structures are nested and have a low profile to ensure that the stack pusher system does not engage items stacked on a vehicle (e.g., wheeled dolly). In some embodiments, the payload engagement pusher structure engages the payload (e.g., a wheeled dolly) within 12 inches of the ground. In some embodiments, the payload engagement pusher structure engages the payload (e.g., a wheeled dolly) within 6 inches of the ground. In some embodiments, the payload engagement pusher struc-ture engages the payload (e.g., a wheeled dolly) between 4 inches 8 inches of the ground.

The system is configured to move the pusher structure(s) between the extended state and the retracted state based on control of an actuation device that actuates a linear force applied to the pusher structures. When the pusher structure (s) are being moved from a retracted state to an extended state the direction of the linear force is from a base plate of the system to the end position at which the system loads the payload to the destination location. Conversely, when the pusher structure(s) are being moved from an extended state to a retracted state, the direction of the linear force is from the end position towards the base plate. Various pusher mechanisms may be implemented to control/apply the linear force to the pusher structure(s). In some embodiments, the linear force is applied by a linear shaft, the position of which is controlled via an actuating force of the pushing mecha-nism. Examples of the pushing mechanism include (i) air or hydraulic pistons, (ii) linear actuators, and (iii) electric motor driven rack/pinion or other linear gear mechanism, etc. In some embodiments, the linear force is applied to the payload engagement pusher structure causing the payload engagement pusher structure to move between a retracted position and an extended position. The payload engagement pusher structure is operatively connected to the other pusher structures in the set of pusher structure such that the payload engagement pusher structure in turn applies a linear force to cause the other pusher structures to move between their respective retracted positions and extended positions. As an example, the payload engagement pusher structure is operatively connected to the other pusher structures via a series of pulley stays and wire rope cables or chains.

In some embodiments, the system comprises a gating structure that is controlled to actuate a gate to move to a closed position or an open position. When the gate is configured in the closed position, the gate prevents/impedes payloads from moving from the buffer area/zone to the destination location (e.g., the location at which the payloads are to be introduced to the robotic stack mover system). When the gate is configured in the open position, the robotic payload pusher system (e.g., robotic stack pusher system) loads a payload to the robot workspace. For example, the robotic payload pusher system pushes the payload to a destination location such as a location at which payloads are introduced to a robotic stack mover system.

In some embodiments, the system comprises a control computer. The system uses the control computer to control the actuating device (e.g., to actuate a force, such as a linear force, to move the robotic stack pusher system between an extended state and a retracted state) and to control a movement/location of one or more vehicles (e.g., payloads such as stacks of trays on a dolly) inserted to the system. The system may further comprise or be connected to a robot arm, and the system uses the control computer to control the robot arm such as in connection with performing a kitting operation with respect to the one or more vehicles/payloads (e.g., stacking/de-stacking items such as trays, etc.). The system may comprise a data structure with which the system maintains/stores (i) a mapping of vehicles to manifests (e.g., a packing list or other information indicating a set of items or objects within items comprised in a vehicle), (ii) a mapping of vehicles to locations or relative locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. The system may monitor/track a location of a vehicle/payload and accordingly update the data structure such as the mapping(s), etc. The system uses the data structure to track specific items (or objects comprised in a particular item/ vehicle) within the system such as to track a particular vehicle to which the item is stacked, or a particular vehicle (or associated manifest) from which the item is de-stacked/ taken.

The control computer controls the robotic stack pusher system. The control computer further controls the robotic stack mover system to move stacks within a robot workspace and/or a gating structure to control a gate that impedes/permits a payload to be introduced to the robotic stack mover system. In some embodiments, the control computer coordinates control of the robotic stack pusher system and the robotic stack mover system to introduce payloads to a robot workspace, move payloads through the robot workspace for processing (e.g., for robots to perform kitting operations), and to a vehicle (e.g., dolly) return location. In some embodiments, the system comprises a buffer conveyance structure that moves payloads from a source location (e.g., a location at which payloads are introduced to the system) to a buffer zone at which the payloads are moved through/past the gate using the robotic stack pusher system (e.g., in connection with loading the payload to the robotic stack mover system). The buffer conveyance structure includes a conveyor or other conveyance mechanism. The system performs coordinated control of two or more of the robotic stack pusher system, a robotic stack mover system, the gating structure, and the buffer conveyance.

The system comprises one or more sensors that capture information pertaining to one or more of a workspace, including one or more of the workspace of the robotic stack pusher system, a robotic stack mover system, a buffer conveyance, a gating structure, etc. The one or more sensors include a vision system and/or various other types of sensors, including a weight sensor, a light sensor (e.g., a light array), a force sensor, etc. As example, the system includes a light sensor(s) that detects whether the robotic stack pusher system is in an extended state or a retracted state, or a position/location of one or more of the pusher structures comprised int eh robotic stack pusher system. As another example, the system includes a force sensor that detects whether a payload is engaged by the robotic stack pusher system. As another example, the system includes e a gate sensor(s) that detects a state of the gating structure such as whether a gate is in an open position, a closed position, or a position between the open state and closed state. As another example, the system includes one or more light sensors or vision system to determine locations of payloads (e.g., stacks of trays) as the payloads are moved through the robot workspace by the robotic stack mover system, or through the buffer area by a buffer conveyance. All or some of the one or more sensors may be comprised in a vision system of the system such as a vision system that operates to obtain information pertaining to items or components in the workspace of the robot arm, and with which the system controls the robot arm to move items (e.g., to stack/de-stack items with respect to a vehicle).

Although embodiments described herein are provided in the context of a kitting system or picking and placing items from a tray, various embodiments may be implemented in various other contexts such as palletizing systems, singulation systems, etc. For example, although the robotic stack pusher system is described herein in the context of a kitting system in which a robot arm is controlled to perform kitting operation with respect to items in a payload (e.g., a stack of receptacles, etc.), the robotic stack pusher system is deployed in (or in connection with) various other systems, such as a palletization system, a singulation system etc. For example, the robotic stack pusher system is used in a palletization system such as in connection with introducing (e.g., pushing) a pallet to a robot workspace for depalletization. As another example, the robotic stack pusher system is used in a singulation system, such as in connection with moving a stack of trays comprising items that have been singulated, etc.

In some embodiments, the system comprises a robotic stack pusher system that loads payloads (e.g., pushes stacks of trays) to a robotic stack mover system that is configured to move the payloads through the robot workspace. An example of a robotic stack mover system is further described in U.S. patent application Ser. No. 17/713,077 filed on Apr. 4, 2022, the entirety of which is hereby incorporated herein for all purposes.

As used herein, depalletization includes picking an item from a pallet, such as from a stack of items on the pallet, moving the item, and placing the item at a destination location such as a conveyance structure. An example of palletization/depalletization system and/or process for pal-letizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and plac-ing the one or more items in a predetermined location in a manner that a set of the one or more items correspond to a kit. An example of a kitting system and/or process for kitting a set of items is further described in U.S. patent application Ser. No. 17/219,503, the entirety of which is hereby incor-porated herein for all purposes. Another example of a kitting system and/or process for kitting a set of items is further described in U.S. patent application Ser. No. 16/224,513 filed on Dec. 18, 2018, entitled "Robotic Kitting System" (published on Mar. 26, 2020 as United States Patent Appli-cation Publication No. 2020/0095001), the contents of which are incorporated herein for all purposes.

FIG. 1A is a block diagram illustrating a robotic line kitting system according to related art. In the example shown, system 100 includes source tray stacks 102 and 104 moving along an input stack conveyance 106 fed in this example from an input end 108 (staging and loading area). Each of the source tray stacks 102 and 104 in this example is shown to be stacked on a wheeled cart or chassis. In various embodiments, the source tray stacks 102 and 104 may be pushed manually onto the conveyance 106, which may be a conveyor belt or other structure configured to advance the source tray stacks 102 and 104 through the workspace defined by conveyance 106. In some embodi-ments, the chassis or other base structure on which the source trays are stacked may be self-propelled. In some embodiments, source tray stacks 102 and 104 may be advanced through/by conveyance 106 under robotic control. For example, the speed and times at which the source tray stacks 102 and 104 are advanced by/through conveyance 106 may be controlled to facilitate efficient grasping of trays from the source tray stacks 102 and 104.

In the example shown, a single rail (e.g., rail 110) is disposed along one long side of the conveyance 106. In this example, two robots, one comprising robot arm 112 and another comprising robot arm 114, are mounted movably, independent of one another, on rail 110. For example, each robot arm 112, 114 may be mounted on a self-propelled chassis that rides along rail 110. In this example, each robot arm 112, 114 terminates with a tray handling end effector 116, 118.

The tray handling end effector 116, 118 is operated under robotic control to grasp one or more trays from a source tray stack 102, 104. As shown in FIG. 1A, each end effector 116, 118 includes a lateral member attached to the end of the robot arm 112, 114. A side member is mounted on each end of the lateral member. As shown, at least one of the side members is opened or closed under robotic control, in various embodiments, to enable a tray to be grasped (by closing the side member) or released (by opening the side member).

Each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. A robotic control system (e.g., a computer that controls robot arm 112, 114, such as control computer 128) controls the end effector to actuate the opening/closing of the end effector such as in connection with grasping or releasing a tray. The robotic control system controls the end effector based at least in part on image data of the workspace and/or one or more sensors comprised in (or connected to) the corresponding end effec-tor. In some embodiments, the one or more sensors com-prised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

Each end effector 116, 118 includes on each side member one or more protrusions or similar structures of a size and shape such that the protrusion, etc., fits into and, in various embodiments, can be slid under robotic control into holes or other openings in the sides of the tray(s) to be grasped. For example, in some embodiments, protrusions on the inner face of the side members, sometimes called "thumbs" herein, are slotted into handholds (e.g., holes sized to accommodate a human hand) on opposite sides of a tray, as described and illustrated more fully below.

The respective robot arms 112, 114 are operated at the same time, fully autonomously, to pick trays from source tray stacks 102, 104 and place them on destination tray stacks, such as destination tray stacks 120, 122, in a desti-nation tray stack assembly area on an opposite side of rail 110 from conveyance 106 and source tray stacks 102, 104. The destination tray stacks are assembled, in various embodiments, according to invoice, manifest, order, or other information. For example, for each of a plurality of physical destinations (e.g., retail stores), a destination stack associ-ated with that destination (e.g., according to an order placed by the destination) is built by selecting trays from respective source tray stacks 102, 104 and stacking them on a corre-sponding destination tray stacks 120, 122. Completed des-tination tray stacks 120, 122 are removed from the destina-tion tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one or more of conveyance 106; the wheeled chassis on which source tray stacks 102, 104 are stacked (if self-propelled); the robot arms 112, 114 and/or the respective chassis on which the robot arms 112, 114 are mounted on rail 110; and the robotically controlled tray handling end effectors 116, 118. In various embodiments, the robotic elements are controlled by control computer 128 based on input data, such as invoice, order, and/or manifest information, as well as input state information, such as inventory data indicating which source tray stacks include which type and/or quantity of product.

Source tray stacks 102, 104 are inserted into a gate or other ingress/control structure at the input end 108 of conveyance 106. Conveyance 106 comprises an apparatus (stack mover) that moves the source tray stacks 102, 104 along the rail 110 to optimize throughput and minimize robot displacement, e.g., by minimizing how far and/or often the robot arms 112, 114 must be moved along rail 110 to grasp source trays and place them on respective destination stacks. The source tray stacks 102, 104 can come in with trays in different orientations/weights/and weight distribution. The system 100 uses force and moment control to operate robot arms 112, 114 to insert a thumb or other protrusion gently and securely into a tray and plans its motion and tray trajectory in order to not collide with itself or the environment. In various embodiments, each robot arm 112, 114 operates in a very tight space of roughly 2.5 m in width and has a very light footprint. The robot utilizes its full workspace and intelligently plans its motion optimizing its grasp and/or efficiency (e.g., time, collision avoidance, etc.) in de-stacking the source tray stacks 102, 104. It recognizes the need to perform orientation changes and handles that accordingly while avoiding obstacles. The robot moves to the correct output (destination tray stacks 120, 122) corresponding to the right customer while coordinating with the other robots on the rail 110. It then uses advanced force control and interactions with the environment to figure out a proper place strategy. The cycle then restarts.

In some embodiments, source tray stacks 102, 104 are inserted onto conveyance 106 or into the gate or other ingress control structure corresponding to input end 108 by a robotic stack pusher system (not shown). System 100 includes the robotic stack pusher system to load stacks into the robot workspace (e.g., to an ingress control structure corresponding to input end 108). Control computer 128 controls the robotic stack pusher system to load a stack on conveyance 106 in coordination with controlling robot arms 112, 114 to pick and place items to/from the stacks such as tray stacks 102, 104. Control computer 128 controls the robotic stack pusher system to load a stack to the robot workspace of system 100 (e.g., to conveyance 106) in response to determining that a kitting operation is complete with respect to a preceding stack is complete (e.g., a preceding stack has been unloaded) and a vacancy within the workspace is created (e.g., by moving the preceding stack to a stack return location), etc.

In the example shown in FIG. 1A, the system 100 includes a 3D camera 126. In various embodiments, the system 100 includes a plurality of 3D (or other) cameras, such as camera 126, and uses image and depth data generated by such cameras to generate a three-dimensional view of at least relevant portions of the workspace and scene, such as the scene/state shown in FIG. 1A. In some embodiments, cameras such as camera 126 are used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

Although a single camera (e.g., camera 126) mounted to a wall in the workspace of system 100 is shown in FIG. 1A, in various embodiments, multiple cameras or other sensors, or a combination thereof, are mounted statically in a workspace. In addition, or instead, one or more cameras or other sensors are mounted on or near each robot arm 112, 114, such as on the arm itself and/or on the end effector 116, 118, and/or on a structure that travels with the robot arm 112, 114 as it is moved along rail 110.

Figure 1B:
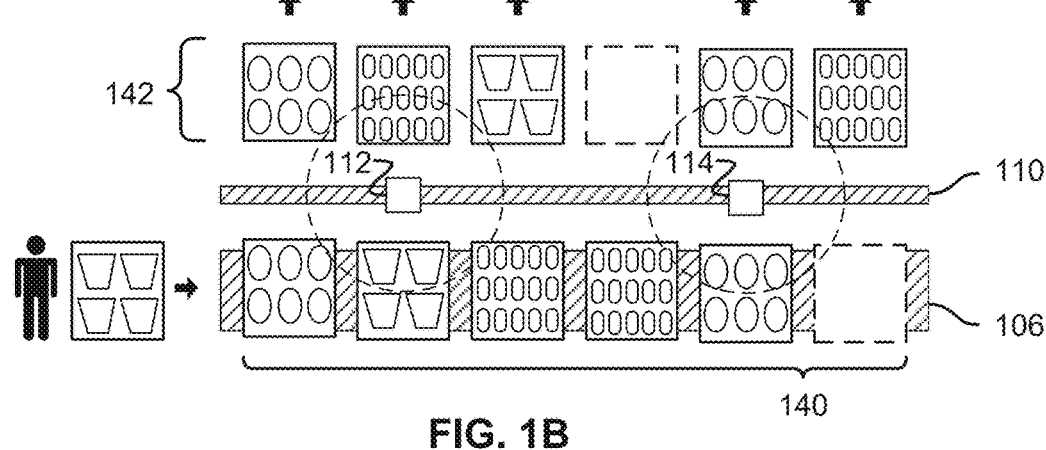
FIG. 1B is a block diagram illustrating a robotic line kitting system according to related art.

FIG. 1B is a block diagram illustrating a robotic line kitting system according to related art. In FIG. 1B, an example is shown of an overhead view of a workspace in which the system 100 of FIG. 1A may operate. In the example shown, robot arms 112, 114 move along a common rail (e.g., rail 110), as in FIG. 1A, to access and pick trays from source stacks 140 moving along conveyance 106 and place trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. In some embodiments, system 100 comprises a robotic stack pusher system (not shown) that loads a stack onto conveyance 106. For example, control computer 128 controls the robotic stack pusher system and robot arms 112, 114 in coordination to perform operations with respect to items picked/placed from/to stacks. Control computer 128 controls the robotic stack pusher system to load a stack to the robot workspace of system 100 (e.g., to conveyance 106) in response to determining that a kitting operation is complete with respect to a preceding stack is complete (e.g., a preceding stack has been unloaded) and a vacancy within the workspace is created (e.g., by moving the preceding stack to a stack return location), etc. As destinations stacks 142 are completed, they are moved out of the destination stack assembly area, as indicated by the arrows that at the top of FIG. 1B, which corresponding to arrow 124 of FIG. 1A.

While in the example shown in FIGS. 1A and 1B the trays each contain only one type of item (e.g., object), in various embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 is provided with information indicating which types of trays are in which position in each source tray stack, and uses that information, along with manifest or other information indicating the required contents of each destination tray stack, to build the required destination tray stacks by picking needed trays each from a corresponding position on a source tray stack and adding the tray to a corresponding destination stack.

Although FIGS. 1A and 1B illustrate a system in which robot arms are controlled to pick items or trays from source stacks and to place the items or stacks to a destination location (e.g., destination stacks 142), various embodiments include the placing of items or trays onto stacks that are carried by conveyance 106. For example, some embodiments implement a system that loads tray stacks 102, 104.

Figure 2A:
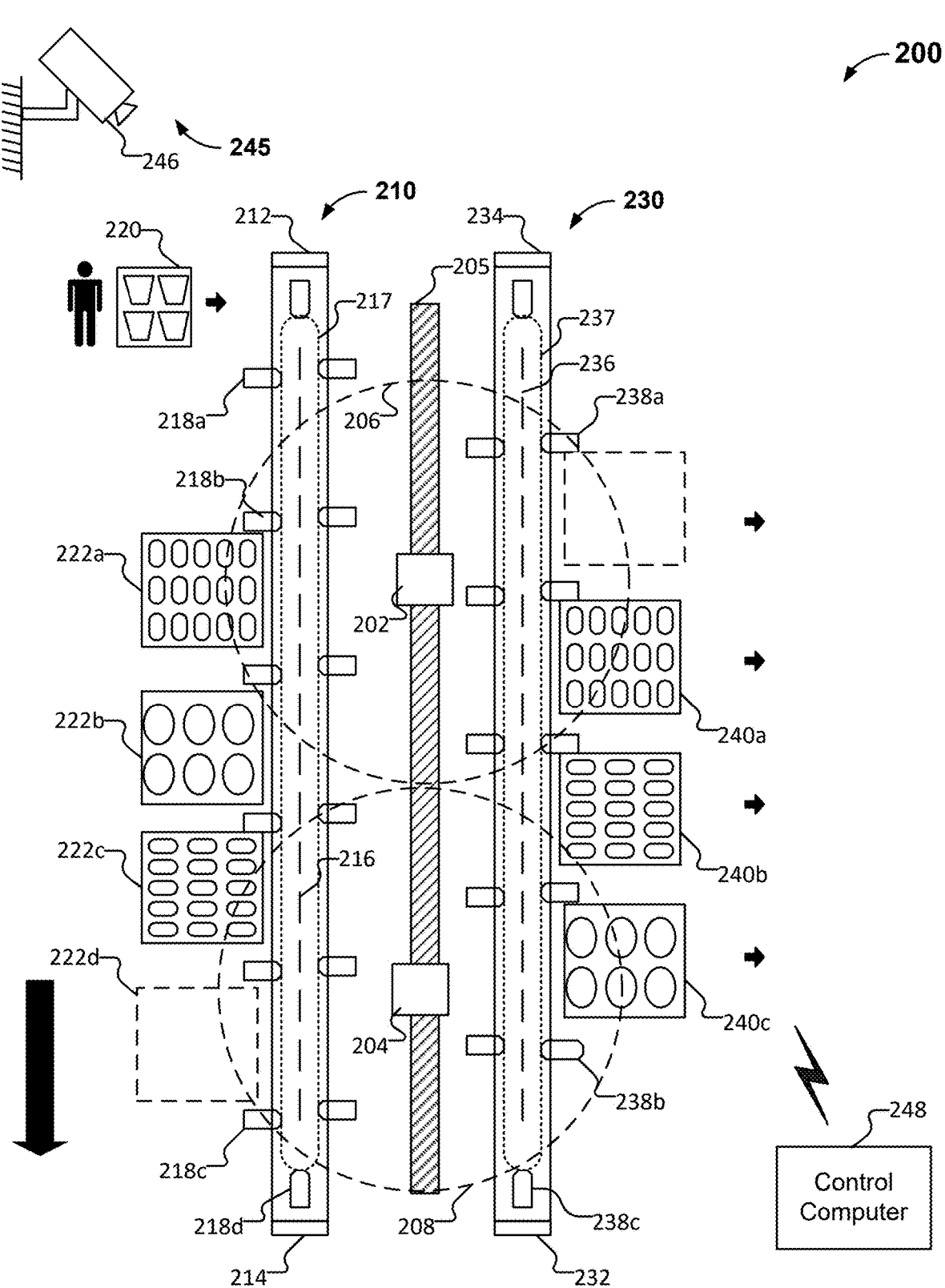
FIG. 2A is a block diagram illustrating a robotic line kitting system according to various embodiments.

FIG. 2A is a block diagram illustrating a robotic line kitting system according to various embodiments. In the example shown, system 200 includes a robotic stack mover system 210. System 200 uses robotic stack mover system 210 to move (e.g., along a path) tray stacks 222a, 222b, and 222c (e.g., or vehicles in which stacks of trays are comprised or are to be loaded) in position for robot arms 202 and 204 to perform kitting operations such as de-stacking tray stacks 222a, 222b, and 222c, or stacking trays or placing items on trays of stacks of trays. In some embodiments, system 200 controls robotic stack mover system 210 to move tray stacks 222a, 222b, and 222c to respective locations within, or in proximity to, workspaces of robot arms 202 and 204 (e.g., which may correspond to ranges 206 and 208). Robotic stack mover system 210 autonomously moves stacks of trays (or other vehicles) that are inserted to robotic stack mover system 210 (e.g., a predefined insertion location, between pusher units, etc.).

In various embodiments, robotic stack mover system 210 includes a driving unit 212 configured to move tray stacks 222a, 222b, and 222c such as by driving a mechanism to apply respective forces on tray stacks 222a, 222b, and 222c. As an example, the driving unit 212 comprises a motor that is driven based at least in part on a determination to move the tray stacks 222a, 222b, and 222c. System 200 controls the motor via computer control such as by control computer 248 operatively connected to robotic stack mover system 210. In various embodiments, driving unit 212 further includes one or more driving sprockets that are actuated in response to the motor being driven. For example, the motor is connected to at least one of the one or more driving sprockets, and in response to the motor being driven forces are translated from the motor to the one or more driving sprockets. Alternatively, or in addition, driving unit 212 comprises a crank pulley or other mechanism to drive movement of a drive chain, belt, etc.

In various embodiments, robotic stack mover system 210 includes a tensioning unit 214. Tensioning unit 214 is part of the drive system of robotic stack mover system 210 and ensures the drive system has sufficient tension. In addition, tensioning unit 214 serves as a recirculation point for the drive system (e.g., a drive chain is redirected and recirculated back to driving unit 212). In some embodiments, tensioning unit 214 comprises one or more tensioning sprockets. At least one tensioning sprocket of the one or more tensioning sprockets is movably mounted in a manner that the at least one tension sprocket changes a tension of the drive chain when the at least one tensioning sprocket is moved. The at least one tensioning sprocket that is movably mounted to tensioning unit 214 is moved/adjusted via manual intervention such as by a user, or via control of a computer system of the system. The tensioning unit is configured to adjust/enforce a tension in the drive chain of the system.

In various embodiments, robotic stack mover system 210 includes drive chain 217. Drive chain 217 traverses the distance between driving unit 212 and tensioning unit 214. Drive chain 217 receives force from driving unit 212 to cause drive chain 217 to move (e.g., to circulate within robotic stack mover system 210). In some embodiments, drive chain 217 is a double-pitch chain having a profile that comprises a hole or recess in which a tooth of a driving sprocket fits for the driving unit to engage drive chain 217. In some embodiments, drive chain 217 is a belt made such as a thermoplastic belt. Robotic stack mover system 210 further includes guide rail 216 that is configured to provide support for drive chain 217 to ensure that drive chain 217 traverses a longitudinal direction between driving unit 212 and tensioning unit 214. The longitudinal direction of guide rail 216 is parallel to (or similar to) the direction of rail 205 along which robot arms 202 and 204 (e.g., and on which robot arms 202 and 204 are mounted such as via robot carriages) traverse to pick and place items (e.g., trays, objects from trays, carts, etc.).

In the example shown in FIG. 2A, drive chain 217 includes a set of pusher units such as pusher units 218a, 218b, 218c, and 218d. The pusher units of the set of pusher units are disposed at a predetermined distance along drive chain 217. The predetermined distance is determined based on a dimension of a tray or tray stack. For example, the predetermined distance is 25% greater than the dimension (e.g., length) of a tray or tray stack. As another example, the predetermined distance is 10% greater than the dimension (e.g., length) of a tray or tray stack. As another example, the predetermined distance is 15% greater than the dimension (e.g., length) of a tray or tray stack. As another example, the predetermined distance is 50% greater than the dimension (e.g., length) of a tray or tray stack. In some embodiments, the predetermined distance between two adjacent pusher units (e.g., pusher unit 218a and pusher unit 218b) is sufficiently large for a vehicle (e.g., a tray stack such as tray stack 222a, 222b, or 222c) to be inserted between the two adjacent pusher units. For example, the predetermined distance is set to be equal to the sum of a dimension of the vehicle (e.g., a length, a width, etc.) and a buffer spacing (e.g., 1 to 6 inches, etc.). In various embodiments, the predetermined distance between the pusher units is configurable. For example, system 200 or a human operator adjusts spacing of pusher units by moving a subset of pusher units and/or by removing a subset of pusher units. The pusher units are mounted on drive chain 217 (e.g., bolted to a bracket on a link of drive chain 217, etc.), or integral with the drive chain 217 such as by a ridge or other structure.

In various embodiments, the pusher units are configured to provide support for the pushing (e.g., exerting force on) a vehicle such as tray stack 222a, 222b, or 222c. As drive chain 217 is driven (e.g. by a driving sprocket), the pusher units respectively move and cause vehicles with which the pusher units are engaged to move. The pusher unit may be made of various materials such as metals or alloys. The material of the pusher unit may be selected based on a rigidity and/or hardness to ensure that the pusher unit properly moves the vehicles (e.g., the pusher units do not deform when engaged with the vehicle, or deform less than a predetermined deformation threshold). The pusher units have various profiles that are selected based at least in part on a configuration of an implementation of robotic stack mover system 210. For example, as illustrated in FIG. 2A, pusher units 218a, 218b, 218c, and 218d are sufficiently large (e.g., extend from the drive chain) to engage the corresponding vehicle. As another example, pusher units 218a, 218b, 218c, and 218d comprise a chamfer at a proximal end of the pusher units 218a, 218b, 218c, and 218d (e.g., the end connected to drive chain 217). The chamfer on the pusher units is configured based on a size and geometry of robotic stack mover system 210 (e.g., the geometry of the drive chain 217 when sufficiently taut between driving unit 212 and tensioning unit 214). For example, the chamfer is configured to ensure that a pusher unit has clearance at driving unit 212 and tensioning unit 214 during recirculation of drive chain 217. As illustrated in FIG. 2A, pusher unit 218d is recirculating (e.g., changing direction) at an end of robotic stack mover system 210 at which tensioning unit 214 is located. As pusher unit traverses the curvature of the recirculation, the chamfer ensures provides sufficient clearance between the pusher unit and adjacent pusher units, other links in drive chain 217, etc. In some embodiments, a pusher unit has a chamfer on a distal end (e.g., an end opposing the end attached to the drive chain). For example, pusher unit 238b of robotic stack mover system 230 comprises a chamfer at the distal end and the proximal end. A chamfer on the distal end of a pusher unit promotes the insertion/removal of vehicles from a space between adjacent pusher units. For example, the chamfer on the distal end serves to guide stacks of trays into and/or out of the space between adjacent pusher units. In various embodiments, pusher units comprise chamfers at the distal end, the proximal end, or both.

In various embodiments, the tray stacks 220, 222a, 222b, 222c are pushed manually into an insertion zone. The insertion zone is located at a beginning of the path which the tray stacks traverse when robotic stack mover system 210 moves the tray stack. For example, as illustrated in FIG. 2A, tray stack 220 is inserted at an end of robotic stack mover system 210 at which driving unit 212 is located. Tray stack 220 is manually inserted into the insertion zone when a pusher unit is not within the insertion zone (e.g., when the tray stack can be inserted between two adjacent pusher units). In various embodiments, insertion of tray stacks is automated. For example, an insertion structure inserts tray stacks at a time determined based on one or more of (i) a location of at least one pusher unit (e.g., relative locations of pusher units are determined if a predetermined spacing between pusher units is known), (ii) a determination that no pusher units are located within insertion zone (e.g., appropriate clearance is provided for proper insertion), (iii) a speed at which drive chain 217 is being inserted, (iv) an order in which tray stacks are to be de-stacked (or filled by stacking of trays, etc.), (v) a manifest corresponding to the particular tray stack (e.g., a list of items on the tray stack, or that are to be loaded onto tray stack), (vi) a state of robot arm 202 or 204, etc. As an example, the insertion structure comprises a conveyor (e.g., a conveyor belt) that moves the tray stack from a source location to the insertion zone. As another example, a robot is controlled to insert the tray stack to the insertion zone. Upon insertion of the tray stack to robotic stack mover system 210, robotic stack mover system autonomously advances the source tray stacks (e.g., tray stacks 222a, 222b, and/or 222c) through the workspace (e.g., defined by robotic stack mover system 210 or guide rail 216). In various embodiments, tray stacks are inserted at other locations where a space between adjacent pusher units is available (e.g., no tray stack occupies the space). For example, tray stack 222b is inserted at its location as robot arm 202 is de-stacking tray stack 222a and/or robot arm 204 is de-stacking tray stack 222c. In some embodiments, tray stacks are inserted at a spacing that comprises at least N pusher units, where N is an integer. For example, in some implementations tray stacks occupy adjacent spaces between pusher units such as shown with tray stacks 222a, 222b, and/or 222c. As another example, in some implementations tray stacks are inserted every other set of pusher units such as to avoid adjacent tray stacks, such as shown with tray stack placeholder 222d. The tray stack placeholders (e.g., spaces with no tray stacks inserted between adjacent pusher units) are implemented to provide clearance between tray stacks and to ensure that robot arms 202, 204 do not collide with adjacent tray stacks while picking and placing items (e.g., trays) to/from tray stacks. In some embodiments, the system uses tray stack placeholders if the system determines that a height of a particular tray stack exceeds a predetermined height threshold.

In some embodiments, tray stacks 222a, 222b, and/or 222c are advanced through/by robotic stack mover system 210 under robotic control. For example, the speed and times at which the tray stacks 222a, 222b, and/or 222c are advanced by/through robotic stack mover system 210 is controlled to facilitate efficient grasping of trays from the tray stacks 222a, 222b, and/or 222c.

In the example shown, a single rail (e.g., rail 205) is disposed along one long side of the robotic stack mover system 210. In this example, two robots, one comprising robot arm 202 and another comprising robot arm 204, are mounted movably, independent of one another, on rail 205. For example, each robot arm 202, 204 is mounted on a self-propelled chassis that rides along rail 205. In various embodiments, each robot arm 202, 204 terminates with an end effector used to perform the kitting operations. In an implementation in which tray stacks are stacked or de-stacked, robot arm 202 or 204 terminate with a tray handling end effector. In an implementation in which objects are picked and placed from the vehicles, robot arm 202, 204 terminate with a suction-based end effector, a pincher end effector, etc. The end effector(s) of robot arm 202 and/or robot arm 204 are operated under robotic control. The robotic control is determined based on a plan for picking/moving/placing the items (e.g., trays) and/or information pertaining to the workspace, such as presence of objects within the range 206 (e.g., workspace) of robot arm 202 or range 208 (e.g., workspace) of robot arm 204

System 200 comprises vision system 245. In various embodiments, vision system 245 obtains the information associated with the workspace of robot arm 202, robot arm 204, or workspace of robotic stack mover system 210 and/or robotic stack mover system 230. Vision system 245 obtains the information associated with the workspace based at least in part on data obtained by one or more sensors (e.g., an image system such as a 2D/3D camera, a laser sensor, an infrared sensor, a sensor array, a weight sensor, etc.). As an example, as illustrated in FIG. 2A, vision system 245 includes a camera 246. Various other types of sensors may be implemented in connection with vision system 245. In various embodiments, system 200 includes a plurality of 3D (or other) cameras, such as camera 246, and uses image and depth data generated by such cameras to generate a three-dimensional view of at least relevant portions of the workspace and scene, such as the scene/state shown in FIG. 2A. In some embodiments, cameras such as camera 246 is used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 245 such as camera 246 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode.

Although a single camera (e.g., camera 246) mounted to a wall in the workspace of system 200 is shown in FIG. 2A, in various embodiments, multiple cameras or other sensors, or a combination thereof, are mounted statically in a workspace. In addition, or instead, one or more cameras or other sensors are mounted on or near each robot arm 202, 204, such as on the arm itself, and/or on the end effector of the corresponding robot arm, and/or on a structure that travels with the robot arm 202, 204 as it is moved along rail 205.

A robotic control system (e.g., a computer that controls robot arm 202, robot arm 204, and/or robotic stack mover system 210, such as control computer 248) controls the end effector to actuate the opening/closing of the end effector such as in connection with grasping or releasing a tray and/or the moving of tray stacks 222a, 222b, 222c, such as by driving drive chain 217. The robotic control system controls robotic stack mover system 210 and/or robot arms 202, 204 (e.g., the end effector) based at least in part on (i) image data of the workspace (e.g., obtained using vision system 245), (ii) one or more sensors comprised in (or connected to) the corresponding end effector, and/or (iii) one or more sensors comprised in (or connected to) robotic stack mover system 210 (or robotic stack mover system 230). In some embodiments, the robotic control system controls robotic stack mover system 210 and/or robot arms 202, 204 (e.g., the end effector) based at least in part on information pertaining to one or more tray stacks such as an identifier of the tray stacks, a manifest of the tray stacks, an order corresponding to the tray stacks, etc. In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

The respective robot arms 202, 204 are operated at the same time, fully autonomously, to pick trays from tray stacks 222a, 222b, and/or 222c and place them on destination tray stacks, such as destination tray stacks 240a, 240b, and/or 240c, in a destination tray stack assembly area on an opposite side of rail 205 from robotic stack mover system 210 and tray stacks 222a, 222b, and/or 222c. The destination tray stacks are assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective tray stacks 222a, 222b, and/or 222c and stacking them on a corresponding destination tray stack 240a, 240b, and/or 240c. Completed destination tray stacks 240a, 240b, and/or 240c are removed from the destination tray stack assembly area, as indicated by arrows, e.g., to be place on trucks, rail cars, containers, etc. for delivery to a further destination, such as a retail store.

In various embodiments, system 200 comprises robot stack mover system 230 such as in connection with moving destination tray stacks 240a, 240b, 240c (e.g., along a path corresponding to a direction of a guide rail 236 of robot stack mover system 230, or a direction of rail 205 along which robot arms 202, 204 traverse. Robot stack mover system 230 is implemented to provide a structure to move destination tray stacks 240a, 240b, 240c to facilitate moving stacks within range of a particular robot arm, or to allow insertion of additional destination tray stacks as other destination tray stacks are completed. As an example, if tray stack 222a comprises a tray including objects different from tray stacks 222b, 222c, and system 200 determines that a set of such objects are to be placed on destination tray stack 240c, system 200 controls robotic stack mover system 230 to move destination tray stack 240c to within range 206 of robot arm 202 (e.g., because tray stack 222a is within range of robot arm 202 but robot arm 202 is unable to reach destination tray stack 240c in the example shown in FIG. 2A).

Referring further to FIG. 2A, in the example shown in the system 200 includes a control computer 248 configured to communicate wirelessly with robotic elements comprising system 200, including in various embodiments one or more of: robotic stack mover system 210; robotic stack mover system 230; the wheeled chassis on which tray stacks 222a, 222b, and/or 222c are stacked (if self-propelled); the robot arms 202, 204 and/or the respective chassis on which the robot arms 202, 204 are mounted on rail 205; and the robotically controlled end effectors of robot arms 202, 204. In various embodiments, the robotic elements are controlled by control computer 248 based on input data, such as invoice, order, and/or manifest information, as well as input state information (e.g., information pertaining to the workspace such as obtained by vision system 245), such as inventory data indicating which source tray stacks include which type and/or quantity of product.

Tray stacks 222a, 222b, 222c are inserted into a gate or other ingress/control structure at the input end of robotic stack mover system 210 (e.g., where tray stack 220 is inserted into robotic stack mover system 210). Robotic stack mover system 210 moves the tray stacks 222a, 222b, 222c along a path defined by a direction of rail 205 (or guide rail 216) to optimize throughput and minimize robot displacement, e.g., by minimizing how far and/or often the robot arms 202, 204 must be moved along rail 205 to grasp source trays and place them on respective destination stacks. The tray stacks 222a, 222b, 222c can come in with trays in different orientations/weights/and weight distribution. System 200 uses force and moment control to operate robot arms 202, 204 to insert a thumb or other protrusion gently and securely into a tray and plans its motion and tray trajectory in order to not collide with itself or the environment. In various embodiments, each robot arm 202, 204 operates in a very tight space of roughly 2.5 m in width and has a very light footprint. The robot (e.g., via control of control computer 248) utilizes its full workspace and intelligently plans its motion optimizing its grasp and/or efficiency (e.g., time, collision avoidance, etc.) in de-stacking the tray stacks 222a, 222b, and/or 222c. System 200 (e.g., control computer 248) recognizes the need to perform orientation changes and handles that accordingly while avoiding obstacles. The robot moves to the correct output (destination tray stack 240a, 240b, 240c) corresponding to the right customer while coordinating with the other robots on the rail 205. System 200 then uses advanced force control and interactions with the environment to figure out a proper place strategy. The cycle then restarts.

Although system 200 illustrates an operator inserting stack 220 to the input end of robotic stack mover system 210, in various embodiments system 200 comprises a robotic stack pusher system (not shown) that inserts (e.g., pushes) a stack (e.g., stack 220) to an input end (which may also referred to herein as a destination location or end position for the robotic stack pusher system or a payload introduction location of a robotic stack mover system) of robotic stack mover system 210. The input end of robotic stack mover system 210 is a conveyance structure (e.g., a conveyor, etc.). In some embodiments, robotic stack pusher system pushes the stack from a buffer zone (e.g., an area comprising a set of stacks to be loaded to robotic stack mover system) to the input end of robotic stack mover system 210. Control computer 248 controls both the robotic stack pusher system and robotic stack mover system 210. For example, control computer 248 controls the robotic stack pusher system and robotic stack mover system 210 in coordination to input stacks to the system and to process the stacks (e.g., moving the stacks through the robot workspace and using robot arms 202, 204 to perform kitting operations, etc.). The robotic stack pusher system engages and pushes a stack to the input end until the system determines that the stack is engaged by robotic stack mover system 210, such as by a pusher on robotic stack mover system 210.

Robotic stack mover system 230 may be similar to robotic stack mover system 210. For example, robotic stack mover system 230 includes driving unit 232, tensioning unit 234, guide rail 236, drive chain 237, and a set of pusher units such as pusher units 238a, 238b, and 238c. In various embodiments, a robotic stack mover system includes a driving unit and a tensioning unit disposed at opposing ends of a guide rail. As illustrated using robotic stack mover system 210 and robotic stack mover system 230, sides at which the driving units and tensioning units are respectively located may be interchangeable.

Although in the example shown in FIG. 2A, system 200 comprises robotic stack mover system 210 and robotic stack mover system 230, in various embodiments, system 200 includes one robotic stack mover system, or system 200 is configured such that a robotic stack mover system is not included on a side of robot opposite another side of the robot arm that includes a robotic stack mover system (e.g., system 200 includes robotic stack mover system 210 but does not include robotic stack mover system 230). Examples of implementations in which robotic stack mover systems are not placed on opposing sides of a robot arm include a system configured to obtain trays from a conveyance structure (e.g., a conveyor, a chute, etc.) to stack trays on vehicles (e.g., tray stacks 222a, 222b, 222c, etc.), or a system configured to de-stack trays from the vehicles (e.g., tray stacks 222a, 222b, 222c, etc.) and to place the respective trays on a conveyance structure to transport the trays to another area of a facility (e.g., the robot arms singulate the trays obtained from the vehicles). In such implementations, the system comprises a conveyance structure on a side of robot arms 202, 204 that opposes the side of robot arms 202, 204 on which robotic stack mover system 210 is disposed. Another example of an implementation in which in which robotic stack mover systems are not placed on opposing sides of a robot arm includes a system in which robot arms are controlled to stack trays or kit sets of items (e.g., objects) from a shelf system or a conveyance system that provides (e.g., carries) the items to the workspace of the robot arms. An example of such an implementation is illustrated in FIG. 2C.

Figure 2B:
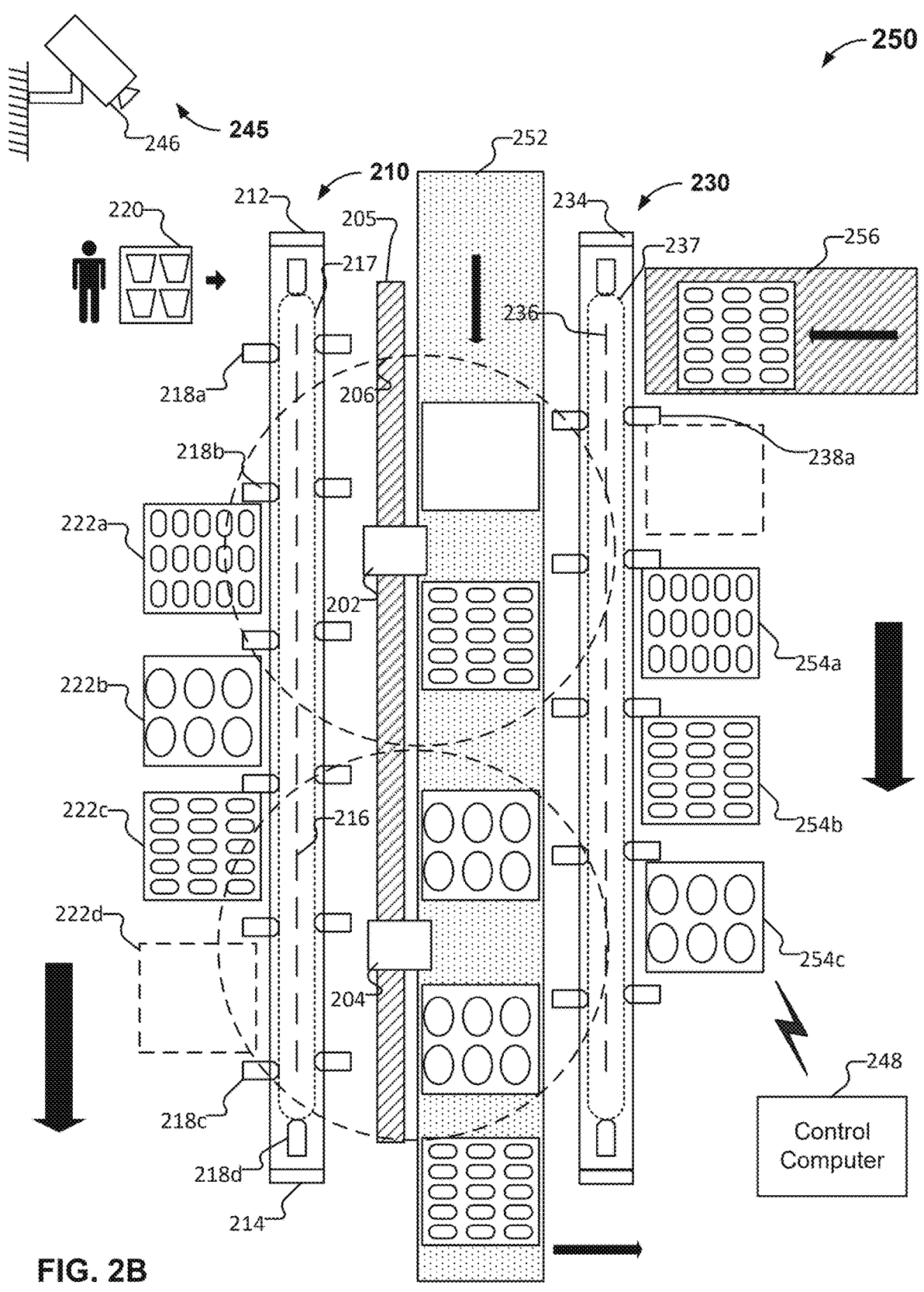
FIG. 2B is a block diagram illustrating a robotic line kitting system according to various embodiments.
Figure 2C:
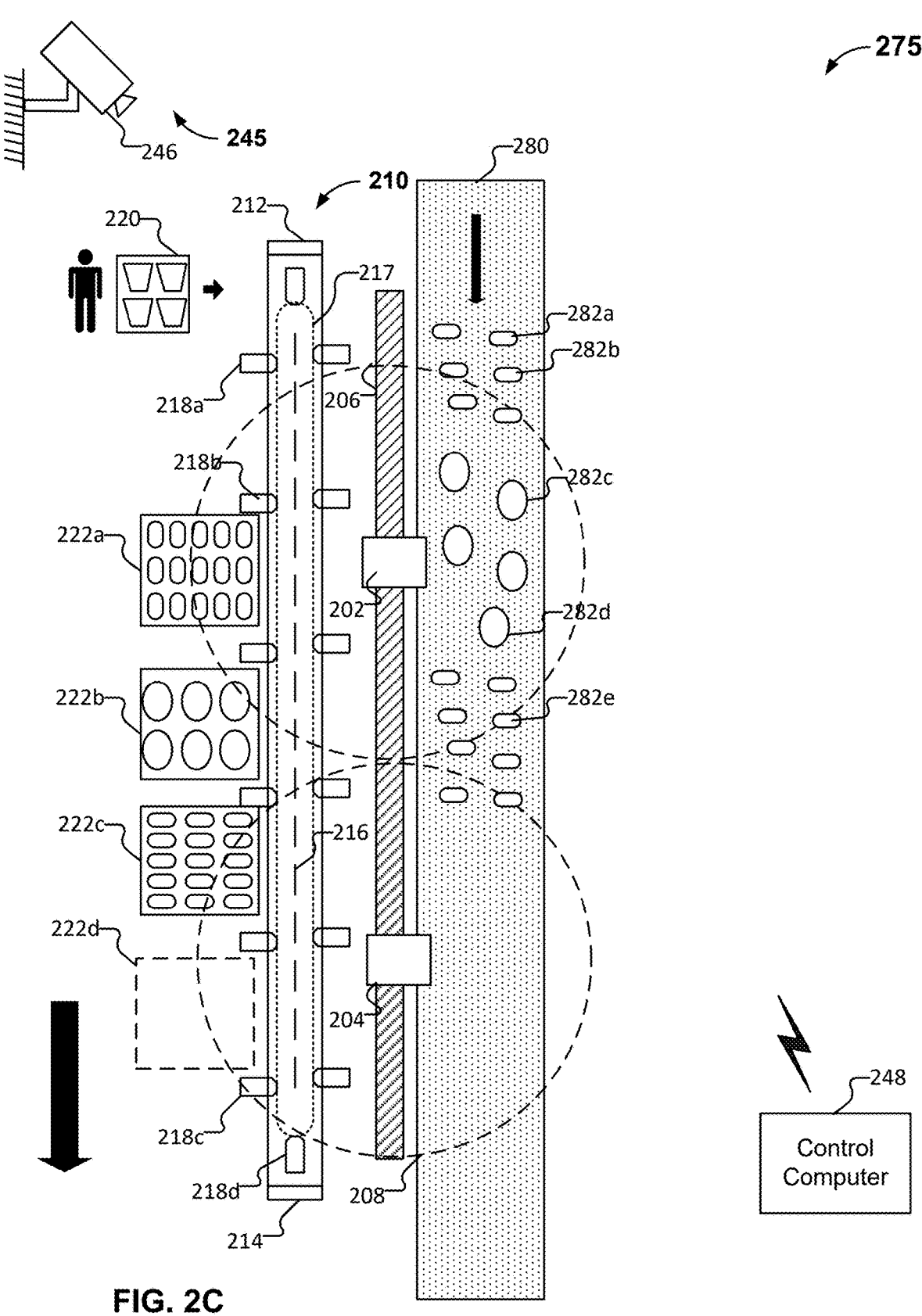
FIG. 2C is a block diagram illustrating a robotic line kitting system according to various embodiments.

FIG. 2B is a block diagram illustrating a robotic line kitting system according to various embodiments. In the example shown in FIG. 2B, tray stacks are inserted on opposing sides of rail 205. In various embodiments, robot arms 202 and 204 are controlled to perform kitting operations with respect to tray stacks 222a, 222b, 222c, 254a, 254b, and/or 254c.

In various embodiments, robot arms 202 and 204 are controlled to de-stack items (e.g., trays) with respect to tray stacks 222a, 222b, 222c, 254a, 254b, and/or 254c. Robot arms 202 pick trays from tray stacks 222a, 222b, 222c, 254a, 254b, and/or 254c and place the trays on a conveyance structure 252, which carries the de-stacked/unloaded trays to a destination location (e.g., another area of a facility). Robotic stack mover system 210 and robotic stack mover system 230 respectively move tray stacks 222a, 222b, and 222c, and tray stacks 254a, 254b, 254c such as to facilitate the de-stacking operation (e.g., to optimize efficiency for robot arms 202, 204 to de-stack the tray stacks, or to provide space for insertion of another tray stack, etc.).

In various embodiments, robot arms 202 and 204 are controlled to stack items (e.g., trays) with respect to tray stacks 222a, 222b, 222c, 254a, 254b, and/or 254c. Robot arms 202 can pick trays delivered via conveyance structure 252 and place the trays on tray stacks 222a, 222b, 222c, 254a, 254b, and/or 254c. The tray stacks 222a, 222b, 222c, 254a, 254b, and/or 254c are stacked according to a manifest such as an order or invoice. Robotic stack mover system 210 and robotic stack mover system 230 respectively move tray stacks 222a, 222b, and 222c, and tray stacks 254a, 254b, 254c such as to facilitate the stacking operation (e.g., to optimize efficiency for robot arms 202, 204 to stack the tray stacks, or to provide space for insertion of another tray stack, etc.).

As illustrated in FIG. 2B, system 250 includes an autonomous tray stack insertion unit 256. The autonomous tray stack insertion unit 256 can be a conveyance structure, such as a conveyor. System 250 (e.g., via control computer 248) controls autonomous tray stack insertion unit 256 to insert tray stacks to a space between adjacent pusher units. System 250 controls autonomous tray stack insertion unit 256 based on a state of robotic stack mover system 230 or a state of one or more tray stacks engaged by robotic stack mover system 230 (e.g., tray stacks 254a, 254b, and/or 254c). As an example, if system 250 comprises a tray stack insertion zone comprising autonomous tray stack insertion unit 256, system 250 determines to insert a new tray stack in response to a determination that a kitting operation has been completed with respect to tray stack 254c (which can be moved to a vehicle return area), such as a determination that a manifest or packing list for tray stack 254c is completed, or the tray stack has reached a threshold height.

According to various embodiments, system 200 comprises one or more robotic stack pusher systems (not shown)

to insert a stack to robotic stack mover system(s) 210, 230, and/or to insert trays to conveyance structure 252. Although the example illustrated in FIG. 2B includes stack 220 being manually inserted by an operator or a stack being inserted (e.g., automatically or robotically) via conveyor 255, system 200 comprises a robotic stack pusher system(s) to insert stacks to an input end of robotic stack mover system 210 or an input end of robotic stack mover system 230. In some embodiments, robotic stack pusher system pushes the stack from a buffer zone (e.g., an area comprising a set of stacks to be loaded to robotic stack mover system) to the input end of robotic stack mover system 210 or robotic stack mover system 230. Control computer 248 controls both the robotic stack pusher system and robotic stack mover system 210. For example, control computer 248 controls the robotic stack pusher system and robotic stack mover system 210 and/or robotic stack mover system 230 in coordination to input stacks to the system and to process the stacks (e.g., moving the stacks through the robot workspace and using robot arms 202, 204 to perform kitting operations, etc.). The robotic stack pusher system engages and push a stack to the input end until the system determines that the stack is engaged by robotic stack mover system 210, such as by a pusher on robotic stack mover system 210 (e.g., pusher unit 218a, etc.) or robotic stack mover system 230 (e.g., pusher unit 238a, etc.).

FIG. 2C is a block diagram illustrating a robotic line kitting system according to various embodiments. In the example shown in FIG. 2C, system 275 comprises robotic stack mover system 210 and a conveyance structure 280. Robotic stack mover system 210 and a conveyance structure 280 are located on opposing sides of the rail along which robot arms 202, 204 traverse. In various embodiments, robot arms 202 and 204 are controlled to perform kitting operations with respect to tray stacks 222a, 222b, and/or 222c. For example, robot arms 202, 204 pick objects (e.g., objects such as 282a, 282b, 282c, 282d, or 282e) from conveyance structure 280 and place the objects on tray stacks 222a, 222b, and/or 222c. As another example, robot arms 202, 204 pick objects from tray stacks 222a, 222b, and/or 222c and place the objects on conveyance structure 280, which carries the objects to a corresponding destination location.

Although in the examples shown in FIGS. 2A, 2B, and 2C the trays each contain only one type of object, in various embodiments and applications source and destination trays having mixes of items are handled to assemble destination stacks of trays as disclosed herein. Similarly, although in the examples shown in FIGS. 2A, 2B, and 2C the source stacks of trays each contain only trays of the same type and content, in other embodiments and applications source tray stacks include a mix of trays and/or item types. For example, the control computer 248 is provided with information indicating which types of trays are in which position in each source tray stack, and uses that information, along with manifest or other information indicating the required contents of each destination tray stack, to build the required destination tray stacks by picking needed trays each from a corresponding position on a source tray stack and adding the tray to a corresponding destination stack.

According to various embodiments, a system combining (e.g., comprising both) a robotic stack pusher system and a robotic stack mover system enables the system to automatically process a set of vehicles (e.g., stacks of trays). The system detects when a particular stack/vehicle is processed (e.g., a kitting operation with respect to the stack/vehicle is complete), and in response to detecting that the particular stack/vehicle is processed (or in anticipation of the processing of the particular/stack vehicle being completed), the system controls the robotic stack mover system moves the stack/vehicle to a stack/vehicle return (e.g., an output end), and the system controls the control the robotic stack pusher system to load a stack/vehicle to an input end (e.g., destination location) of the robotic stack mover system. The system then controls the robotic stack mover system to process the stack/vehicle (e.g., to perform a kitting operation with respect to the stack or vehicle, or other pick/place operation). The system iterates over the moving stacks/vehicles through the workspace using the robotic stack mover system and inputting new stacks/vehicles to the workspace (e.g., to the input end of the robotic stack mover system) using the robotic stack pusher system until no further stacks/vehicles are to be processed.

Figure 3A:
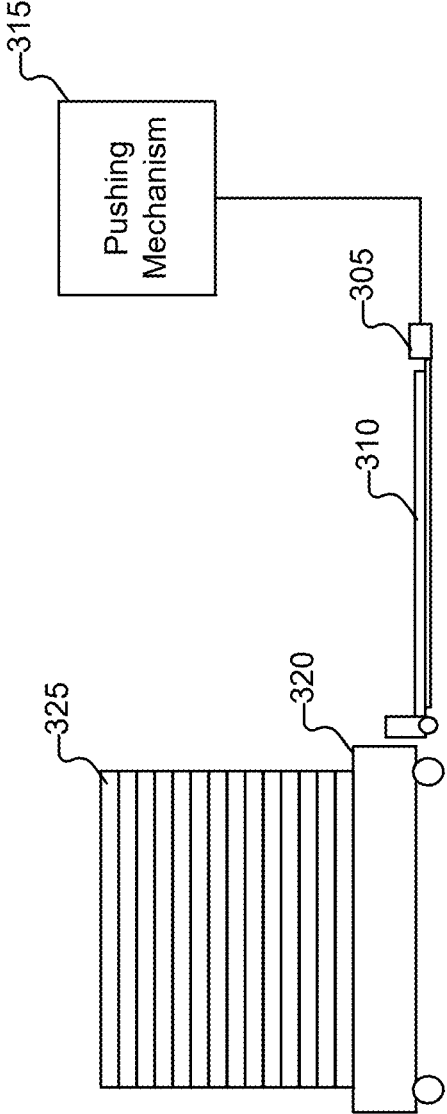
FIG. 3A is a block diagram illustrating a stack pusher system according to various embodiments.

FIG. 3A is a block diagram illustrating a stack pusher system according to various embodiments. In some embodiments, stack pusher system 300 is implemented in connection with system 100 of FIGS. 1A and 1B and/or system 200 of FIGS. 2A, 2B, and/or 2C. For example, stack pusher system 300 may be deployed in a system comprising a robotic stack mover system that is configured to move stacks through a workspace in connection with one or more robot arms performing pick and place operations with respect to the stacks (or with respect to items in the stacks).

In the example shown, stack pusher system 300 comprises an actuation device 305, one or more pusher structures 310, and pushing mechanism 315. Actuation device 305 is configured to move at least one pusher structure of the one or more pusher structures. For example, actuation device 305 is configured to move the at least one pusher in connection with moving (e.g., configuring) the one or more pusher structures between a retracted state and an extended state. Actuation device 305 is actuated (e.g., controlled by a control computer) to cause one or more pusher structures 310 to move to an extended state to move (e.g., push) stack 320. Stack 320 may comprise one or more items, such as one or more items comprised in trays 325. In some embodiments, robotic stack pusher system 300 moves stack 320 to an input end (e.g., a destination location) of a robotic stack mover system. For example, a control computer controls actuation device 305 to move one or more pusher structures 310 to an extended state to insert stack 320 to the input end of a robotic stack mover system.

The example illustrated in FIG. 3A shows robotic stack pusher system 300 in a retracted state (e.g., retracted with respect to a base plate or actuation device 305). In some embodiments, robotic stack pusher system 300 (e.g., a control computer controlling robotic stack pusher system 300) controls pushing mechanism 315 to drive actuation device 305 in connection with moving one or more pusher structures 310. Various pusher mechanisms are implemented to control/apply a force (e.g., a linear force) to at least one pusher structure of one or more pusher structures 310. In some embodiments, the linear force is applied by a linear shaft, the position of which is controlled via an actuating force of pushing mechanism 315. Examples of the pushing mechanism include (i) air or hydraulic pistons, (ii) linear actuators, and (iii) electric motor driven rack/pinion or other linear gear mechanism, etc. Robotic stack pusher system 300 controls pushing mechanism 315 based on information obtained by one or more sensors comprised in a robot workspace, such as based on a model of the workspace generated based on information obtained from a vision system, etc. For example, the system (e.g., the control computer) controls to actuate actuation device 305 based on a state of pick and place operations with respect to a stack/vehicle being processed by a robotic stack mover system. As another example, the system controls to actuate actuation device 305 based on a state of the robotic stack mover system, such as a determination that a vacant stack area/zone is available (e.g., an area between two adjacent pusher units of robotic stack mover system), etc.

In some embodiments, actuation device 305 comprises a linear shaft or other mechanism to apply a linear force to at least one pusher structure of one or more pusher structures 310. As an example, the linear shaft is operatively coupled to at least one pusher structure such that the at least one pusher structure receives a linear force and is caused to move when the linear shaft is controlled to move or apply a force in a direction in which the pusher structure(s) extend towards extended state or in a reverse direction according to which the pusher structure(s) retract towards the retracted state.

Figure 3B:
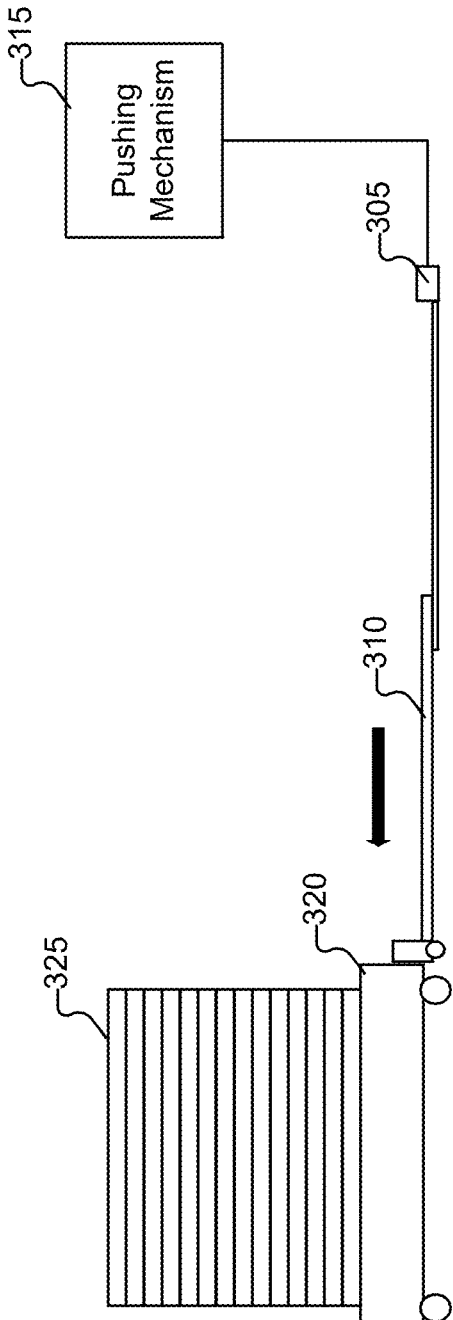
FIG. 3B is a block diagram illustrating a stack pusher system according to various embodiments.

FIG. 3B is a block diagram illustrating a stack pusher system according to various embodiments. In the example shown, actuation device 305 has been controlled to transition one or more pusher structures 310 to an extended state. In response to driving the pushing mechanism 315 and actuating a linear force via actuation device 305, a linear force is applied to one or more pusher structures 310, which in turn push stack 320.

According to various embodiments, a system comprises a stack pusher system (e.g., system 300) and a stack mover system (e.g., system 400). The system controls the stack pusher system and the stack mover system in coordination to cause stack pusher system to insert stacks/vehicles to an input end of the stack mover system, and to cause stack mover system to move the stacks/vehicles through a robot workspace to allow for robot arms to perform pick and place operations with respect to the stacks/vehicles. An example of a robotic stack mover system is described in further detail in connection with FIG. 4.

Figure 4:
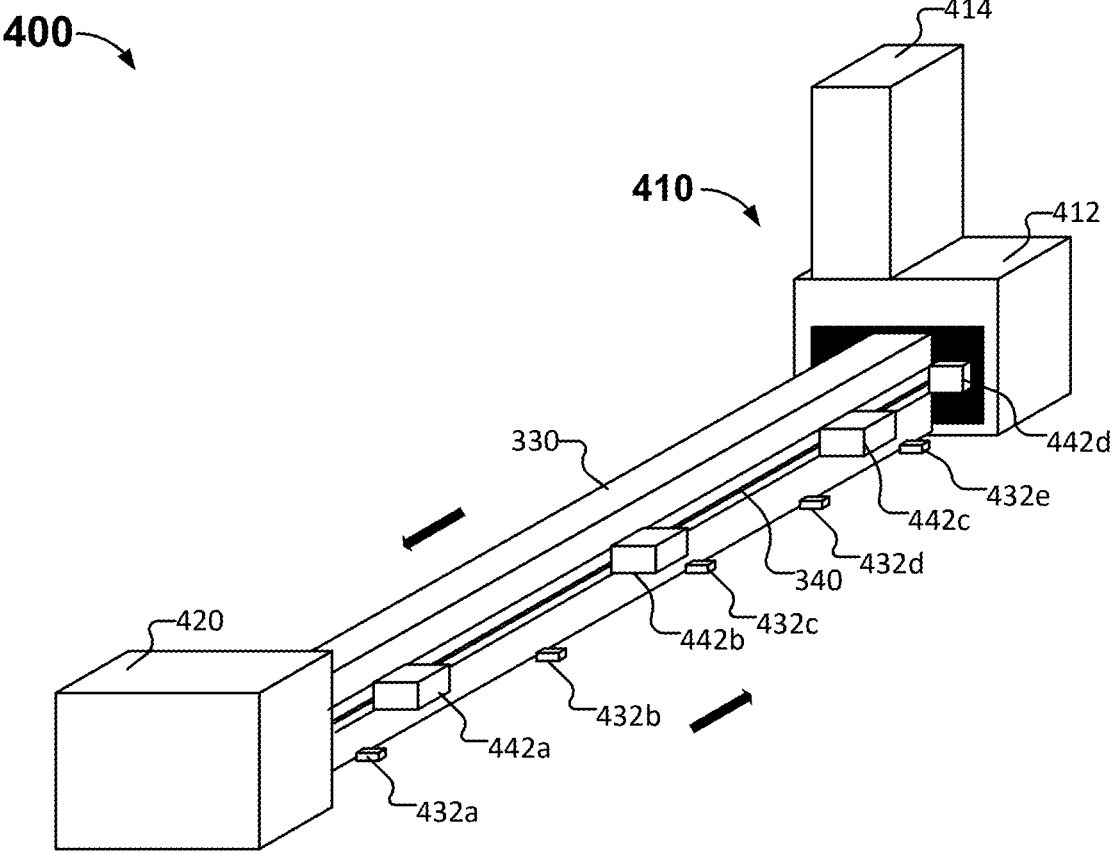
FIG. 4 is a block diagram illustrating an embodiment of a stack mover system.

FIG. 4 is a block diagram illustrating an embodiment of a stack mover system. In the example shown in FIG. 4, system 400 comprises driving unit 410 and tensioning unit 420. Driving unit comprises support structure 412 and motor 414. Motor 414 is configured to control movement of drive chain 440 along the path defined by guide rail 430. In various embodiments, system 400 comprises a set of rail feet, such as rail feet 432a, 432b, 432c, 432d, and/or 432e, to provide support for system 400. The rail feet may be bolted to a surface on which system 400 is located, such as a factory floor.

In various embodiments, rail feet supports two guide rails side-by-side: a first guide rail in which part of drive chain 440 travels from tensioning unit 420 to driving unit 410 (e.g., a drive end), and a second guide rail in which part of drive chain 440 travels from driving unit 410 to tensioning unit 420. As an example, drive chain 440 is guided through the entire system 400. For example, as illustrated in FIG. 4, the drive chain 440 enters the support structure of driving unit 410 or tensioning unit 420 to change a direction of drive chain 440 and to recirculate the drive chain within system 400. In various embodiments, one guide rail is used to engage a vehicle (e.g., pull/push a vehicle along the path), and another guide rail is used to recirculate drive chain 440. The guide rails may be a channel in which a drive chain 440 is located, and the pusher units are mounted to the drive chain 440 and to extend to an exterior of the guide rails. Drive chain 440 comprises a set of pusher units, such as 442a, 442b, 442c, and 442d. As illustrated, pusher unit 442d is being moved into support structure 412 of driving unit 410 at which pusher unit 442 will recirculate to begin moving towards tensioning unit 420. Drive chain 440 are a double pitch chain to which pusher units 442a, 442b, 442c, and 442d are mounted.

According to various embodiments, a pusher unit comprises (or corresponds to) a drive bracket that is configured to be mounted to the drive chain. The drive bracket is mounted to the drive chain at a proximal end of the drive bracket. In various embodiments, the drive bracket comprises one or more chamfers to provide clearance of the drive bracket as the drive bracket traverses the robotic stack mover system, or to promote insertion of a vehicle between two adjacent drive brackets (e.g., to guide the vehicle to the space between the two adjacent guide brackets).

In some embodiments, pusher units include a drive bracket that comprises one or more chamfers at proximal end (e.g., the end closer to the stack), which is connected to the drive chain such as by mounting bolt(s). The chamfers are configured to provide clearance for the drive brackets as the drive brackets move within the robotic stack mover system (e.g., to avoid collisions with a structure of robotic stack mover system such as a driving sprocket or tensioning sprocket, or the drive chain or adjacent drive bracket). The chamfers may also serve to guide stacks/vehicles during insertion of the stacks/vehicles to the robotic stack mover system.

In some embodiments, a robotic stack pusher system is deployed in connection with system 400. The robotic stack pusher system is robotically controlled to insert stacks/vehicles to an input end of robotic stack mover system of system 400. In the example shown, the input end (e.g., the destination location for vehicles being inserted by the robotic stack pusher system) corresponds to an area closer to tensioning unit 420 than foot 432b. As shown, the pusher units 442a, 442b, 442c progress from an end at which tensioning unit 420 is disposed to an end at which driving unit 410 is disposed. Accordingly, the robotic stack pusher system inserts the stack/vehicle at the input end, and the robotic stack mover system of system 400 moves the stack/vehicle through the workspace towards the end at which driving unit 410 is disposed. As an example, by the time the stack/vehicle has moved in proximity to the driving unit 410, a robot arm(s) have completed pick and place operations with respect to the stack/vehicle and the stack/vehicle is moved to a return location.

In some embodiments, the system comprises a stack pusher system to move a payload(s), such as to insert the payload(s) to a stack mover system. The payload is a floor-level payload. Stack pusher system is configured to move payloads of variable height or weight. For example, the payload includes a dolly comprising a set of trays stacked thereon.

Figure 5A:
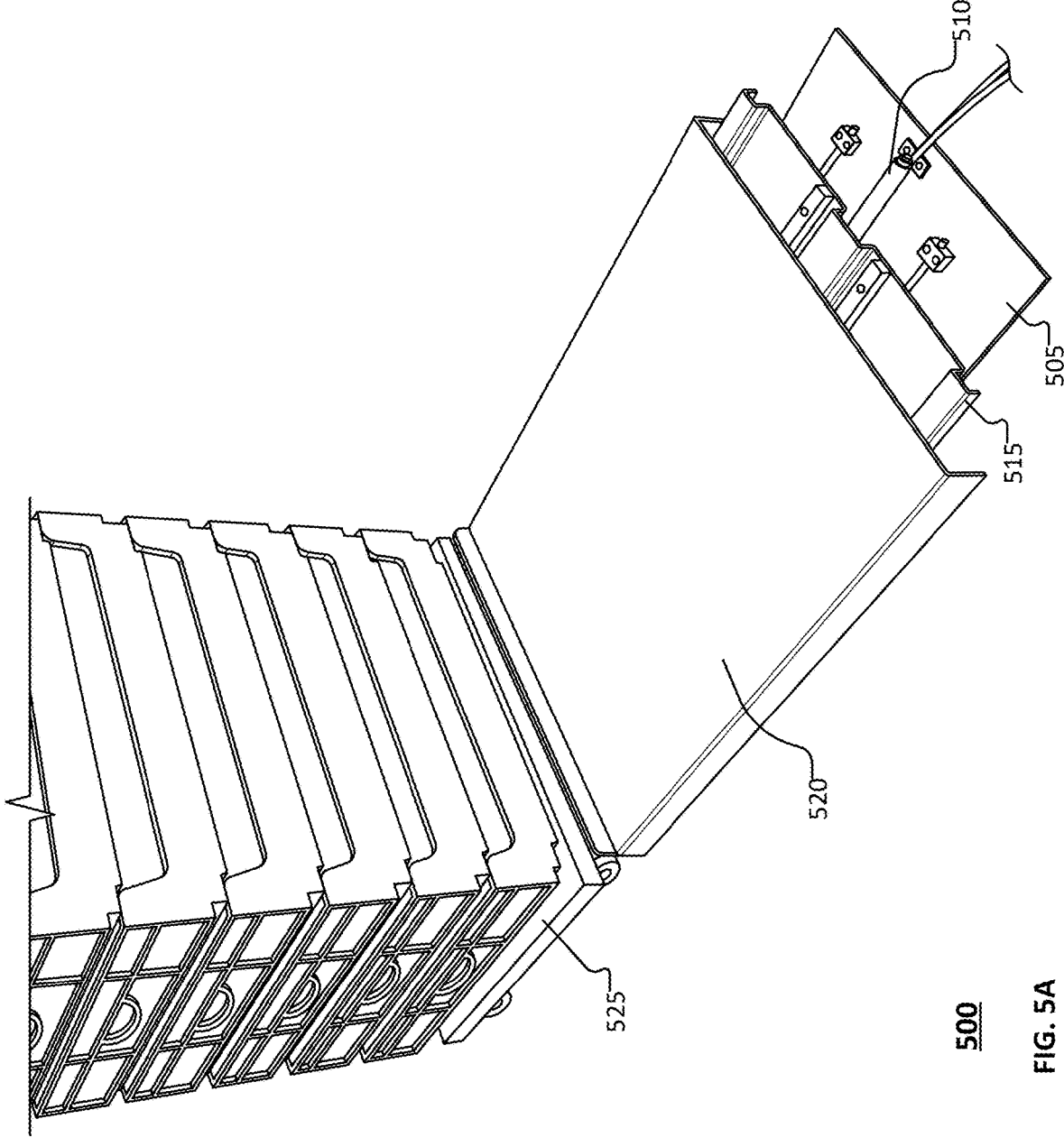
FIG. 5A is a diagram illustrating a stack pusher according to various embodiments.

FIG. 5A is a diagram illustrating a stack pusher according to various embodiments. In some embodiments, robotic stack pusher system 500 comprises a plurality of pusher structures. In the example shown, robotic stack pusher system 500 comprises first pusher structure 515 and stack engagement pusher structure 520. Stack engagement pusher structure 520 (also referred to as a payload engagement pusher structure) engages stack/vehicle 525 and causes stack/vehicle to move, such as in a direction towards an input end of a robotic stack mover system. First pusher structure 515 and/or state engagement pusher structure is operably connected to base plate 505. Robotic stack pusher system 500 is illustrated in substantially a retracted state. For example, robotic stack pusher system 500 is partially extended (e.g., in relation to base plate 505) to provide illustration of the nested configuration of first pusher structure 515 and stack engagement pusher structure 520. As illustrated in FIG. 5A, first pusher structure 515 is partially enveloped by stack engagement pusher structure 520 when in the retracted state.

The system controls a driving mechanism (not shown) to drive/actuate actuation device 510. Actuation device 510 comprises a pushing mechanism that applies a linear force on one or more of first pusher structure 515 and stack engagement pusher structure 520, thereby causing robotic stack pusher system 500 to transition to an extended state (e.g., from a retracted state) or to transition to a retracted state (e.g., from the extended state such as after the stack has been successfully inserted to the robotic stack mover system). Examples of the pushing mechanism include (i) air or hydraulic pistons, (ii) linear actuators, and (iii) electric motor driven rack/pinion or other linear gear mechanism, etc. In the example shown, actuation device 510 has a pushing mechanism comprising an air or hydraulic piston. As an example, if the pushing mechanism comprises an air piston, driving the driving mechanism causes the air piston to move in a linear direction that is substantially parallel with the direction in which the pusher structures extend or retract. The air piston comprises a linear shaft that applies a linear force one or more of first pusher structure 515 and stack engagement pusher structure 520 as the air piston is actuated.

Robotic stack pusher system 500 is deployed in a warehouse or other facility in which stacks/vehicles are processed and pick and place operations are performed with respect to the stacks/vehicles. In some embodiments, robotic stack pusher system 500 is bolted (or otherwise connected) to the facility via base plate 505 (e.g., base plate 505 includes through holes via which robotic stack pusher system 500 is bolted to the ground). As another example, base plate 505 is made of a sufficiently rigid and/or heavy material (e.g., steel) to enable deployment of robotic stack pusher system 500 without being connected to the ground. Base plate 505 is sufficiently heavy to prevent robotic stack pusher system 500 from vibrating and/or moving while being operated.

Figure 5B:
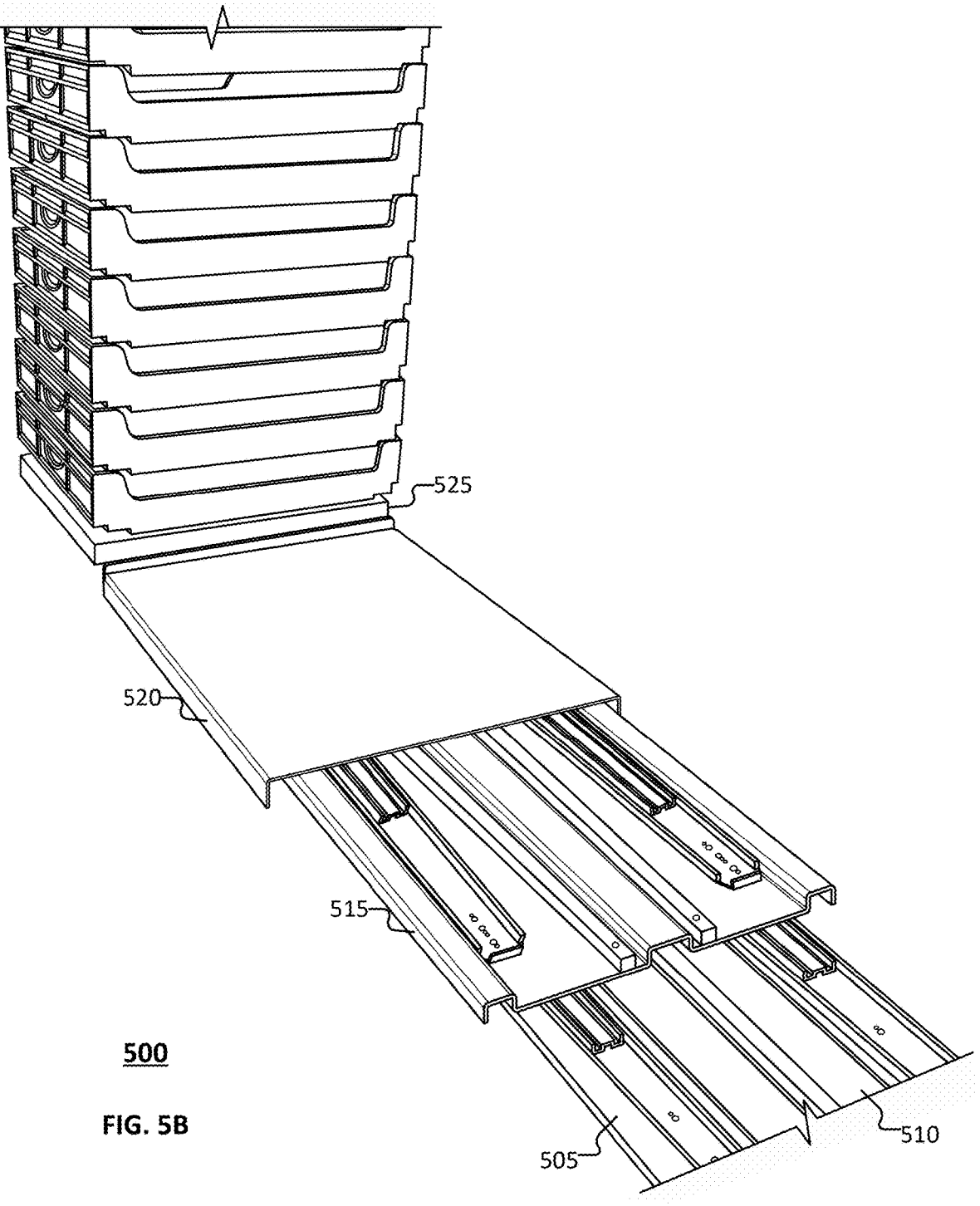
FIG. 5B is a diagram illustrating a stack pusher according to various embodiments.

FIG. 5B is a diagram illustrating a stack pusher according to various embodiments. In the example shown, robotic stack pusher system 500 is configured in an extended state according to which stack engagement pusher structure 520 is extended relative to both first pusher structure 515 and base plate 505, and first pusher structure is extended relative to base plate 505. As actuation device 510 of robotic stack pusher system 500 is controlled to transition robotic stack pusher system 500 to the extended state (e.g., by applying a linear force on one or both of stack engagement pusher structure 520 and first pusher structure 515), stack engagement pusher structure 520 in turn applies a linear force on stack/vehicle 525.

Robotic stack pusher system 500 transitions to a retracted state, such as in response to a determination that a stack/vehicle has been successfully moved to a destination location (e.g., to an input end of the robotic stack mover system). In response to determining to transition the system to the retracted state, the system controls actuation device 510 (e.g., by controlling or otherwise actuating/driving compressed air) to apply a retracting force. For example, actuation device 510 applies the retracting force (e.g., a linear force in a direction opposite to which the force used to extend the system) to one or both of stack engagement pusher structure 520 and first pusher structure 515.

Figure 6A:
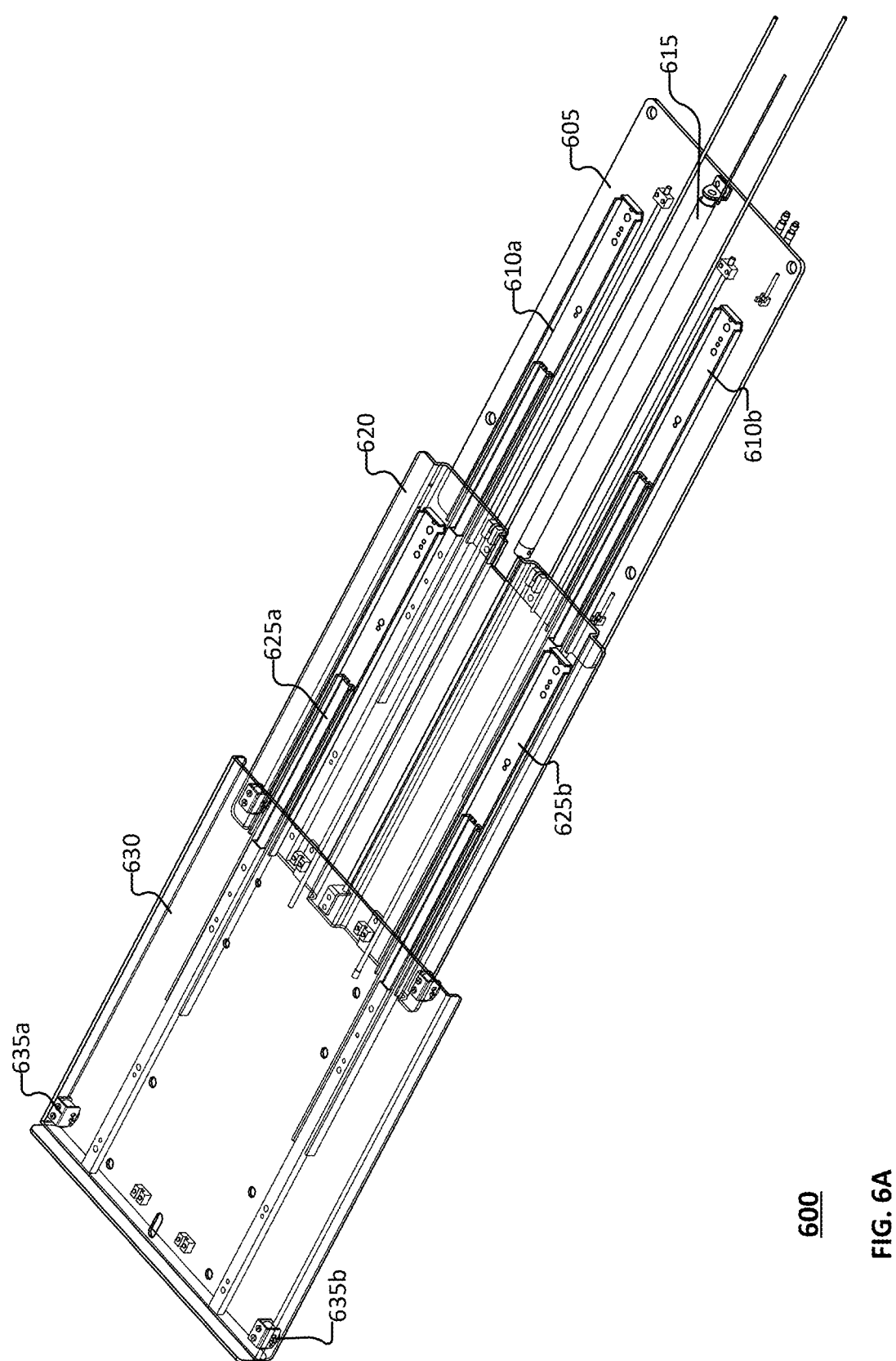
FIG. 6A is a diagram illustrating a stack pusher in an extended state according to various embodiments.
Figure 6B:
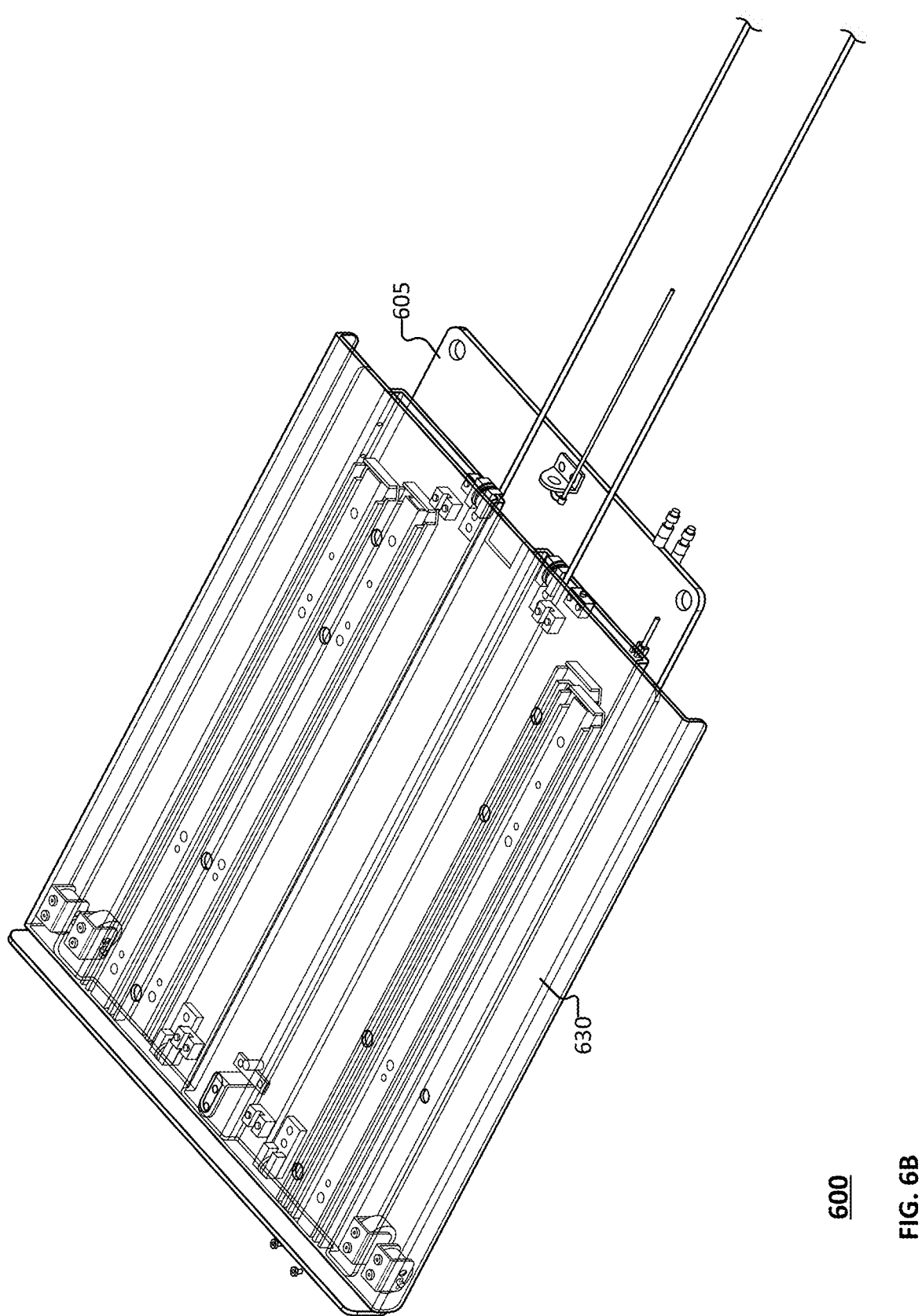
FIG. 6B is a diagram illustrating a stack pusher in a retracted state according to various embodiments.
Figure 6C:
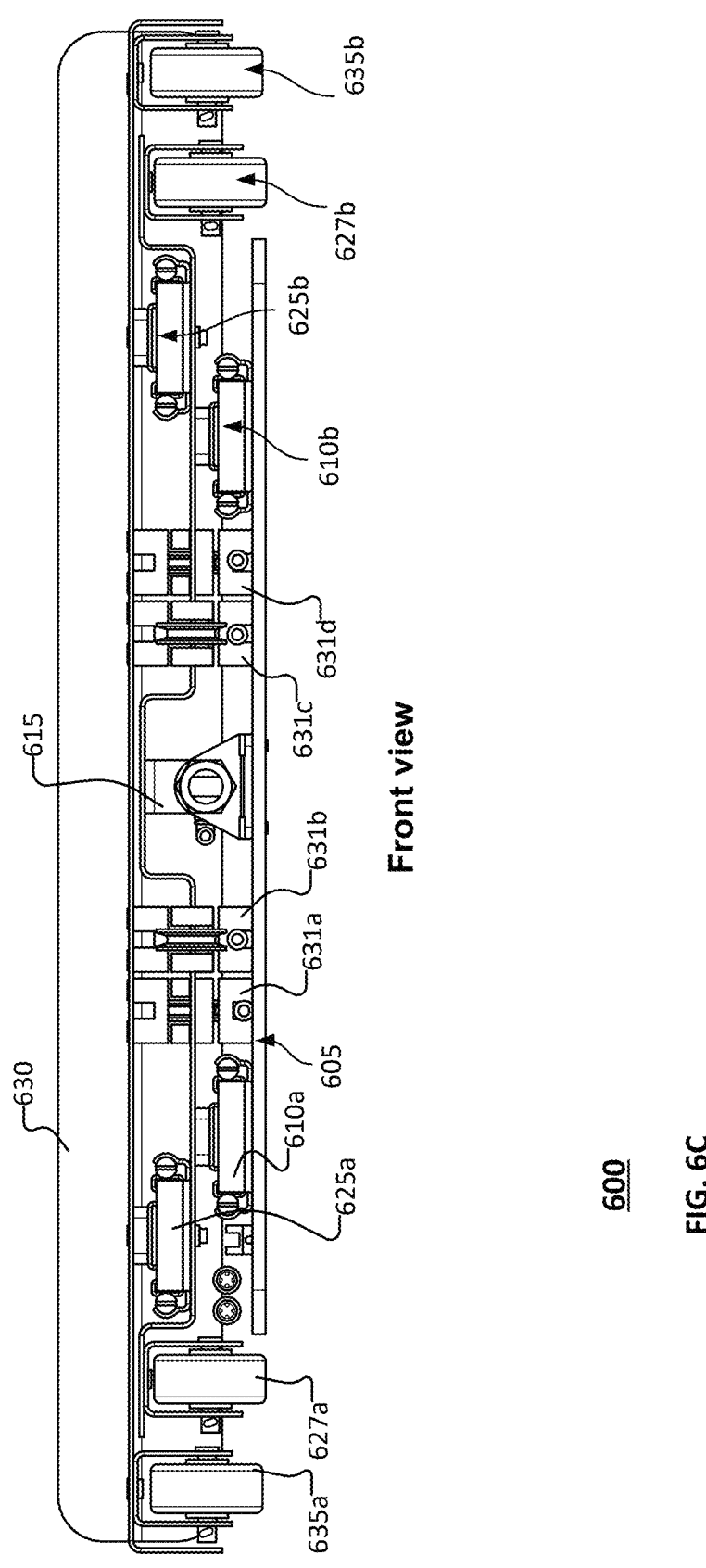
FIG. 6C is a diagram illustrating a front view of a stack pusher in a retracted state according to various embodiments.

FIG. 6A is a diagram illustrating a stack pusher in an extended state according to various embodiments. FIG. 6B is a diagram illustrating a stack pusher in a retracted state according to various embodiments. FIG. 6C is a diagram illustrating a front view of a stack pusher in a retracted state according to various embodiments.

According to various embodiments, stack pusher system 600 comprises N cascading stages (e.g., pusher structures) that extend/retract according to robotic control. N being a positive integer. In some embodiments, the N cascading stages are configured with bearing slides that are powered by a series of pulleys and an air cylinder that allows the N cascading stages to retract and expand on approximately an N:1 ratio (e.g., the N cascading stages are completely nested with respect to each other).

In the example shown, stack pusher system 600 comprises base plate 605 and a plurality of pusher structures (e.g., first pusher structure 620 and stack engagement pusher structure 630). The plurality of pusher structures are controlled to extend or retract relative to base plate 605, such as in connection with inserting a stack to a stack mover system. In some embodiments, the stack pusher system controls to extend/retract the plurality of pusher structure by controlling the application of a linear force by actuation device 615 (e.g., an air piston controlled with compressed air, etc.). The plurality of pusher structures are (partially) supported by one or more wheels that roll on the ground of the warehouse at which stack pusher system 600 is deployed to promote a smooth and efficient transition between the extended state and the retracted state. As an example, as illustrated in FIG. 6A, stack engagement pusher structure 630 is supported by wheels 635a, 635b. Stack engagement pusher structure 630 is further supported by support structures comprised in (or connected to) first pusher structure 620, such as drawer slides 625a, 625b that are configured to move between a retracted state and an expected state to facilitate the extending/retracting of stack engagement pusher structure 630 relative to first pusher structure 620. The support of the pusher structure (e.g., stack engagement pusher structure 630) by wheels and the support structures (e.g., drawer slides) promote a mechanically stable system that is supported over its range of motion (e.g., between extended state and retracted state). Similarly, first pusher structure 620 is supported by wheels or support structures (e.g., wheels 627a, 627b). For example, first pusher structure 620 is at least partially supported via drawer slides 610a, 610b that are comprised in (or connected to) base plate 605.

In the example shown, actuation device 615 is connected one or more of the pusher structures. For example, actuation device 615 applies a linear force to stack engagement pusher structure 630 in connection with controlling extension/retraction of stack engagement pusher structure 630. As stack engagement pusher structure 630 extends to its extended state relative to first pusher structure 620, stack engagement pusher structure 630 applies a linear force to first pusher structure 620 to pull first pusher structure 620 to its extended state relative to base plate 605.

In the example shown in FIG. 6B, stack pusher system 600 is configured in the retracted state. In contrast to FIG. 6A, stack engagement pusher structure 630 completely (or nearly completely) covers first pusher structure 620. For example, first pusher structure 620 is nested within stack engagement pusher structure 630. In the retracted state, both stack engagement pusher structure 630 and first pusher structure 620 are retracted relative to base plate 605. Thus, stack pusher system 600 has a compact profile which is space efficient in the retracted state but that promotes control to move stacks in the workspace via controlled extension of the pusher structure(s).

In the example shown in FIG. 6C, stack pusher system 600 comprises pulleys 631*a*, 631*b*, 631*c*, and 631*d* to which the pusher structures are connected and that facilitate the application of the linear force across the pusher structures while stack pusher system 600 is transitioned between the extended state and retracted state.

Figure 6D:
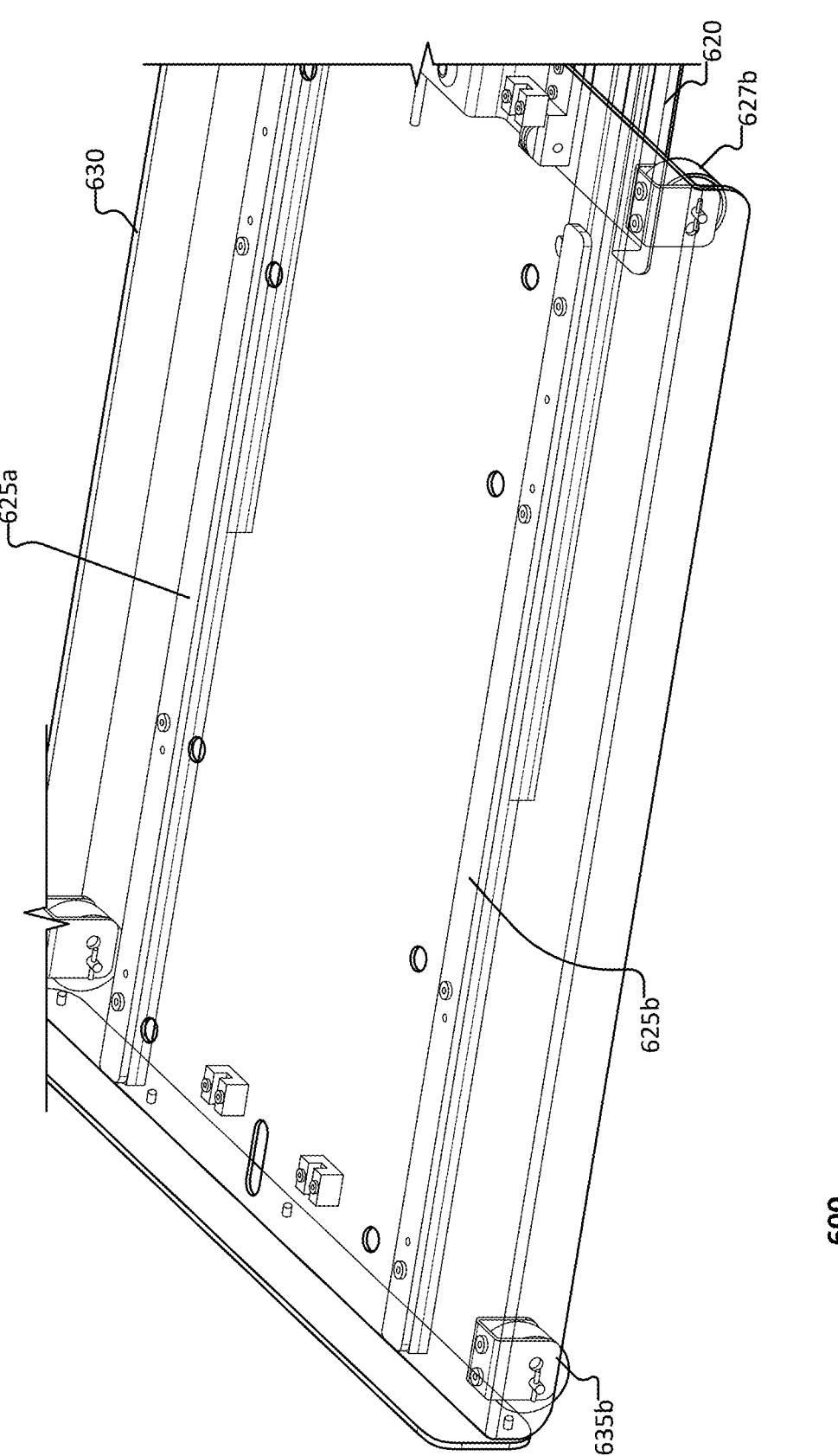
FIG. 6D is a diagram illustrating a stack pusher according to various embodiments.

FIG. 6D is a diagram illustrating a stack pusher according to various embodiments. In the example shown, stack engagement pusher structure 330 is in an extended state relative to first pusher structure 620. The pusher plates are at least partially supported by wheels to facilitate a seamless movement of the pusher plates between the extended and retracted states. For example, first pusher structure 620 is supported by wheels 627*a*, 627*b*. Stack engagement pusher structure 630 is further supported by drawer slides 625*a*, 625*b* (also referred to as drawer glides or drawer runners. The drawer slides used to support the various pusher plates may be ball-bearing drawer slides. In the example shown, drawer slides 626*a*, 625*b* are mounted using an undermount. However, various other mounting techniques may be implemented, such as a side-mount configuration or a center-mount configuration. The drawer slides may have various extension configurations based on the required throw of stack pusher system 600 and/or the maximum depth (e.g., maximum permitted length for a particular pusher structure). As an example, the drawer slides used to support the pusher structures provide a partial extension (e.g., an extension of about ⅔ of the drawer slide's folded length). As another example, the drawer slides used to support the pusher structures provide a full extension (e.g., an extension of about 100% of the drawer slide's folded length). Drawer slides that support the full extension have at least 3 beams. As another example, the drawer slides used to support the pusher structures provide an over extension. As an example, an over extension is an extension that is greater than the folded length. As an example, an over extension is an extension that is 150% the folded length of the drawer slide. Various other ranges of drawer slide extensions may be implemented.

According to various embodiments, a stack pusher system comprises one or more sensors. The system uses information obtained by the one or more sensors in connection with controlling the stack pusher system, such as to determine the state of the stack pusher (e.g., an extended state, a retracted state, an intermediate state, etc.), and to control the transition of the stack pusher to a desired state. The one or more sensors obtain information pertaining to a location or state of a pusher structure, an amount of force being applied by the actuation device, a speed at which the pusher structures are extending or retracting, an indication of whether a stack/vehicle is engaged by the stack pusher system (e.g., by the stack engagement pusher structure). Examples of types of sensors that may be implemented include cameras, infrared, force sensors, light sensors, proximity sensors, pressure sensors, or other position sensors.

Figure 6E:
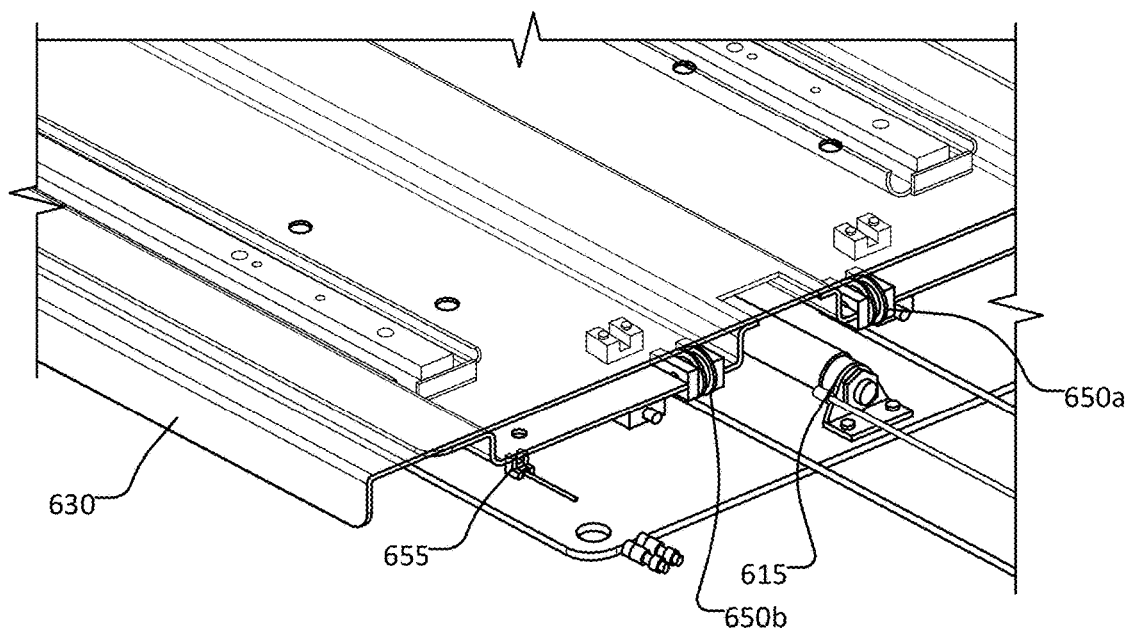
FIG. 6E is a diagram illustrating a stack pusher according to various embodiments.
Figure 6E:
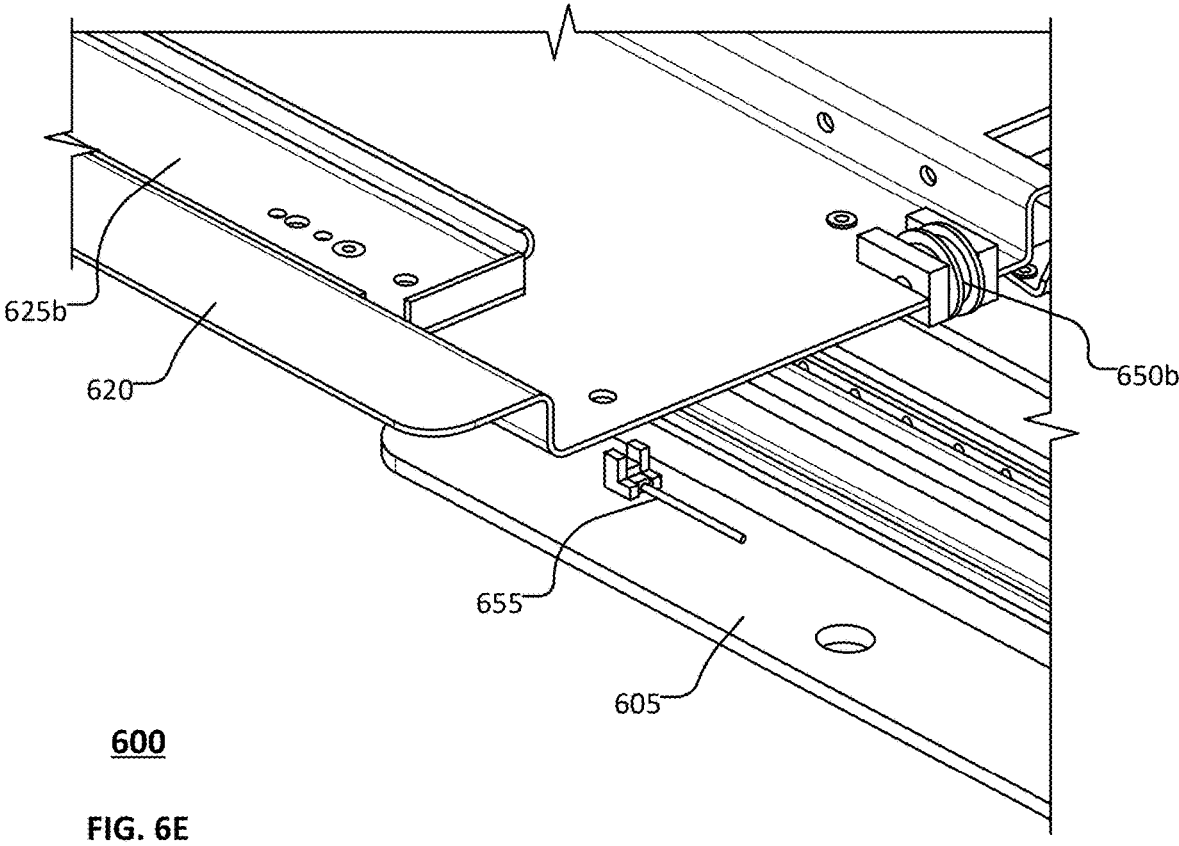

FIG. 6E is a diagram illustrating a stack pusher according to various embodiments. Stack pusher system 600 comprises one or more sensors to detect a position or state of the pusher structures. In the example shown, stack pusher system 600 comprises a light gate 655. Light gate 655 is used to detect a position of at least first pusher structure 620. For example, the system uses light gate 655 to determine whether first pusher structure 620 is retracted. As another example, the system uses light gate 655 to determine whether first pusher structure 620 is extended or an extent to which first pusher structure 620 is extended. Although the example shown only includes a single light gate 655, stack pusher system 600 comprises a plurality of sensors. For example, a light gate is disposed on the other side of base plate 605 and/or first pusher structure 620.

Figure 7:
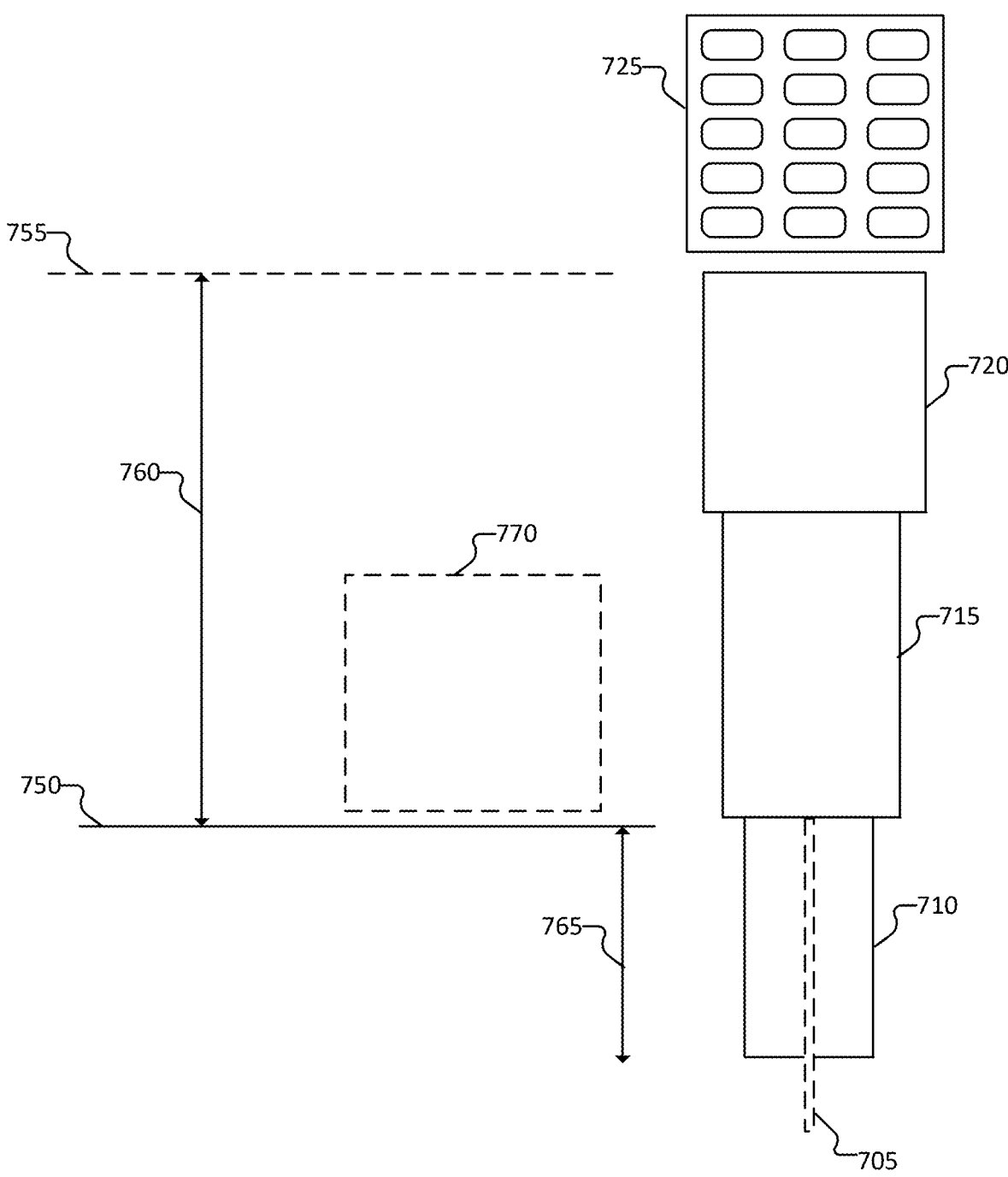
FIG. 7 is a diagram illustrating a stack pusher according to various embodiments.

FIG. 7 is a diagram illustrating a stack pusher according to various embodiments. In the example shown, stack pusher system 700 moves pusher structures from start position 750 to end position (e.g., the distance between start position 750 and the end position corresponding to distance 760) such as to move stack 725 to a destination location (e.g., an input end to a robotic stack mover system).

Stack pusher system 700 comprises a telescoping design in which a plurality of pusher structures extend telescopically extend as the pusher structures move from start position 750 to the end position (e.g., the distance between start position 750 and the end position corresponding to distance 760). The configuration of stack pusher system 700 promotes a reduced expense and required space for stack pusher system 700 that is configured to extend a distance 760 corresponding to the throw of stack pusher system 700. In the retracted state, stack pusher system 700 has a length corresponding to depth 765. As actuation device 705 is driven to apply a linear force on the pusher structures, first pusher 715 and stack engagement pusher 720 (e.g., pusher structures) telescopically extend towards end position 755.

In some embodiments, the required throw of the stack pusher system 700 is greater than a maximum depth for stack pusher system 700. As illustrated in FIG. 7, the required throw corresponding to distance 760 is greater than the maximum depth of stack pusher system (e.g., depth 765) when configured in the retracted state. The telescopic or nested configuration of the pusher structures enables system 700 to extend the required throw while only having a maximum depth 765 when retracted.

Stack pusher system 700 includes one or more intermediate pusher structures (not shown) between first pusher 715 and stack engagement pusher structure 920. For example, stack engagement pusher 700 comprises the one or more intermediate pusher structures if the required throw 960 is more than two times depth 765. For example, if stack pusher system 700 has a maximum depth of depth 765 when retracted, each of first pusher 715 and stack engagement pusher 720 has a depth/length less than or equal to depth 765. In some embodiments, one or more intermediate pusher structures respectively have a depth/length less than or equal to depth 765, and are connected to first pusher 715 and stack engagement pusher 720 in a nested configuration such that the one or more intermediate pusher structures similarly telescopically extend/retract.

In some embodiments, start position 750 corresponds to a location at which stack 770 is inserted to stack pusher system 700. For example, stack 770 is staged as illustrated in FIG. 7 until being inserted to stack pusher system 700. In some embodiments, stack 770 is inserted to stack pusher system 700 by a buffer conveyance structure. The buffer conveyance structure can move stack 770 from a buffer/staging area to the input end/insertion zone for stack pusher system 700.

Figure 8:
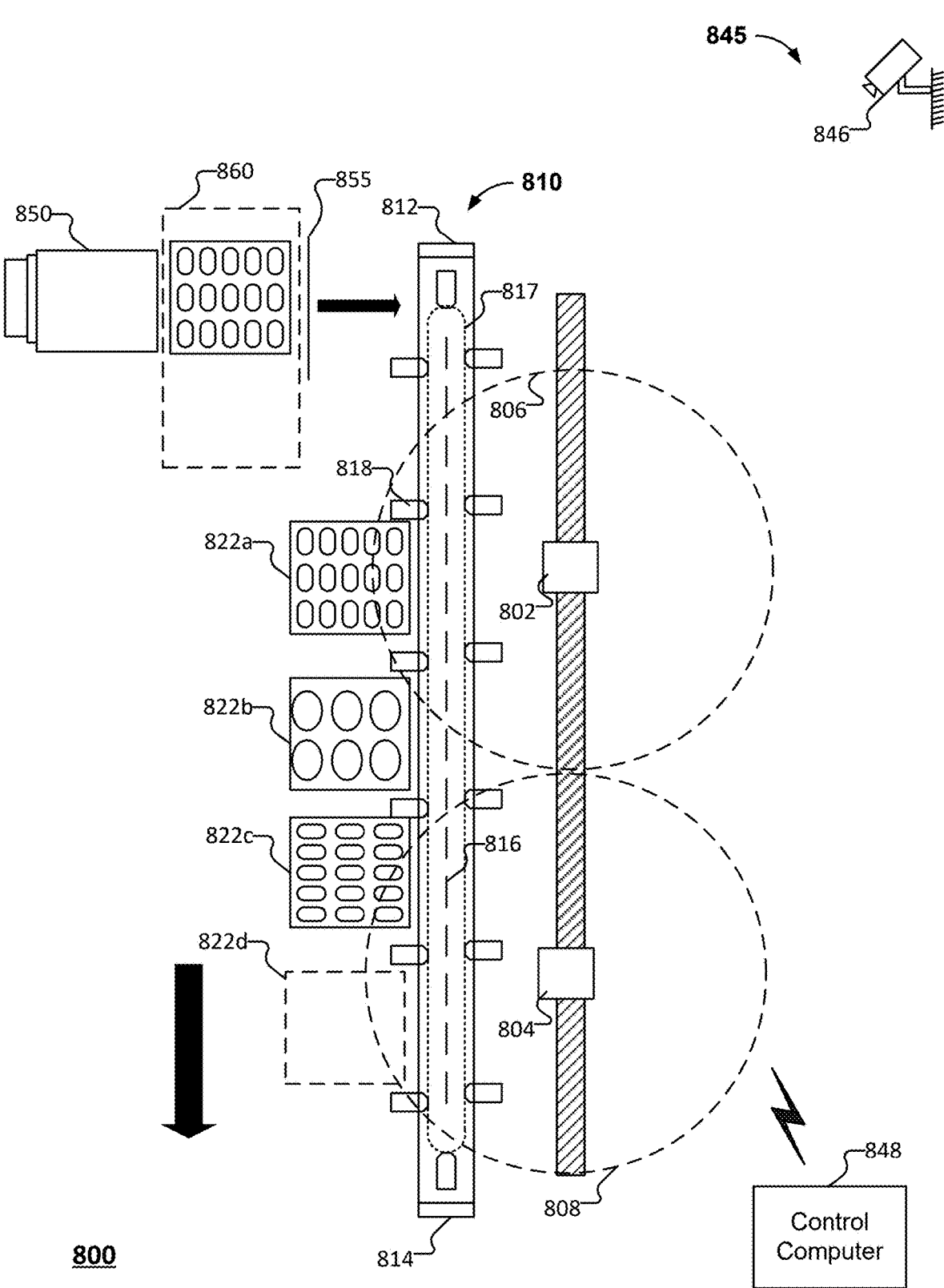
FIG. 8 is a diagram illustrating a stack pusher and stack mover according to various embodiments.

FIG. 8 is a diagram illustrating a stack pusher and stack mover according to various embodiments. In the example shown, system 800 comprises stack pusher system 850 deployed alongside stack mover system 810. System 800 uses stack pusher system 850 to insert (e.g., push) stacks to an input end of stack mover system 810. In response to determining that a stack is inserted to the input end of stack mover system 810, system 800 uses stack mover system 810 to move the stack through the workspace, such as to within range of one or more robot arms (e.g., robotics arm 802, 804).

In some embodiments, stack pusher system 850 comprises one or more pusher structures (e.g., a stack engagement pusher structure, a first pusher structure, etc.) that telescopically extend, thereby pushing stacks towards the input end of stack mover system 810. System 800 further comprises control computer 848 that is controls stack pusher system 850. For example, control computer 848 determines a plan for operating stack pusher system 850 (e.g., inserting/pushing a stack to an input end of stack mover system 810. Control computer 848 controls stack pusher system 850 to transition the one or more pusher structures from a retracted state to the extended state. In response to determining that the stack is inserted to the input end of stack mover system 810, control computer 848 controls stack pusher system 850 to retract the one or more pusher structures to the retraction state. When the stack pusher system 850 is retracted, a next stack may be loaded for insertion/pushing by stack pusher system 850.

In some embodiments, the stack(s) to be loaded to stack mover system 810 are buffered/staged in buffer zone 860. Buffer zone 860 is disposed between stack pusher system 850 and stack mover system 810. For example, buffer zone 860 is disposed at a distance from stack mover system 810 that is equal to or less than the expected or required throw of stack pusher system 850 (e.g., the distance that the stack pusher system 850 is to move the stacks). Buffer zone 860 comprises a plurality of stacks that are queued for insertion to stack mover system 810. In some embodiments, a buffer conveyance structure is comprised in buffer zone 860. As an example, the buffer conveyance structure is a robotically controlled conveyor. The buffer conveyance structure is configured to move a next stack into a location at which stack pusher system 810 is to engage the stack (e.g., an input end to stack pusher system 810). In some embodiments, control computer 848 controls the buffer conveyance structure to advance the next stack to the location at which stack pusher system 810 is to engage such next stack. For example, control computer 848 controls the buffer conveyance structure in coordination with stack pusher system 850 in connection with inserting stacks to stack mover system 810.

In some embodiments, system 800 comprises gating structure 855. Gating structure 855 is part of stack pusher system 850, buffer zone 860 (e.g., part of the buffer conveyance structure), or a standalone device. Gating structure 855 is configured to mediate insertion of stacks to stack mover system 810. For example, gating structure 855 comprises a gate that is robotically controlled, such as by control computer 848. Gating structure 855 is disposed between buffer zone 860 and stack mover system 810 in order to prevent/impede stacks from entering the input end of stack mover system 810 when the gate closed and to permit stacks to be inserted to the input end of stack mover system 810 when the gate is open. In some implementations, gating structure 855 is disposed between stack pusher system 850 and buffer zone 860, or system 800 comprises a plurality of gating structures—one disposed between stack pusher system 850 and buffer zone 860, and the other disposed between buffer zone 860 and stack mover system 810.

Control computer 848 controls actuation of the gate to move the gate to an open position or a closed position. In some embodiments, control computer 848 controls gating structure 855 (e.g., actuation of the gate) in coordination with stack mover system 810 or otherwise based on information pertaining to the workspace or state of stack mover system 810. Gating structure 855 comprises one or more sensors, such as light sensors or cameras that are used to detect one or more of whether a stack is loaded to buffer zone 860, a queue of stacks in buffer zone 860, a state of the gate (e.g., whether the gate is open or closed), etc. Control computer 848 controls gating structure 855 based at least in part on information obtained by the one or more sensors of gating structure 855 or one or more sensors disposed elsewhere in system 800 (e.g., a vision system of system 800). For example, control computer 848 controls gating structure 855 based at least in part on one or more of (i) a determination of whether the input end of stack mover system 810 is vacant, (ii) a determination that a stack is being output from stack mover system 810 (e.g., after robot arms 802, 804 have completed a kitting operation with respect to such stack), and (iii) a determination that robot arms in the workspace have completed an operation with respect to a stack being moved by stack mover system 810 through the workspace (e.g., the robot arms have completed a kitting operation to unload or load tray(s) of a stack). Various other factors may be used in connection with controlling gating structure 855 to open/close the gate.

System 800 uses robotic stack mover system 810 to move (e.g., along a path) tray stacks 822a, 822b, and 822c (e.g., or vehicles in which stacks of trays are comprised or are to be loaded) in position for robot arms 802 and 804 to perform kitting operations such as de-stacking tray stacks 822a, 822b, and 822c, or stacking trays or placing items on trays of stacks of trays. In some embodiments, system 800 controls robotic stack mover system 810 to move tray stacks 822a, 822b, and 822c to respective locations within, or in proximity to, workspaces of robot arms 802 and 804 (e.g., which may correspond to ranges 806 and 808). Robotic stack mover system 810 autonomously moves stacks of trays (or other vehicles) that are inserted to robotic stack mover system 810 (e.g., a predefined insertion location, between pusher units, etc.). Stack mover system 810 is controlled in coordination with stack pusher system 850, or additionally, a buffer conveyance in buffer zone 860 and/or gating structure 855.

In various embodiments, robotic stack mover system 810 includes a driving unit 812 configured to move tray stacks 822a, 822b, and 822c such as by driving a mechanism to apply respective forces on tray stacks 822a, 822b, and 822c. As an example, the driving unit 812 comprises a motor that is driven based at least in part on a determination to move the tray stacks 822a, 822b, and 822c. System 800 controls the motor via computer control such as by control computer 848 operatively connected to robotic stack mover system 810. Driving unit 812 may be similar to, or the same as, driving unit 212 of system 200 of FIG. 2A.

In various embodiments, robotic stack mover system 810 includes tensioning unit 814. Tensioning unit 814 is part of the drive system of robotic stack mover system 810 and ensures the drive system has sufficient tension. In addition, tensioning unit 814 serves as a recirculation point for the drive system (e.g., a drive chain is redirected and recirculated back to driving unit 812). The tensioning unit is configured to adjust/enforce a tension in the drive chain of the system. Tensioning unit 814 may be similar to, or the same as tensioning unit 214 of system 200 of FIG. 2A.

In various embodiments, robotic stack mover system 810 includes drive chain 817. Drive chain 817 traverses the distance between driving unit 812 and tensioning unit 814. Drive chain 817 receives force from driving unit 812 to cause drive chain 817 to move (e.g., to circulate within robotic stack mover system 810). In some embodiments, drive chain 817 is a double-pitch chain having a profile that comprises a hole or recess in which a tooth of a driving sprocket fits for the driving unit to engage drive chain 817. Drive chain 817 may be similar to, or the same as drive chain 217 of system 200 of FIG. 2A. Robotic stack mover system 810 further includes guide rail 816 that is configured to provide support for drive chain 817 to ensure that drive chain 817 traverses a longitudinal direction between driving unit 812 and tensioning unit 814. The longitudinal direction of guide rail 816 is parallel to (or similar to) the direction of rail 805 along which robot arms 802 and 804 (e.g., and on which robot arms 802 and 804 are mounted such as via robot carriages) traverse to pick and place items (e.g., trays, objects from trays, carts, etc.).

In the example shown in FIG. 8, drive chain 817 includes a set of pusher units such as pusher units such as pusher unit 818. The pusher units of the set of pusher units are disposed at a predetermined distance along drive chain 817. The predetermined distance is determined based on a dimension of a tray or tray stack. For example, the predetermined distance is 25% greater than the dimension (e.g., length) of a tray or tray stack. As another example, the predetermined distance is 10% greater than the dimension (e.g., length) of a tray or tray stack. As another example, the predetermined distance is 15% greater than the dimension (e.g., length) of a tray or tray stack. As another example, the predetermined distance is 50% greater than the dimension (e.g., length) of a tray or tray stack. In some embodiments, the predetermined distance between two adjacent pusher units (e.g., pusher unit 818) is sufficiently large for a vehicle (e.g., a tray stack such as tray stack 822*a*, 822*b*, or 822*c*) to be inserted between the two adjacent pusher units. For example, the predetermined distance is set to be equal to the sum of a dimension of the vehicle (e.g., a length, a width, etc.) and a buffer spacing (e.g., 1 to 6 inches, etc.). In various embodiments, the predetermined distance between the pusher units is configurable. For example, system 800 or a human operator may adjust spacing of pusher units by moving a subset of pusher units and/or by removing a subset of pusher units. The pusher units are mounted on drive chain 817 (e.g., bolted to a bracket on a link of drive chain 817, etc.), or integral with the drive chain 817 such as by a ridge or other structure.

In various embodiments, the pusher units are configured to provide support for the pushing (e.g., exerting force on) a vehicle such as tray stack 822*a*, 822*b*, or 822*c*. As drive chain 817 is driven (e.g. by a driving sprocket), the pusher units respectively move and cause vehicles with which the pusher units are engaged to move. The pusher units (e.g., pusher unit 818) may be similar to, or the same as pusher units 218*a*, 218*b*, 218*c*, and 218*d* of system 200 of FIG. 2A. The pusher units may have various profiles that are selected based at least in part on a configuration of an implementation of robotic stack mover system 810.

In various embodiments, the tray stacks 822*a*, 822*b*, 822*c* may be pushed manually into an insertion zone. The insertion zone is located at a beginning of the path which the tray stacks traverse when robotic stack mover system 210 moves the tray stack. For example, as illustrated in FIG. 2A, tray stack 220 is inserted at an end of robotic stack mover system 210 at which driving unit 212 is located. In various embodiments, insertion of tray stacks is automated. For example, the insertion zone corresponds to the input end at which stacks are inserted/pushed by stack pusher system 850. For example, stack pusher system 850 inserts tray stacks at a time determined based on one or more of (i) a location of at least one pusher unit (e.g., relative locations of pusher units are determined if a predetermined spacing between pusher units is known), (ii) a determination that no pusher units are located within insertion zone (e.g., appropriate clearance is provided for proper insertion), (iii) a speed at which drive chain 817 is being inserted, (iv) an order in which tray stacks are to be de-stacked (or filled by stacking of trays, etc.), (v) a manifest corresponding to the particular tray stack (e.g., a list of items on the tray stack, or that are to be loaded onto tray stack), (vi) a state of robot arm 802 or 804, etc. Upon insertion of the tray stack to robotic stack mover system 810, robotic stack mover system autonomously advances the source tray stacks (e.g., tray stacks 822*a*, 822*b*, and/or 822*c*) through the workspace (e.g., defined by robotic stack mover system 810 or guide rail 816). In various embodiments, tray stacks are inserted at other locations where a space between adjacent pusher units is available (e.g., no tray stack occupies the space). For example, tray stack 822*b* is inserted at its location as robot arm 802 is de-stacking tray stack 822*a* and/or robot arm 804 is de-stacking tray stack 822*c*. In some embodiments, tray stacks are inserted at a spacing that comprises at least N pusher units, where N is an integer. For example, in some implementations tray stacks occupy adjacent spaces between pusher units such as shown with tray stacks 822*a*, 822*b*, and/or 822*c*. As another example, in some implementations tray stacks are inserted every other set of pusher units such as to avoid adjacent tray stacks, such as shown with tray stack placeholder 822*d*. The tray stack placeholders (e.g., spaces with no tray stacks inserted between adjacent pusher units) are implemented to provide clearance between tray stacks and to ensure that robot arms 802, 804 do not collide with adjacent tray stacks while picking and placing items (e.g., trays) to/from tray stacks. In some embodiments, the system uses tray stack placeholders if the system determines that a height of a particular tray stack exceeds a predetermined height threshold.

In some embodiments, tray stacks 822*a*, 822*b*, and/or 822*c* are advanced through/by robotic stack mover system 810 under robotic control. For example, the speed and times at which the tray stacks 822*a*, 822*b*, and/or 822*c* are advanced by/through robotic stack mover system 810 is controlled (e.g., by control computer 848) to facilitate efficient grasping of trays from the tray stacks 822*a*, 822*b*, and/or 822*c*.

In the example shown, a single rail is disposed along one long side of the robotic stack mover system 810. In this example, two robots, one comprising robot arm 802 and another comprising robot arm 204, are mounted movably, independent of one another, on rail 805. For example, each robot arm 802, 804 is mounted on a self-propelled chassis that rides along rail 805. In various embodiments, each robot arm 802, 804 terminates with an end effector used to perform the kitting operations. In an implementation in which tray stacks are stacked or de-stacked, robot arm 802 or 804 terminates with a tray handling end effector. In an implementation in which objects are picked and placed from the vehicles, robot arm 202, 204 terminates with a suction-based end effector, a pincher end effector, etc. In some embodiments, robot arm 202, 204 terminates with (e.g., has mounted thereon) a multi-mode end effector. The multi-mode end effector comprises a first grasping mechanism and a second grasping mechanism. The first grasping mechanism is configured to use a suction-based end effector to grasp objects. The second grasping mechanism is configured to use a set of gripper arms to grasp objects. The end effector(s) of robot arm 802 and/or robot arm 804 are operated under robotic control. The robotic control is determined based on a plan for picking/moving/placing the items (e.g., trays) and/or information pertaining to the workspace, such as presence of objects within the range 806 (e.g., workspace) of robot arm 802 or range 808 (e.g., workspace) of robot arm 804

System 800 comprises one or more sensors, including vision system 845. In various embodiments, vision system 845 obtains the information associated with one or more of the workspace of robot arm 802, robot arm 804, or workspace of robotic stack mover system 210, robotic stack mover system 810, stack pusher system 850, buffer zone 860, and a buffer conveyance that moves stacks in buffer zone 860. Vision system 845 obtains the information associated with the workspace based at least in part on data obtained by one or more sensors (e.g., an image system such as a 2D/3D camera, a laser sensor, an infrared sensor, a sensor array, a weight sensor, etc.). Various other types of sensors may be implemented in connection with vision system 845. In various embodiments, system 800 includes a plurality of 3D (or other) cameras, such as camera 846, and uses image and depth data generated by such cameras to generate a three-dimensional view of at least relevant portions of the workspace and scene, such as the scene/state shown in FIG. 8. In some embodiments, cameras such as camera 846 are used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 845 such as camera 846 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode.

Although a single camera (e.g., camera 846) mounted to a wall in the workspace of system 800 is shown in FIG. 8, in various embodiments, multiple cameras or other sensors, or a combination thereof, may be mounted statically in a workspace. In addition, or instead, one or more cameras or other sensors are mounted on or near each robot arm 802, 804, such as on the arm itself, and/or on the end effector of the corresponding robot arm, on a structure that travels with the robot arm 802, 804 as it is moved along rail 205, on or around stack pusher system 850, stack mover system 810, and/or buffer zone 860.

A robotic control system (e.g., a computer that controls robot arm 802, robot arm 804, and/or robotic stack mover system 810, such as control computer 848) controls the end effector to actuate the opening/closing of the end effector such as in connection with grasping or releasing a tray and/or the moving of tray stacks 822a, 822b, 822c, such as by driving drive chain 817. The robotic control system controls stack pusher system 850 to move (e.g., push) stacks to the input end of stack mover system 810. The robotic control system controls stack pusher system 850, robotic stack mover system 810 and/or robot arms 802, 804 (e.g., the end effector) based at least in part on (i) image data of the workspace (e.g., obtained using vision system 845), (ii) one or more sensors comprised in (or connected to) the corresponding end effector, (iii) one or more sensors comprised in (or connected to) robotic stack mover system 810 (or robotic stack mover system 230), (iv) one or more sensors comprised in stack pusher system 850, and/or (v) one or more sensors comprised in buffer zone 860. In some embodiments, the robotic control system controls robotic stack mover system 810 and/or robot arms 802, 804 (e.g., the end effector) based at least in part on information pertaining to one or more tray stacks such as an identifier of the tray stacks, a manifest of the tray stacks, an order corresponding to the tray stacks, etc. In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

According to various embodiments, the robotic control system controls stack pusher system 850, stack mover system 810, and robot arms 802, 804 in coordination. For example, the robotic control system determines a high-level plan to perform kitting operations with respect to one or more stacks, and determines lower-level plans to control each of stack pusher system 850, stack mover system 810, and robot arms 802, 804, as applicable, to perform the task for the high-level plan. The robotic system then controls to implement the lower-level plans in coordination (e.g., simultaneously or contemporaneously) to accomplish the task for the high-level plan.

The respective robot arms 802, 804 are operated at the same time, fully autonomously, to pick trays from tray stacks 822a, 822b, and/or 822c and place them on destination tray stacks, such as destination tray stacks 840a, 840b, and/or 840c, in a destination tray stack assembly area on an opposite side of rail 805 from robotic stack mover system 810 and tray stacks 822a, 822b, and/or 822c. The destination tray stacks are assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective tray stacks 822a, 822b, and/or 822c and stacking them on a corresponding destination tray stacks 840a, 840b, and/or 840c. Completed destination tray stacks 840a, 840b, and/or 840c are removed from the destination tray stack assembly area, as indicated by arrows, e.g., to be place on trucks, rail cars, containers, etc. for delivery to a further destination, such as a retail store.

In various embodiments, system 800 comprises robot stack mover system 810 such as in connection with moving destination tray stacks 840a, 840b, 840c (e.g., along a path corresponding to a direction of a guide rail 836 of robot stack mover system 810, or a direction of rail 805 along which robot arms 802, 804 traverse. Robot stack mover system 830 is implemented to provide a structure to move destination tray stacks 840a, 840b, 840c to facilitate moving stacks within range of a particular robot arm, or to allow insertion of additional destination tray stacks as other destination tray stacks are completed. As an example, if tray stack 822a comprises a tray including objects different from tray stacks 822b, 822c, and system 800 determines that a set of such objects are to be placed on destination tray stack 240c, system 800 controls robotic stack mover system 810 to move destination tray stack 840c to within range 806 of robot arm 802 (e.g., because tray stack 822a is within range of robot arm 802 but robot arm 802 is unable to reach destination tray stack 840c in the example shown in FIG. 8).

Referring further to FIG. 8, in the example shown in the system 800 includes a control computer 248 configured to communicate wirelessly with robotic elements comprising system 800, including in various embodiments one or more of: robotic stack mover system 810; robotic stack pusher system 850; the wheeled chassis on which tray stacks 822a, 822b, and/or 822c are stacked (if self-propelled); the robot arms 802, 804 and/or the respective chassis on which the robot arms 802, 804 are mounted on rail 805; and the robotically controlled end effectors of robot arms 802, 804. In various embodiments, the robotic elements are controlled by control computer 848 based on input data, such as invoice, order, and/or manifest information, as well as input state information (e.g., information pertaining to the workspace such as obtained by vision system 845), such as inventory data indicating which source tray stacks include which type and/or quantity of product.

Tray stacks 822a, 822b, 822c are inserted into a gate or other ingress/control structure at the input end of robotic stack mover system 810 (e.g., where tray stack 220 is inserted into robotic stack mover system 810). Robotic stack mover system 810 moves the tray stacks 822a, 822b, 822c along a path defined by a direction of rail 205 (or guide rail 216) to optimize throughput and minimize robot displacement, e.g., by minimizing how far and/or often the robot arms 802, 804 must be moved along rail 805 to grasp source trays and place them on respective destination stacks. The tray stacks 822a, 822b, 822c can come in with trays in different orientations/weights/and weight distribution. System 800 uses force and moment control to operate robot arms 802, 804 to insert a thumb or other protrusion gently and securely into a tray and plans its motion and tray trajectory in order to not collide with itself or the environment. In various embodiments, each robot arm 802, 804 operates in a very tight space of roughly 2.5 m in width and has a very light footprint. The robot (e.g., via control of control computer 848) utilizes its full workspace and intelligently plans its motion optimizing its grasp and/or efficiency (e.g., time, collision avoidance, etc.) in de-stacking the tray stacks 822a, 822b, 822c. System 800 (e.g., control computer 848) recognizes the need to perform orientation changes and handles that accordingly while avoiding obstacles. The robot moves to the correct output (destination tray stacks 840a, 840b, 840c) corresponding to the right customer while coordinating with the other robots on the rail 805. System 800 then uses advanced force control and interactions with the environment to figure out a proper place strategy. The cycle then restarts.

Figure 9A:
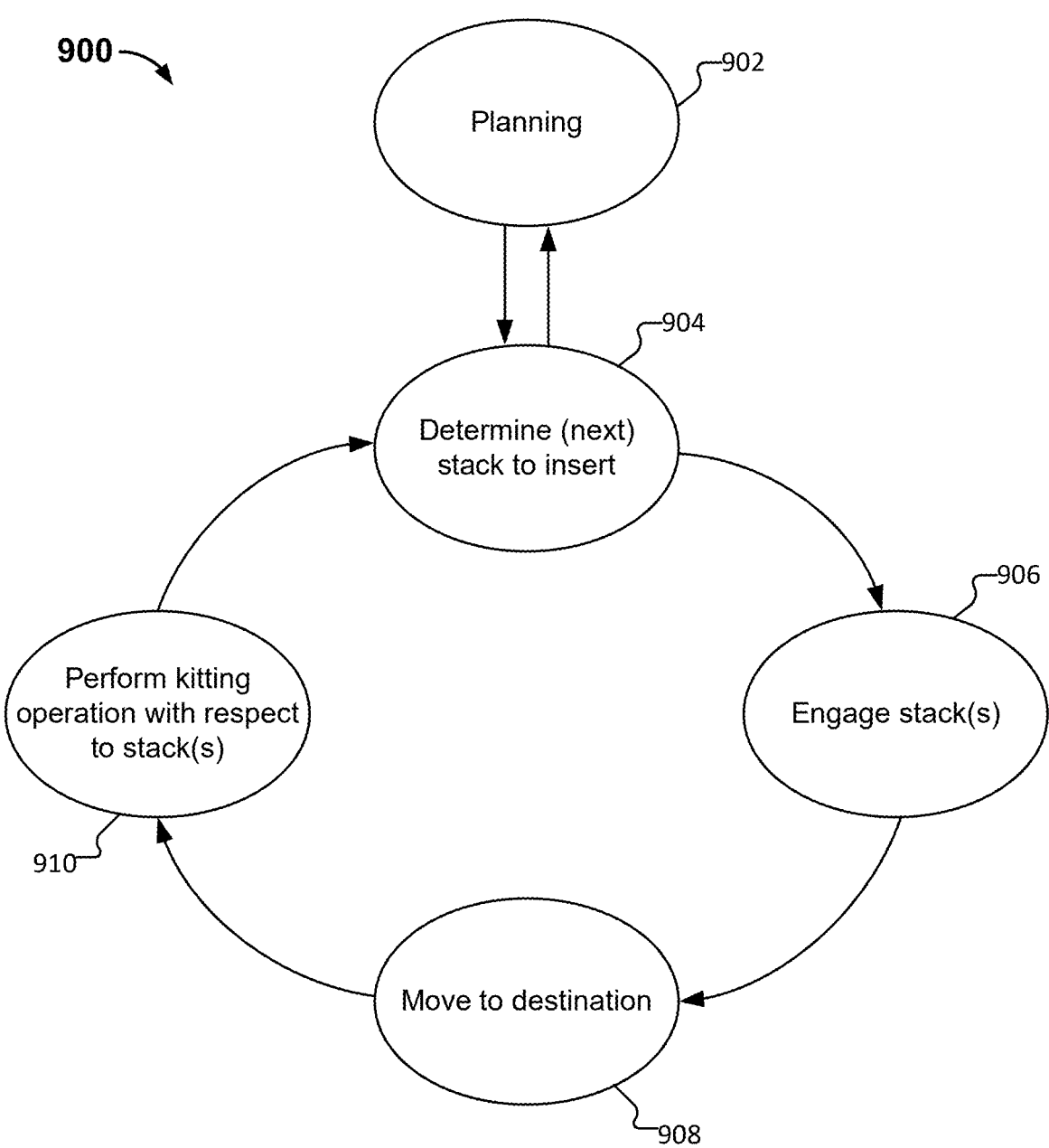
FIG. 9A is a state diagram illustrating an embodiment of an automated process to move stacks of trays.

FIG. 9A is a state diagram illustrating an embodiment of an automated process to move stacks of trays. In various embodiments, processing according to the state diagram 900 is performed by a control computer, such as control computer 848 of FIG. 8. In the example shown, a planning state, process, and/or module 902 generates and dynamically updates a plan to insert a vehicle (e.g., a tray stack) to a robotic stack mover system such as by using robotic instrumentalities as disclosed herein to move vehicles (e.g., source tray stacks, destination tray stacks, etc.) according to a set of orders, invoices, manifests, etc. The planning state, process, and/or module 902 receives feedback indicating which destination tray stacks have been completed, which stacks of source trays have been moved into the workspace, and/or other state and context information which can be used to continuous update the plan to move the tray stacks, or to cause the tray stacks to be returned to a designated return area, or to insert a new tray stack to the robotic stack mover system. In state 904, a process controlling a given robotic instrumentality (e.g., robotic stack mover system 810, in the example shown in FIG. 8) determines a next set of one or more vehicles to be moved from a tray stack source to a particular location along the path along the guide rail of the robotic stack mover system according to a current overall plan as received from planning state, process, and/or module 902. For example, the robot (or the system such as control computer 848) inserts a new tray stack to the system (e.g., the system controls a stack pusher system to insert the new stack to stack mover system, or the system can control a buffer conveyance and the stack pusher system in coordination to insert the new stack), or to advance a tray stack already within the system (e.g., to move the tray stack further along the path defined by the robotic stack mover system, etc.). The system enters state 906, in which a strategy and plan that are determined to engage a tray stack, to insert a tray stack, and/or to move a tray stack within the workspace, and/or begin to move them toward the destination location is formed. The system enters state 908 at which the system controls the robotic stack mover system to move the tray stack(s). Once the tray stack(s) that have been inserted/moved to a determined destination location has/have been grasped, the system enters state 910 in which the system controls a robot arm(s) to perform a kitting operation with respect to the tray stack (e.g., to de-stack the trays, or to stack trays on the vehicles, etc.). The system, such as control computer 848, controls a robot arm(s) to move a tray along a planned (and, if needed, dynamically adapted) trajectory to the vicinity of the destination stack, e.g., a position hovering over the destination stack and/or a location or structure on which tray is to be placed. Once the kitting operation is determined to have been securely performed, the system determines that the tray stack is complete (e.g., the stack has been completed, or the de-stacking of the stack of trays has been completed), and reenters the state, process, and/or module 902, in which a next set of one or more vehicles (e.g., tray stacks) is determined to be picked from a corresponding source and moved to a corresponding destination location (e.g., along the path of the workspace of robotic stack mover system), e.g., according to overall plan information received from planning state, process, and/or module 902. In various embodiments, a robotic system as disclosed herein continues to cycle through the states, processes, and/or modules 902, 904, 906, 908, and 910 of FIG. 9A until all destination stacks have been assembled.

Figure 9B:
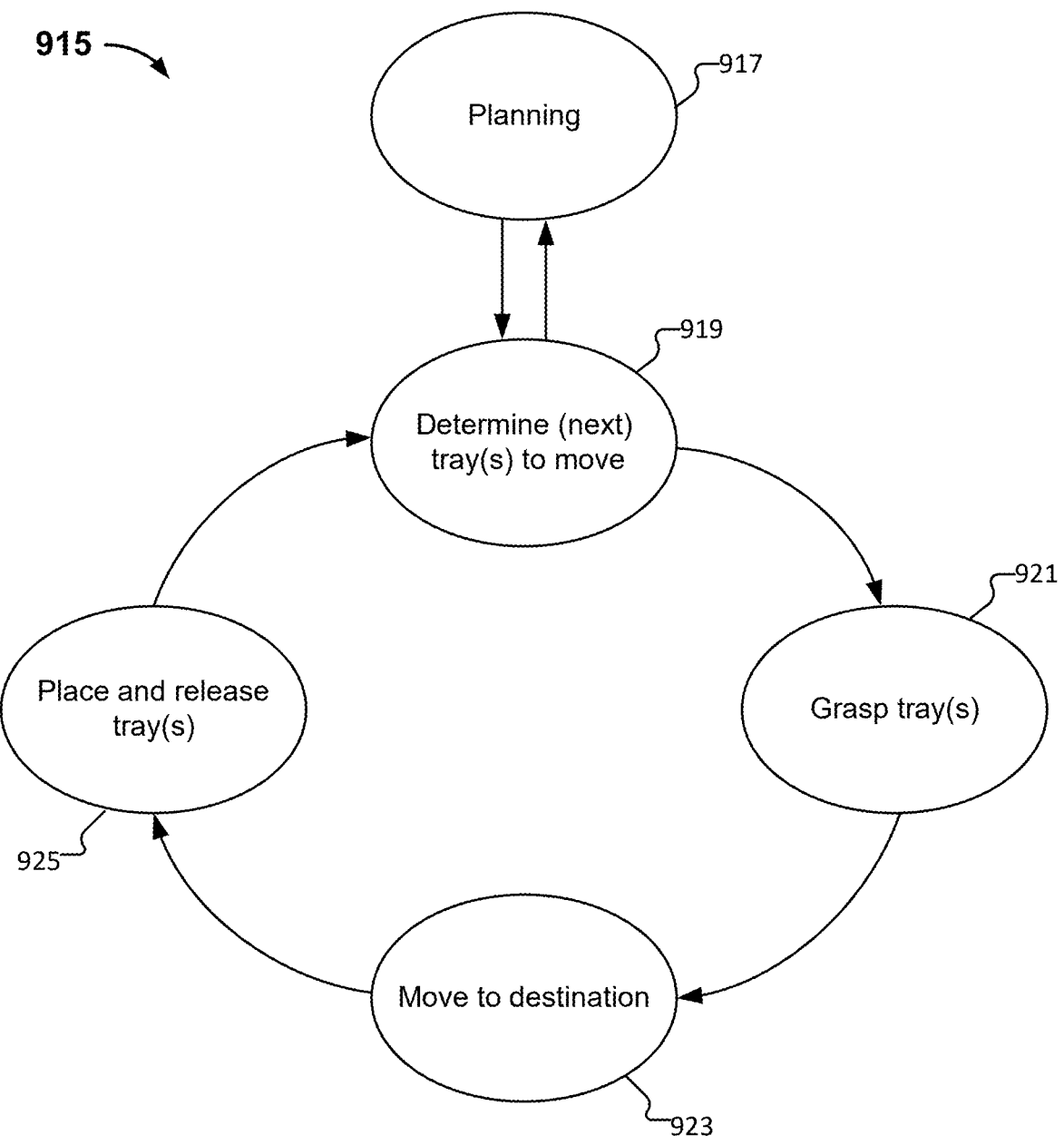
FIG. 9B is a state diagram illustrating an embodiment of an automated process to assemble stacks of trays.

FIG. 9B is a state diagram illustrating an embodiment of an automated process to assemble stacks of trays. In various embodiments, processing according to the state diagram 915 is performed by a control computer, such as control computer 848 of FIG. 8. In the example shown, a planning state, process, and/or module 917 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 917 receives feedback indicating which destination tray stacks have been completed, which stacks of source trays have been moved into the workspace, and/or other state and context information which can be used to continuous update the plan to pick and place (stack) trays to assemble the destination stacks. In state 919, a process controlling a given robotic instrumentality (e.g., robot arms 802 and/or 804 and associated end effectors, in the example shown in FIG. 8) determines a next set of one or more trays to be move from a source stack to a destination stack according to a current overall plan as received from planning state, process, and/or module 917. For example, the robot (or the system such as control computer 848) determines to grasp one, two, or more trays from a source stack to add them to (or start a new) destination stack. The robot enters state 921, in which a strategy and plan that is determined to do one or more of move into position to grasp the tray(s), grasp the trays, and/or begin to move them toward the destination stack location is formed; and the robot moves into position and grasps the trays. Once the tray(s) has/have been grasped, the robot (or the system such as control computer 848) enters state 923 in which the tray is moved along a planned (and, if needed, dynamically adapted) trajectory to the vicinity of the destination stack, e.g., a position hovering over the destination stack and/or a location or structure on which the destination stack is to be built. In state 925, the robot place(s) the tray(s) on the destination stack. In some embodiments, the state 925 includes maneuvers under force control to verify the tray(s) is/are placed securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 919, in which a next set of one or more trays is determined to be picked from a corresponding source stack and moved to a corresponding destination stack, e.g., according to overall plan information received from planning state, process, and/or module 917. In various embodiments, a robotic system as disclosed herein continues to cycle through the states 919, 921, 923, and 925 of FIG. 9B until all destination stacks have been assembled.

Figure 10A:
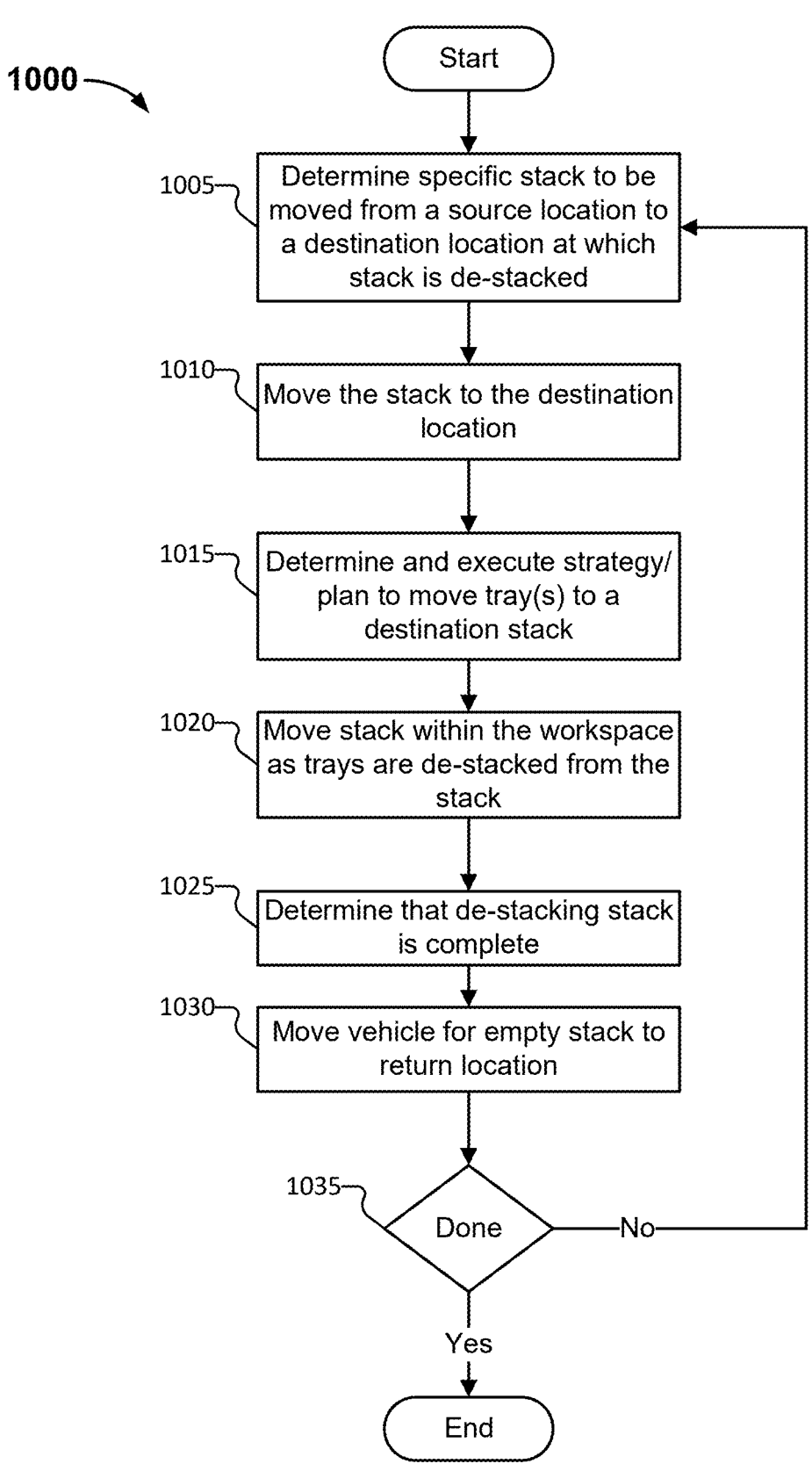
FIG. 10A is a flow diagram illustrating an embodiment of an automated process to disassemble or assemble stacks of trays.

FIG. 10A is a flow diagram illustrating an embodiment of an automated process to disassemble or assemble stacks of trays. In some embodiments, process 1000 is at least partly implemented by system 200 of FIG. 2A, system 250 of FIG. 2B, system 275 of FIG. 2C, and/or system 800 of FIG. 8.

At 1005, the system determines a specific stack to be moved from a source location to a destination location at which the stack is de-stacked. In some embodiments, the de-stacking the stack (e.g., stack of trays) includes controlling a robot arm to pick items (e.g., trays) from the stack and to place such items at a determined destination location (e.g., a destination location determined according to a plan for moving the items). The specific stack to be moved from the source location is a stack that is buffered/staged in a buffer zone and for which stack pusher system is to be controlled to insert the stack to the stack mover system for the stack mover system to move the stack to the destination location According to various embodiments, the system stores a data structure with which the system maintains/stores (i) a mapping of vehicles to manifests (e.g., a packing list or other information indicating a set of items or objects within items comprised in a vehicle), (ii) a mapping of vehicles to locations or relative locations of locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. The system monitors/tracks a location of a vehicle and accordingly update the data structure such as the mapping(s), etc. The system uses the data structure to track specific items (or objects comprised in a particular item/vehicle) within the system such as to track a particular vehicle to which the item is stacked, or a particular vehicle (or associated manifest) from which the item is de-stacked/taken.

In connection with determining a plan to perform a kitting operation(s) with respect to a vehicle (e.g., to de-stack a stack of trays on a tray stack), the system determines to insert the tray stack to the robotic stack mover system, and determines a location within the workspace of the system to which the tray stack is to be moved for the system to perform the kitting operation (e.g., for the tray stack to be within range of a robot arm so the system can control the robot arm to perform the kitting operations with respect to a tray stack). The system determines a particular stack for which kitting operations are to be performed. As an example, the system selects the particular stack based on the manifests for one or more available stacks. As another example, the system determines the particular stack based on a queue of stacks (e.g., the particular stack is the next stack in the queue of stacks for which kitting operations are to be performed), etc.

At 1010, the stack is moved to the destination location. In some embodiments, the moving the stack to the destination location includes inserting the stack to a robotic stack mover system, such as to a predefined insertion location. For example, the system controls a robotic stack pusher system to insert (e.g., push) the stack to an input end of the stack mover system (e.g., the predefined insertion location). The system determines a destination location to which to move the stack (e.g., to a specific area in the workspace, or a relative location such as to move the stack a predefined distance from the source location or insertion location). In response to determining the location to which to move the stack, the system controls the robotic stack mover system to move the stack to the destination location. For example, the system controls to drive the driving unit (e.g., a motor of the driving unit) to cause a drive chain to advance, which causes a pusher unit (e.g., a driving bracket) to apply a force on the stack to be moved and to push/pull the stack to the destination location.

At 1020, a strategy and/or plan is determined and executed to move a tray from the source stack (e.g., the stack selected at 1005) to a destination location. In some embodiments, the system determines a strategy to move to and grasp the tray(s). For example, the system plans and implements a set of maneuvers to move its end effector to a position above or otherwise near the tray(s) to be grasped. A strategy to grasp the tray(s) is determined and implemented. The system determines a plan (e.g., trajectory, etc.) to move the tray(s) to a destination stack, and the system executes the plan. The trajectory/plan takes into consideration obstacles in the workspace, such as other stacks, and potential conflicts with other robotic instrumentalities, such as another pick/place robot operating in the same workspace (e.g., robot arms 202, 204 of FIG. 2A).

At 1020, the system moves the stack within the workspace as trays are de-stacked from the stack. In some embodiments, 1020 is optionally performed, or the system waits until the de-stacking of the stack is complete.

According to various embodiments, the system determines to move the stack as the trays are de-stacked (e.g., before all trays have been de-stacked from the corresponding vehicle) if the system determines that the stack is to be moved to improve the ability for a robot to reach trays of the stack or to move the stack within range of a different robot. For example, with reference to FIG. 2A, tray stack 222a is within range 206 of robot arm 202. If system determines that a tray is to be de-stacked from tray stack 222a and to be placed on destination tray stack 240c, the system determines to control the robotic stack mover system to move the tray stack 222a to within range 208 of robot arm 204, which can de-stack a tray from tray stack 222a and place the tray on destination tray stack 240c (e.g., because destination tray stack 240c is within range of robot arm 204 and out of range 206 of robot arm 202).

At 1025, the system determines that de-stacking trays from the stack is complete. For example, the system determines that the de-stacking is complete if the system determines that the stack is empty. In some embodiments, determining that the stack is empty comprises determining that all trays determined to be de-stacked from the stack have been successfully de-stacked. Process 1000 iterates over 1015 and 1020 until the system determines that the de-stacking trays from the stack is complete.

At 1030, the vehicle is moved to a return location. In some embodiments, in response to determining that the de-stacking of the stack is complete, the system determines to move the vehicle (e.g., the stack) to a return location. The system can move the vehicle to the return location by controlling the robot arm to pick up the vehicle (e.g., dolly on which trays were stacked) such as using an end effector at the distal end of the robot arm, or using a structure attached to a side of the robot arm (e.g., a hook mounted to the robot arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system comprises a conveyance structure at the end of the robotic stack mover system that moves a vehicle placed thereon to a return location.

At 1035, a determination is made as to whether process 1000 is complete. In some embodiments, process 1000 is determined to be complete in response to a determination that no further stacks are to be de-stacked, an administrator indicates that process 1000 is to be paused or stopped, etc. In response to a determination that process 1000 is complete, process 1000 ends. In response to a determination that process 1000 is not complete, process 1000 returns to 1005.

Figure 10B:
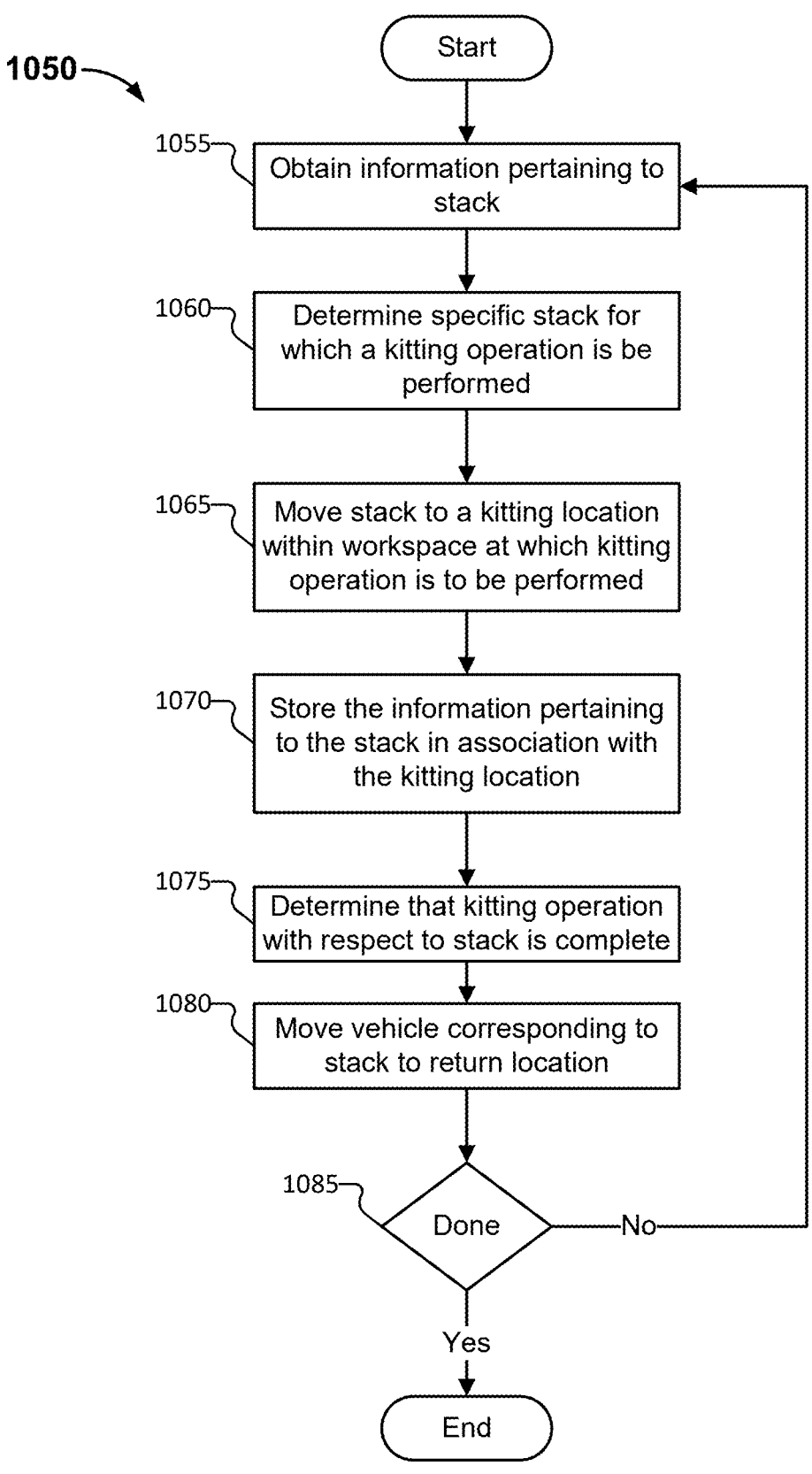
FIG. 10B is a flow diagram illustrating an embodiment of an automated process to disassemble or assemble stacks of trays.

FIG. 10B is a flow diagram illustrating an embodiment of an automated process to disassemble or assemble stacks of trays. In some embodiments, process 1050 is at least partly implemented by system 200 of FIG. 2A, system 250 of FIG. 2B, and/or system 275 of FIG. 2C.

At 1055, information pertaining to a stack is obtained. In some embodiments, the system determines a current location of the stack, information pertaining to a manifest associated with the stack (e.g., a set of trays comprised on the stack, a set of objects in one or more trays on the stack, a set of trays to be stacked on the stack, a set of objects to be placed on the stack, etc.).

At 1060, the system determines a specific stack for which a kitting operation is to be performed. In some embodiments, the system selects a stack for which the kitting operation is to be performed. For example, the system selects a stack for which trays are to be de-stacked. As another example, the system selects a stack on which one or more trays are to be placed. The system selects the stack based on one or more of (i) a queue for insertion to the robotic stack mover system, (ii) a manifest associated with the stack, (iii) a priority of the manifest associated with the stack, (iv) a location of the stack (such as a location of the stack relative to the robotic stack mover system), etc.

At 1065, the stack is moved to a kitting location within the workspace at which a kitting is to be performed. The system controls the robotic stack mover system to move the stack to the kitting location. As an example, the kitting location corresponds to a location within a range of a robot to perform the kitting operation (e.g., robot arm 202 or robot arm 204 of system 200 of FIG. 2A).

At 1070, information pertaining to the stack is stored in association with the de-stacking location. In some embodiments, the system updates a mapping of stacks to locations such as a mapping of stacks to locations along the path of robotic. The system uses one or more sensors such as a vision system and/or a sensor comprised in the robotic stack mover system to determine a location of the stack.

At 1075, a kitting operation performed with respect to the stack is complete. The system controls a robot (e.g., robot arm 202 or robot arm 204) to pick and place items with respect to the stack. For example, the system uses a robot to de-stack a set of one or more trays from the stack. As another example, the system uses a robot to place a tray on the stack.

At 1080, the vehicle for the stack is moved to a return location. In some embodiments, in response to determining that the kitting operation(s) with respect to the stack is complete, the system determines to move the vehicle (e.g., the stack) to a return location. The system can move the vehicle to the return location by controlling the robot arm to pick up the vehicle (e.g., dolly on which trays were stacked) such as using an end effector at the distal end of the robot arm, or using a structure attached to a side of the robot arm (e.g., a hook mounted to the robot arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system comprises a conveyance structure at the end of the robotic stack mover system that moves a vehicle placed thereon to a return location.

At 1085, a determination is made as to whether process 1050 is complete. In some embodiments, process 1050 is determined to be complete in response to a determination that no further stacks are to be de-stacked, an administrator indicates that process 1050 is to be paused or stopped, etc. In response to a determination that process 1050 is complete, process 1050 ends. In response to a determination that process 1050 is not complete, process 1050 returns to 1055.

Figure 11:
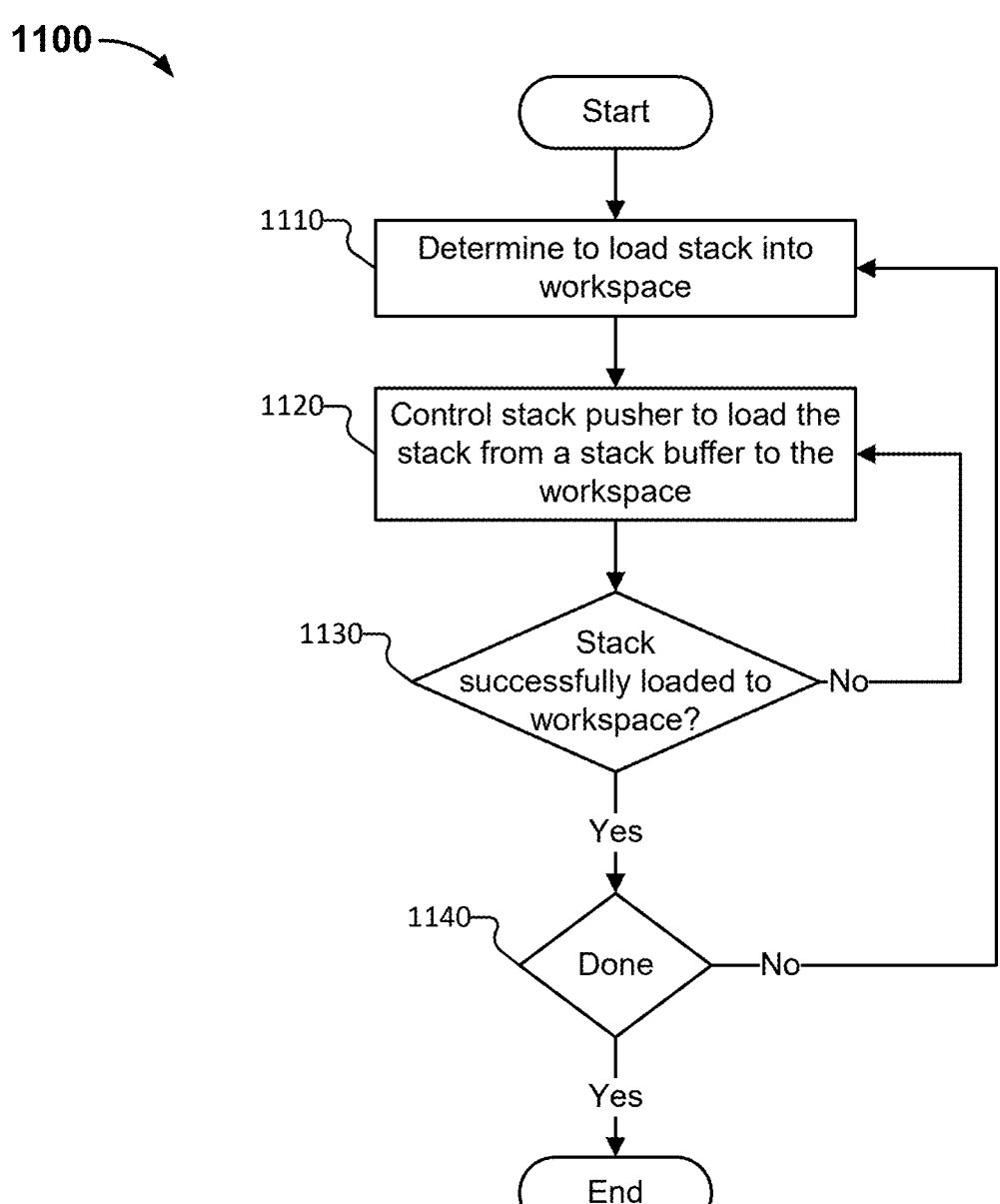
FIG. 11 is a flow diagram of a process for loading a stack to a workspace according to various embodiments.

FIG. 11 is a flow diagram of a process for loading a stack to a workspace according to various embodiments. In some embodiments, process 1100 is implemented by system 200 of FIG. 2A, system 250 of FIG. 2B, system 275 of FIG. 2C, and/or system 800 of FIG. 8.

At 1110, a determination is made to load a stack into a workspace. The system determines to load a stack into the workspace, such as stack mover system, in response to determining that robot arms are to be used to perform picking and placing operations with respect to items to be moved to/from the stack. The system determines to load the stack into the workspace based on information obtained by one or more sensors in the workspace, such as sensor(s) comprised in one or more of a stack pusher system, a stack mover system, a buffer zone, etc. The system determines to load the stack into the workspace in response to determining that the robot arm(s) in the workspace have completed loading/unloading (e.g., performing a kitting operation) a stack(s) in the workspace.

At 1120, a stack pusher is controlled to load the stack from a stack buffer to the workspace. The system robotically controls a stack pusher system to push the stack from a start position corresponding to a stack buffer zone at which the stack is queued/staged to an end position corresponding to an input end to a stack mover system (or otherwise to an input end of the workspace). Controlling the stack pusher includes controlling an actuation device to actuate and generate a linear force that pushes one or more pusher structures towards the stack and the input end.

At 1130, a determination is made as to whether the stack is successfully loaded to the workspace. The system uses sensors comprised in the workspace and/or a stack mover system to which the stack is loaded in connection with determining whether the stack is successfully loaded. For example, the system uses a vision system to generate a model of the workspace, and the system then determines based on the model whether the stack is properly/fully inserted to the workspace. As another example, the system uses information obtained by a sensor in a stack mover system to determine whether the stack is properly loaded for pusher units of the stack mover system to engage the stack and move the stack through the workspace.

At 1140, a determination is made as to whether process 1100 is complete. In some embodiments, process 1100 is determined to be complete in response to a determination that no further stacks (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1100 is to be paused or stopped, etc. In response to a determination that process 1100 is complete, process 1100 ends. In response to a determination that process 1100 is not complete, process 1100 returns to 1110.

Figure 12:
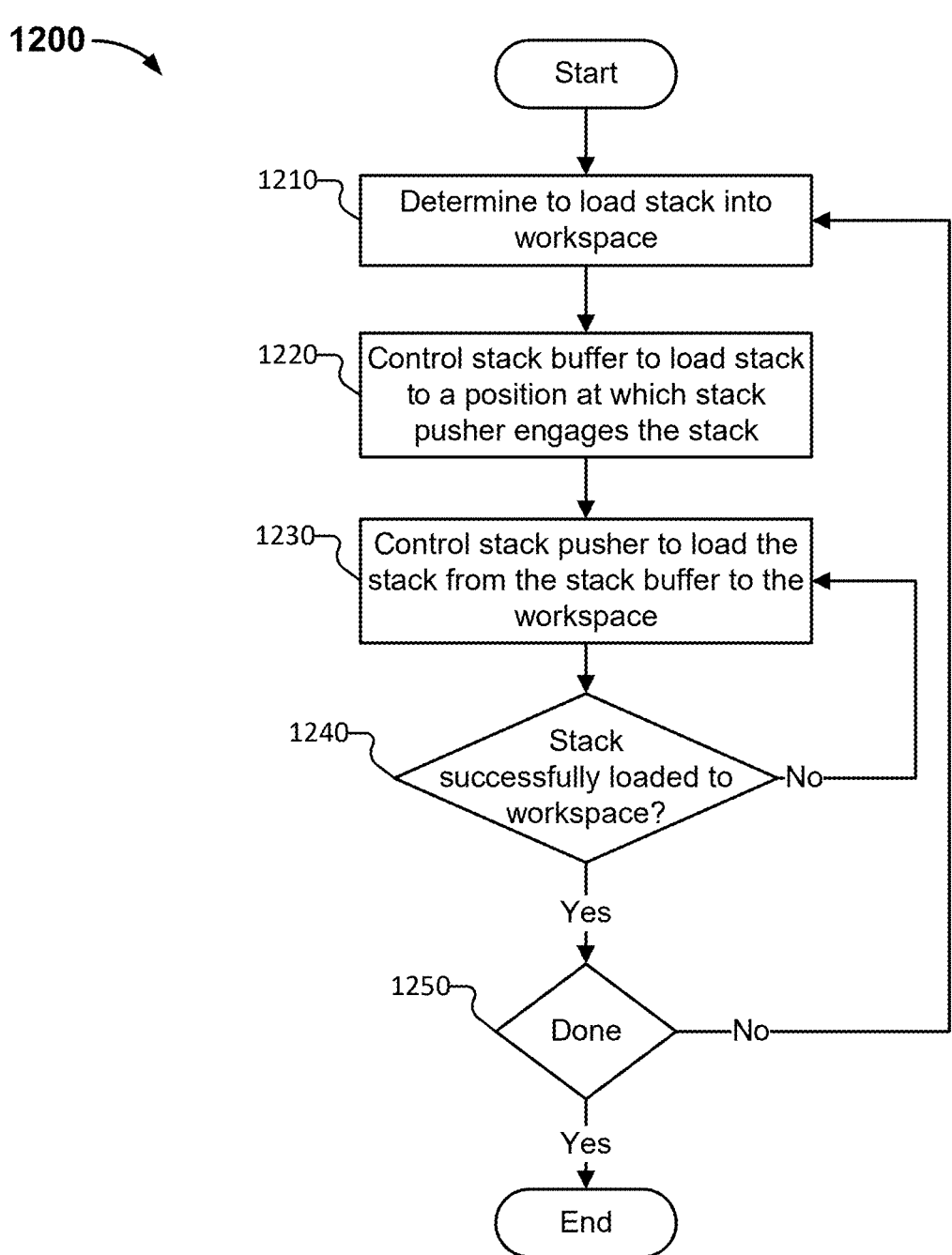
FIG. 12 is a flow diagram of a process for loading a stack to a workspace according to various embodiments.

FIG. 12 is a flow diagram of a process for loading a stack to a workspace according to various embodiments. In some embodiments, process 1200 is implemented by system 200 of FIG. 2A, system 250 of FIG. 2B, system 275 of FIG. 2C, and/or system 800 of FIG. 8.

At 1210, a determination is made to load a stack to a workspace. In some embodiments, 1210 corresponds to, or is similar to, 1110 of process 1100 of FIG. 11.

At 1220, a stack buffer is controlled to load the stack to a position at which a stack pusher engages the stack. In response to determining that the stack is to be loaded to the workspace, the system determines whether the stack is in a position at which the stack pusher system engages the stack to push the stack towards the stack mover system or workspace. In response to determining that the stack is not in the position at which the stack pusher engages the stack, the system controls a buffer conveyance in a buffer zone to advance the stack to be loaded to the appropriate position.

At 1230, the stack pusher is controlled to load the stack from the stack buffer to the workspace. In response to determining that the stack is positioned in the stack buffer for the stack pusher to engage/push the stack, the system robotically controls the stack pusher to push the stack from the position in the buffer zone to the workspace (e.g., to an input end of the stack mover system. In some embodiments, 1230 corresponds to, or is similar to 1120 of process 1100 of FIG. 11.

At 1240, a determination is made as to whether the stack is successfully loaded to the workspace. In some embodiments, 1240 corresponds to, or is similar to 1140 of process 1100 of FIG. 11.

In response to determining that stack is not successfully loaded to the workspace at 1240, process 1200 returns to 1230 and process 1200 iterates over 1230-1240 until the system determines that the stack is successfully loaded in the workspace.

In response to determining that stack is successfully loaded to the workspace at 1240, process 1200 proceeds to 1250 at which a determination is made as to whether process 1200 is complete. In some embodiments, process 1200 is determined to be complete in response to a determination that no further stacks (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1200 is to be paused or stopped, etc. In response to a determination that process 1200 is complete, process 1200 ends. In response to a determination that process 1200 is not complete, process 1200 returns to 1210.

Figure 13:
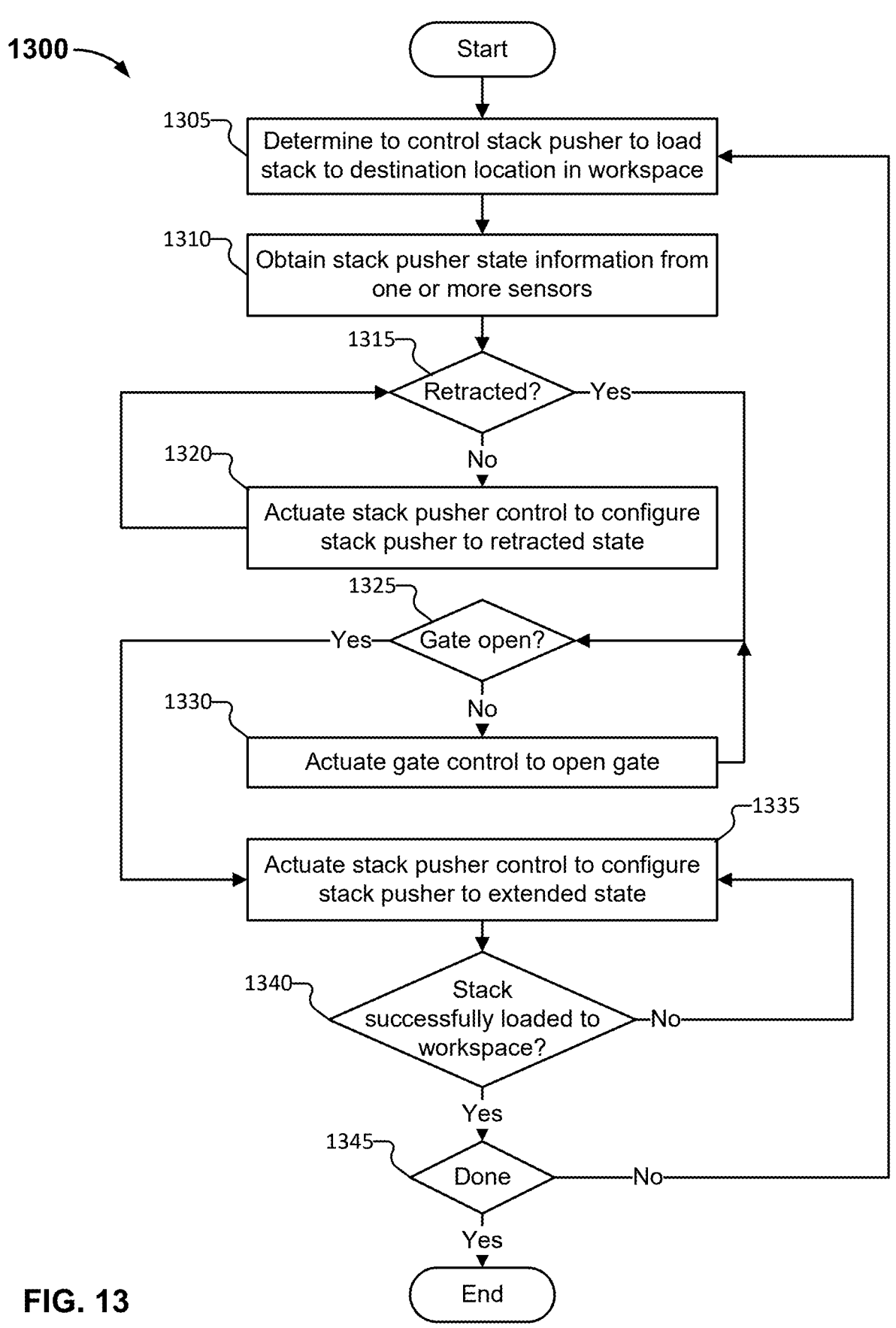
FIG. 13 is a flow diagram of a process for loading a stack to a workspace according to various embodiments.

FIG. 13 is a flow diagram of a process for loading a stack to a workspace according to various embodiments. In some embodiments, process 1300 is implemented by system 200 of FIG. 2A, system 250 of FIG. 2B, system 275 of FIG. 2C, and/or system 800 of FIG. 8.

At 1305, a determination is made to control a stack pusher to load a stack to a destination location in a workspace. In some embodiments, 1210 corresponds to, or is similar to, 1110 of process 1100 of FIG. 11.

At 1310, stack pusher state information is obtained from one or more sensors. The system obtains information pertaining to the workspace or state of the system. The system includes a vision system or other sensors, comprising one or more of sensor(s) comprised in a stack pusher system, sensor(s) comprised in a buffer zone, sensor(s) comprised in a stack mover system, and/or sensor(s) mounted to (or in proximity to) robot arms in the workspace, etc.

At 1315, a determination is made as to whether the stack pusher is not configured in a retracted state. The system determines whether the stack pusher is in a retracted state based at least in part on (i) image data of the workspace (e.g., obtained using vision system, (ii) one or more sensors comprised in stack pusher system, and/or (iii) one or more sensors comprised in buffer zone. For example, the system determines whether one or more pusher structure are in an extended position (e.g., relative to a base plate of the stack pusher system).

In response to determining that the stack pusher is configured in the retracted state at 1315, process 1300 proceeds to 1320 at which a stack pusher control is actuated to configure the stack pusher in the retracted state. In response to configure the stack pusher system in the retracted state, the system actuates an actuation device to apply a linear force on one or more pusher structures to retract the pusher structures towards a base plate of the stack pusher system.

In response to determining that the stack pusher is configured in the retracted state at 1315, process 1300 proceeds to 1325 at which a determination is made as to whether a gate (e.g., a stack gate) is open. The system determines whether the gate is open is based at least in part on (i) image data of the workspace (e.g., obtained using vision system, (ii) one or more sensors comprised in stack pusher system, (iii) one or more sensors comprised in buffer zone, and/or (iv) one or more sensors comprised in a stack mover system (e.g., that moves stacks through the workspace). The gate is comprised in a gating structure that mediates traffic/flow of stacks from the buffer zone to the stack mover system).

In response to determining that the gate is not open, process 1300 proceeds to 1330 at which a gate control is actuated to open the gate. Process 1300 thereafter returns to 1325 and process 1300 iterates over 1325-1330 until the gate is determined to be open. For example, the system robotically controls the gate to open to permit the stack pusher system to engage the stack and/or push the stack to the stack mover system. The system controls the opening/closing the gate in coordination with controlling the stack pusher system and/or stack mover system.

In response to determining that the gate is open, process 1300 proceeds to 1335 at which the stack pusher control is actuated to configure the stack pusher in the extended state.

At 1340, a determination is made as to whether the stack is successfully loaded to the workspace. In some embodiments, 1340 corresponds to, or is similar to, 1110 of process 1100 of FIG. 11.

In response to determining that stack is successfully loaded to the workspace at 1340, process 1300 returns to 1335 and process 1300 iterates over 1335-1340 until the system determines that the stack is successfully loaded in the workspace.

In response to determining that stack is successfully loaded to the workspace at 1340, process 1300 proceeds to 1345 at which a determination is made as to whether process 1300 is complete. In some embodiments, process 1300 is determined to be complete in response to a determination that no further stacks (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1300 is to be paused or stopped, etc. In response to a determination that process 1300 is complete, process 1300 ends. In response to a determination that process 1300 is not complete, process 1300 returns to 1305.

Although the foregoing embodiments have been described in connection with the grasping, moving, and placing one or more trays, various other receptacles or containers may be implemented. Examples of other receptacles or containers include bags, boxes, pallets, crates, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A robotic stack pusher system, comprising:

an actuation device; and a plurality of pusher structures that are substantially planar, wherein at least one of the plurality of pusher structures is nested within one or more other pusher structures of the plurality of pusher structures; wherein:

the actuation device is operatively coupled to at least one of the plurality of pusher structures;

the actuation device is configured to actuate a position of the plurality of pusher structures between a retracted state and an extended state in response to a control signal; and actuation of the actuation device causes the one of the plurality of structures that is nested to extend telescopically with a force to push a payload;

the payload is a wheeled dolly on which one or more receptacles are stacked; and the plurality of pusher structures comprises a payload engagement pusher structure that engages the wheeled dolly and pushes the wheeled dolly to a robot workspace.

2. The robotic stack pusher system of claim 1, wherein the payload engagement pusher structure engages the wheeled dolly and does noes not engage the one or more receptacles stacked on the wheeled dolly.

3. The robotic stack pusher system of claim 1, wherein at least one pusher structure of the plurality of pusher structures is connected to one or more wheels that support the at least one pusher structure.

4. The robotic stack pusher system of claim 1, wherein the control signal is received from a robotic control system.

5. The robotic stack pusher system of claim 4, wherein the robotic control system is associated with a robot workspace, and the robotic control system uses information obtained from one or more sensors at the robot workspace in connection with generating the control signal.

6. The robotic stack pusher system of claim 5, wherein the robotic control system uses the information obtained from one or more sensors to detect a payload in a buffer zone that is ready to be pushed.

7. The robotic stack pusher system of claim 6, wherein the robotic control system determines to control the robotic stack pusher via the control signal in response to detecting that the payload is in the buffer zone ready to be pushed to the robot workspace.

8. The robotic stack pusher system of claim 1, wherein the robotic stack pusher system pushes the payload to insert the payload to a robot workspace, and the robot workspace comprises a robotic stack mover system that moves one or more payloads to within an operable range of one or more robots.

9. The robotic stack pusher system of claim 8, further comprising one or more processors that are configured to operate the robotic stack pusher system and the robotic stack mover system in coordination to move one or more payloads to and through the robot workspace.

10. The robotic stack pusher system of claim 9, wherein:

the one or more processors are further configured to control a buffer zone conveyance structure to move the payload to an engagement location at which the plurality of pusher structures engage the payload; and the one or more processors control the buffer zone in coordination with controlling the robotic stack pusher system and the robotic stack mover system.

11. The robotic stack pusher system of claim 1, wherein the actuation device comprises a linear shaft.

12. The robotic stack pusher system of claim 11, wherein the linear shaft is a pneumatic shaft or a hydraulic shaft.

13. The robotic stack pusher system of claim 11, wherein the linear shaft is configured to extend or retract along a direction in which the plurality of pusher structures travel between the retracted state and the extended state.

14. The robotic stack pusher system of claim 1, further comprising:

a gating structure that gates introduction of the payload to a robot workspace.

15. The robotic stack pusher system of claim 14, wherein the gating structure is configured to prevent the payload from entering the robot workspace until the control signal is received, the control signal being generated in response to a determination to load the payload to the robot workspace.

16. The robotic stack pusher system of claim 14, wherein in response to determining to load the payload to the robot workspace, the gating structure is actuated to move to an open state, and the actuation device is then controlled to actuate the position of the plurality of pusher structures to the extended state.

17. The robotic stack pusher system of claim 1, further comprising one or more processors configured to:

determine to load the payload to the robot workspace; and in response to determining to load the payload to the robot workspace, control the actuation device to actuate a linear shaft to move the plurality of pusher structures to the extended state.

18. The robotic stack pusher system of claim 17, wherein:

the plurality of pusher structures comprises at least a first pusher structure and a payload engagement pusher structure;

the payload engagement pusher structure is configured to engage the payload and push the payload to a destination location in the robot workspace in response to the actuation device being actuated to move the plurality of pusher structures to the extended state; and in response to being controlled to actuate the position of the plurality of pusher structures, the actuation device causes the plurality of pusher structures to telescopically move to the extended state.

19. The robotic stack pusher system of claim 18, wherein in response to a determination that the payload has been loaded to the destination location, the one or more processors control the actuation device to actuate to move the position of the plurality of pusher structures to the retracted state.

20. The robotic stack pusher system of claim 17, wherein:

the plurality of pusher structures comprises at least a first pusher structure and a payload engagement pusher structure; and in response to being controlled to actuate the position of the plurality of pusher structures, the actuation device applies an actuating force to a linear shaft to cause the linear shaft to extend from the retracted state to the extended state, the linear shaft is coupled to the payload engagement pusher structure such that the actuating force causing the linear shaft to extend to the extended state causes the payload engagement pusher structure to move to an intermediate extended state relative to the first pusher structure.

21. The robotic stack pusher system of claim 20, wherein:

the payload engagement pusher structure and the first pusher structure are collectively coupled to a base plate;

the payload engagement pusher structure is operatively coupled to the first pusher structure; and in response to the payload engagement pusher structure being extended past the intermediate extended state, the payload engagement pusher structure applies a pulling force to cause the first pusher structure to move from a first retracted state relative to the base plate to a first extended state.

22. The robotic stack pusher system of claim 17, wherein:

the plurality of pusher structures comprises a first pusher structure, one or more intermediate pusher structures, and a payload engagement pusher structure;

when the first pusher structure, the one or more intermediate pusher structures, and the payload engagement pusher structure are collectively in the retracted state, the plurality of pusher structures are configured to be in a nested configuration;

in response to being controlled to actuate the position of the plurality of pusher structures, the actuation device applies an actuating force to a linear shaft to cause the linear shaft to extend from the retracted state to the extended state; and the linear shaft is coupled to at least one of the first pusher structure, the one or more intermediate pusher structures, and the payload engagement pusher structure such that the actuating force causing the linear shaft to extend to the extended state causes the first pusher structure, the one or more intermediate pusher structures, and the payload engagement pusher structure to sequentially extend from the nested configuration to move to the extended state.

23. The robotic stack pusher system of claim 22, wherein the first pusher structure, the one or more intermediate pusher structures, and the payload engagement pusher structure are connected via one or more wire rope cables or chains that sequentially apply linear forces to the first pusher structure, the one or more intermediate pusher structures, and the payload engagement pusher structure as the plurality of pusher structures are moved to the extended state.

24. The robotic stack pusher system of claim 17, wherein:

the plurality of pusher structures comprises at least a first pusher structure and a payload engagement pusher structure; and in response to being moved from the retracted state to the extended state, the first pusher structure and the payload engagement pusher structure sequentially extend telescopically to an extended position.

25. The robotic stack pusher system of claim 24, wherein the first pusher structure and the payload engagement pusher structure are nested structures that sequentially extend to move a distal end of the payload engagement pusher structure to engage the payload and push the payload to the robot workspace.

26. The robotic stack pusher system of claim 24, wherein in response to being moved from the extended state to the retracted state, the first pusher structure and the payload engagement pusher structure sequentially retracts to a retracted position.

27. The robotic stack pusher system of claim 26, wherein the payload engagement pusher structure has a larger width than the first pusher structure, and when the payload engagement pusher structure and the first pusher structure are in the retracted state, the payload engagement pusher structure at least partially envelopes the first pusher structure.

28. A method, comprising:
determining to push a payload to a robot workspace;
in response to determining to push the payload to the robot workspace, controlling a robotic stack pusher system to move a plurality of pusher structures to cause the payload to be pushed from a payload buffer zone to an end position; and
controlling the robotic stack pusher system to apply a retraction force to retract the one one or more pusher structures to a start position.

29. The method of claim 28, wherein controlling the robotic stack pusher system to move a plurality of pusher structures to cause the payload to be pushed from a payload buffer zone to an end position comprises:
communicating a control signal to the robotic stack pusher system to cause an actuation device of the robotic stack pusher system to actuate a position of the plurality of pusher structures between a retracted state and an extended state in response to a control signal.

30. The method of claim 28, wherein:
the end position corresponds to a payload introduction location of a robotic stack mover system; and
the robotic stack pusher system is controlled to apply the retraction force in response to determining that the payload is engaged by a structure in the robotic stack mover system.

31. The method of claim 28, wherein a gating structure is controlled to actuate a gate to be configured in an open position, and the robotic stack pusher system is controlled to move the plurality of pusher structures in response to a determination that the gate is configured in the open position.

32. The method of claim 28, wherein the determining to load the payload into the robot workspace comprises receiving one or more control signals that are generated based on a model of the robot workspace.

33. The method of claim 32, wherein the model of the robot workspace is generated based at least in part on information obtained by one or more sensors in the robot workspace or the stack pusher system.

34. The method of claim 32, wherein the one or more control signals are generated in response to a determination that a robot in the robot workspace has finished a kitting operation with respect to another payload.

35. A computer program product embodied in a non-transitory computer readable medium and comprising computer instructions for:
determining to push a payload to a robot workspace;
in response to determining to push the payload to the robot workspace, controlling a robotic stack pusher system to move a plurality of pusher structures to cause the payload to be pushed from a payload buffer zone to an end position; and
controlling the robotic stack pusher system to apply a retraction force to retract the one one or more pusher structures to a start position.

36. A robotic stack pusher system, comprising:
an actuation device; and
a plurality of pusher structures that are substantially planar, wherein at least one of the plurality of pusher structures is nested within one or more other pusher structures of the plurality of pusher structures;
wherein:
the actuation device is operatively coupled to at least one of the plurality of pusher structures;
the actuation device is configured to actuate a position of the plurality of pusher structures between a retracted state and an extended state in response to a control signal received from a robotic control system;
the robotic control system is associated with a robot workspace, and the robotic control system uses information obtained from one or more sensors at the robot workspace in connection with generating the control signal; and
actuation of the actuation device causes the one of the plurality of structures that is nested to extend telescopically with sufficient force and to controllably push a payload.

37. A robotic stack pusher system, comprising:
an actuation device;
a plurality of pusher structures that are substantially planar, wherein at least one of the plurality of pusher structures is nested within one or more other pusher structures of the plurality of pusher structures; and
one or more processors configured to:
determine to load the payload to the robot workspace; and
in response to determining to load the payload to the robot workspace, control the actuation device to actuate a linear shaft to move the plurality of pusher structures to the extended state;
wherein:
the actuation device is operatively coupled to at least one of the plurality of pusher structures;
the actuation device is configured to actuate a position of the plurality of pusher structures between a retracted state and an extended state in response to a control signal; and
actuation of the actuation device causes the one of the plurality of structures that is nested to extend telescopically with sufficient force and to controllably push a payload.

* * * * *